United States Patent [19]
Terajima et al.

[11] Patent Number: 5,832,190
[45] Date of Patent: Nov. 3, 1998

[54] IMAGE RECORDING APPARATUS WITH RELIABLE, EFFICIENT AND POWER-SAVING STAND-BY STATE

[75] Inventors: Hisao Terajima, Yokohama; Yasuhide Ueno, Fuchu; Takeshi Toyama, Hiratsuka; Toshiyuki Watanabe, Sagamihara; Takashi Imai; Naoya Watanabe, both of Yokohama, all of Japan

[73] Assignee: Canon Kabushiki Kaisha, Tokyo, Japan

[21] Appl. No.: 807,769

[22] Filed: Feb. 27, 1997

Related U.S. Application Data

[63] Continuation of Ser. No. 314,376, Sep. 28, 1994, abandoned.

[30] Foreign Application Priority Data

| Oct. 1, 1993 | [JP] | Japan | 5-269810 |
| Mar. 30, 1994 | [JP] | Japan | 6-060919 |

[51] Int. Cl.⁶ .................................................. H04N 1/00
[52] U.S. Cl. .................. 395/113; 358/437; 358/442; 358/401
[58] Field of Search .................... 358/400, 401, 358/406, 437, 442, 468, 501–504; 395/113; 347/192, 193, 3, 37, 190; 399/88–90; H04N 1/00

[56] References Cited

U.S. PATENT DOCUMENTS

| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,003,578 | 3/1991 | Lin . |
| 5,103,318 | 4/1992 | Takaoka | 358/437 |
| 5,177,620 | 1/1993 | Fukushima | 358/406 |
| 5,270,779 | 12/1993 | Kawai . |
| 5,321,478 | 6/1994 | Nakamura et al. | 355/204 |
| 5,420,667 | 5/1995 | Kaneko et al. | 395/113 |
| 5,485,286 | 1/1996 | Ejiri et al. | 358/436 |

FOREIGN PATENT DOCUMENTS

| 0443716 | 8/1991 | European Pat. Off. . |
| 0495433 | 7/1992 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |
| 60-219863 | 11/1985 | Japan . |
| 2169288 | 6/1990 | Japan . |
| 3119369 | 5/1991 | Japan . |

*Primary Examiner*—Kim Yen Vu
*Attorney, Agent, or Firm*—Fitzpatrick, Cella, Harper & Scinto

[57] ABSTRACT

An image recording apparatus includes a facsimile (FAX) unit and a printer unit. The printer unit has an ink-jet printing head, and records an image in accordance with image data received by the FAX unit. In this apparatus, when the power supply is turned on, the printer unit performs a hard power-ON initialization process to initialize a watchdog timer, registers, the work area of a RAM, and the like, and also initializes the RAM to erase data left in buffers. Thereafter, the printer unit transfers to a standby state. When a print request or a printer setting request is generated in the standby state, a soft power supply initialization process is executed to perform checking of the RAM, initialization of the work area, and initialization of carriage control and paper feed control, and the like. In the standby state, LEDs and the like of the printer unit are kept OFF. An operation error of the printer unit caused by remaining data can be prevented, and reliability of the apparatus can be improved. In addition, unnecessary power consumption can be prevented.

25 Claims, 45 Drawing Sheets

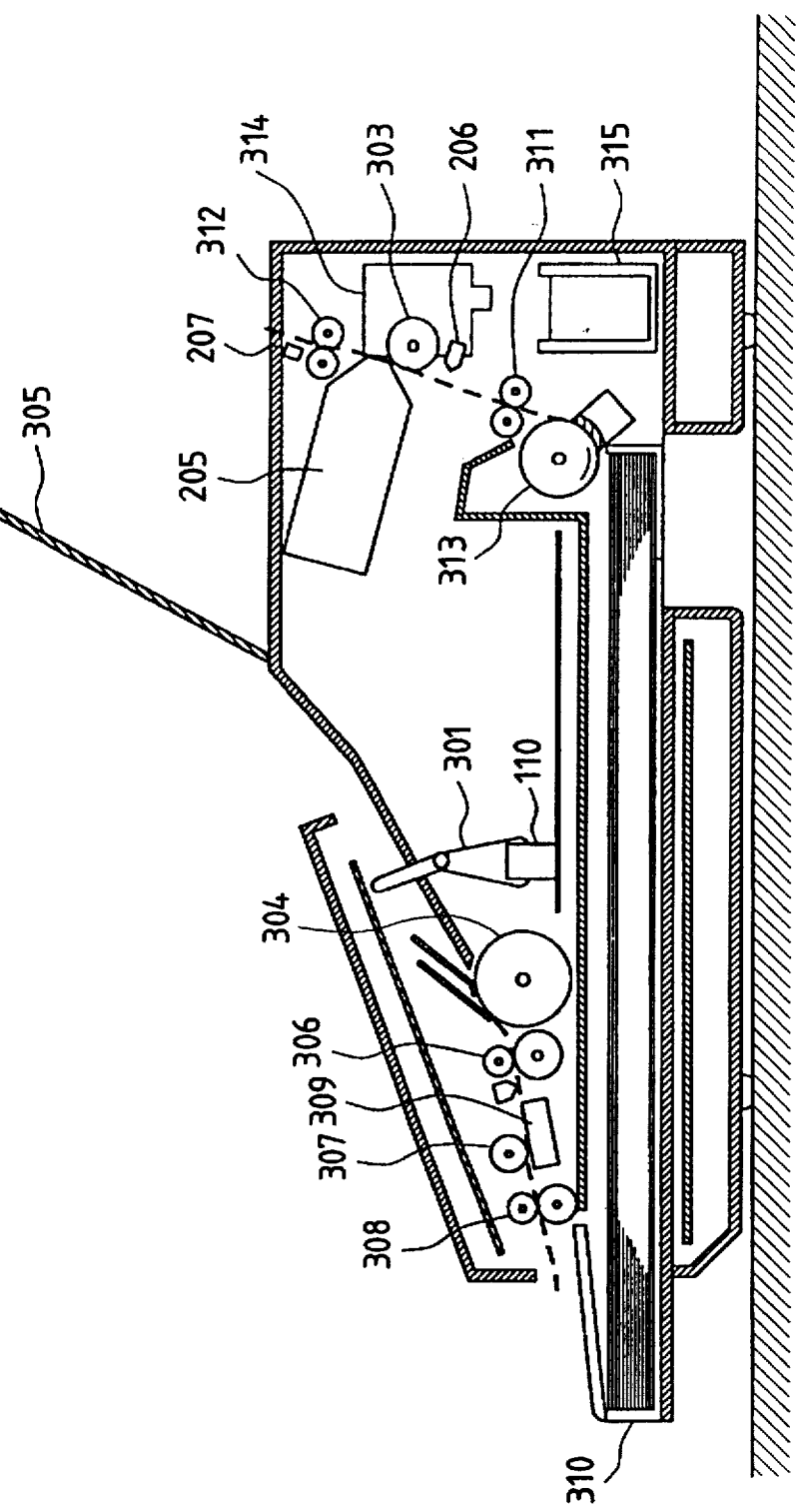

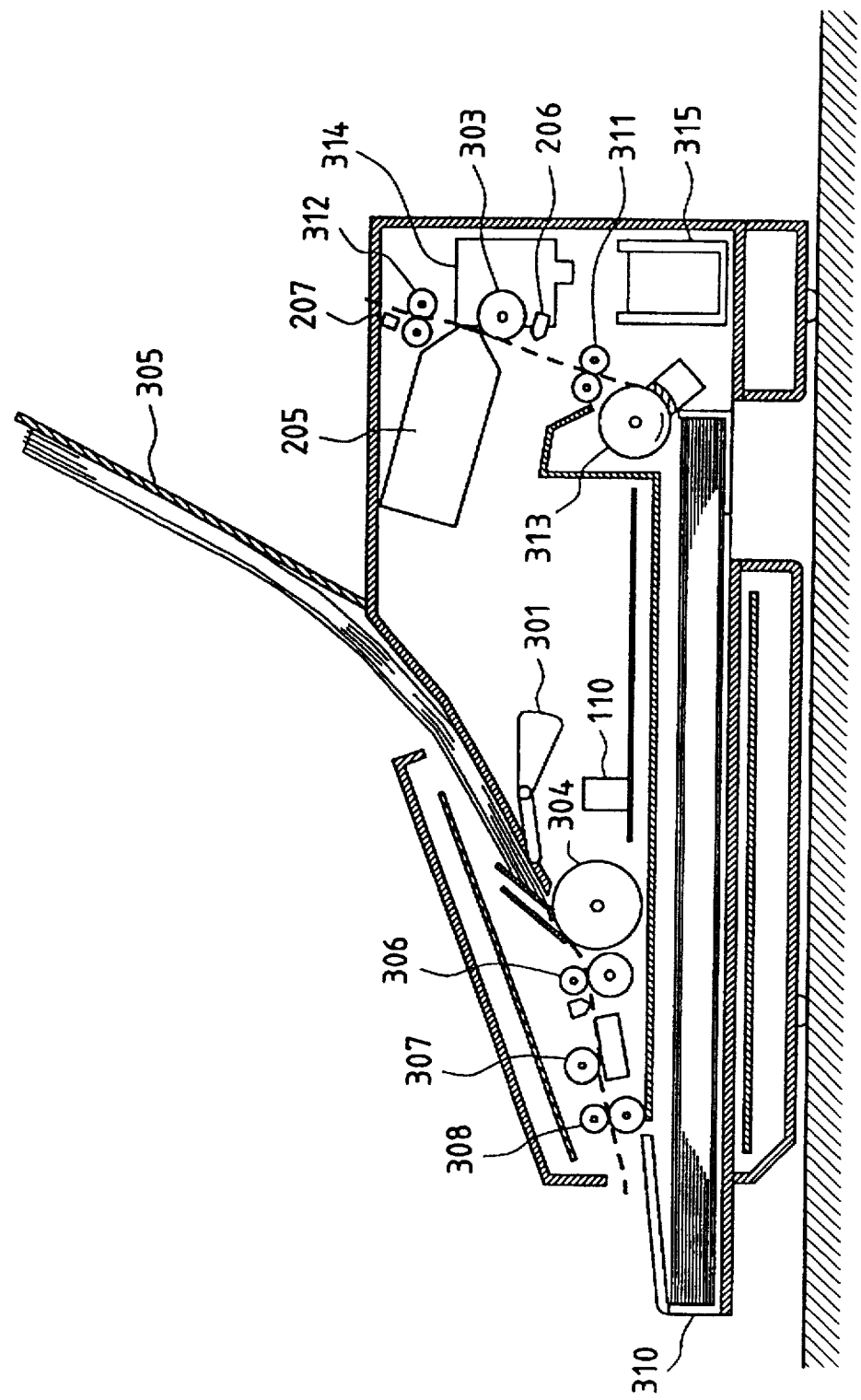

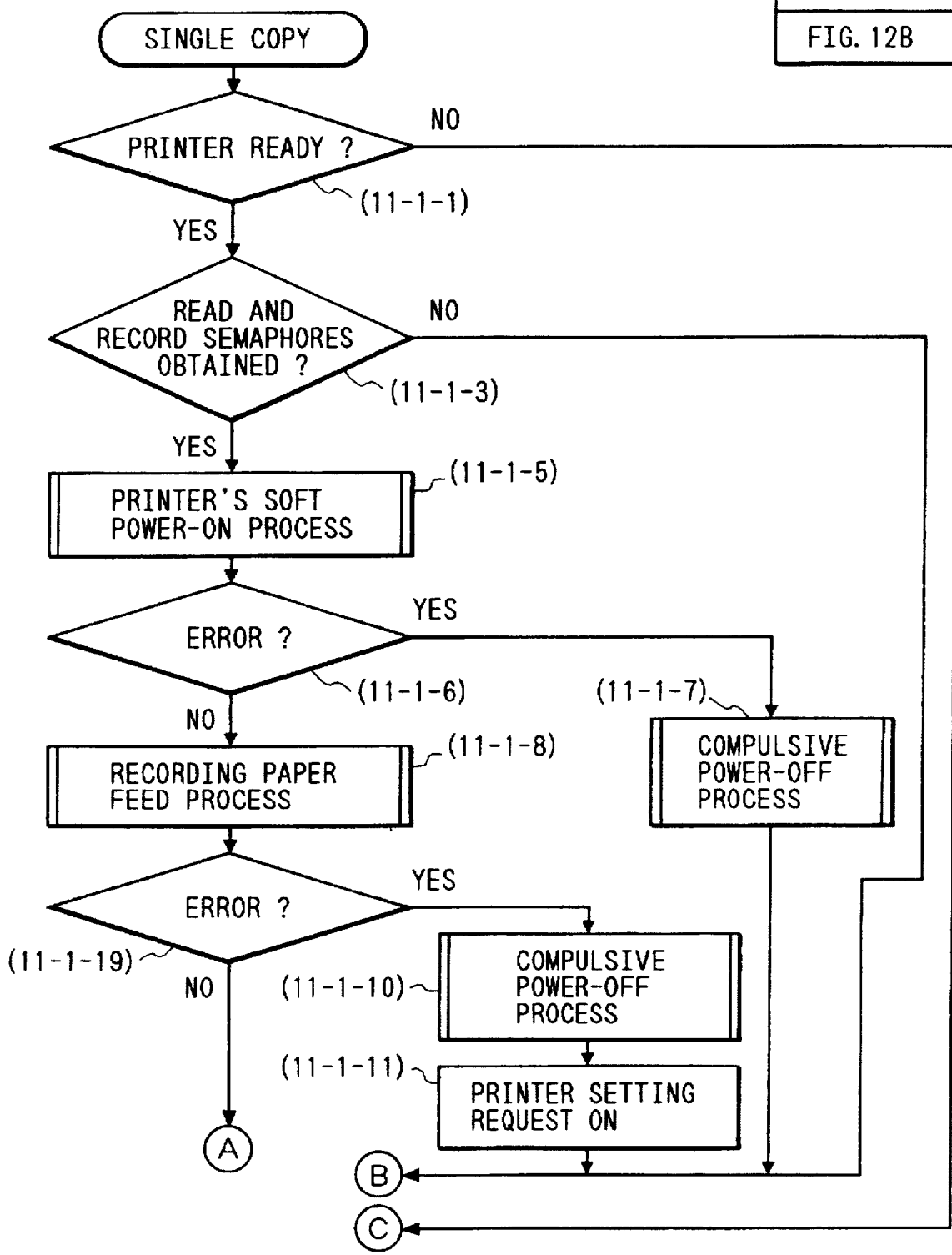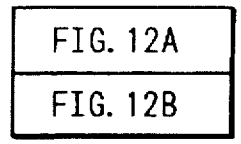

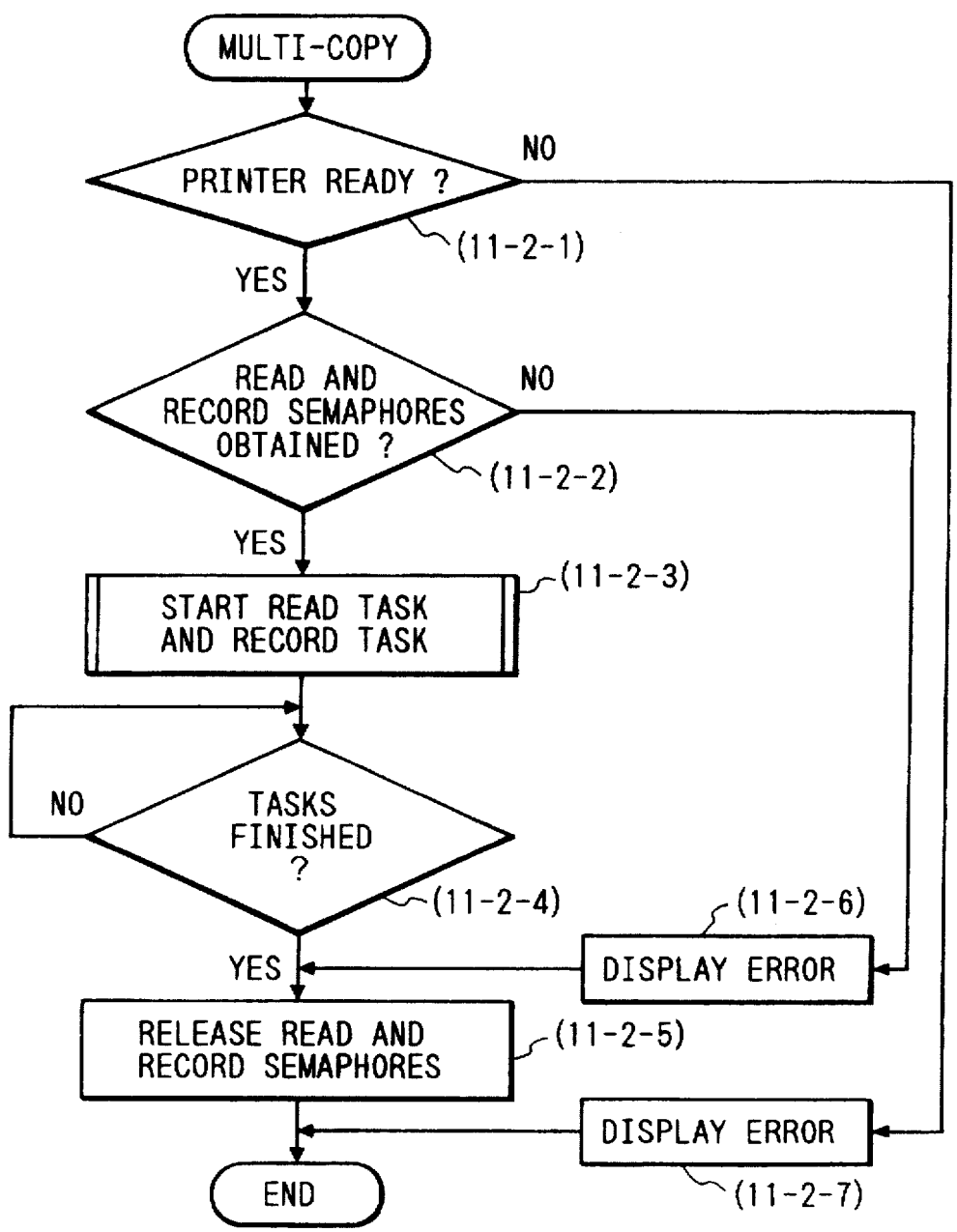

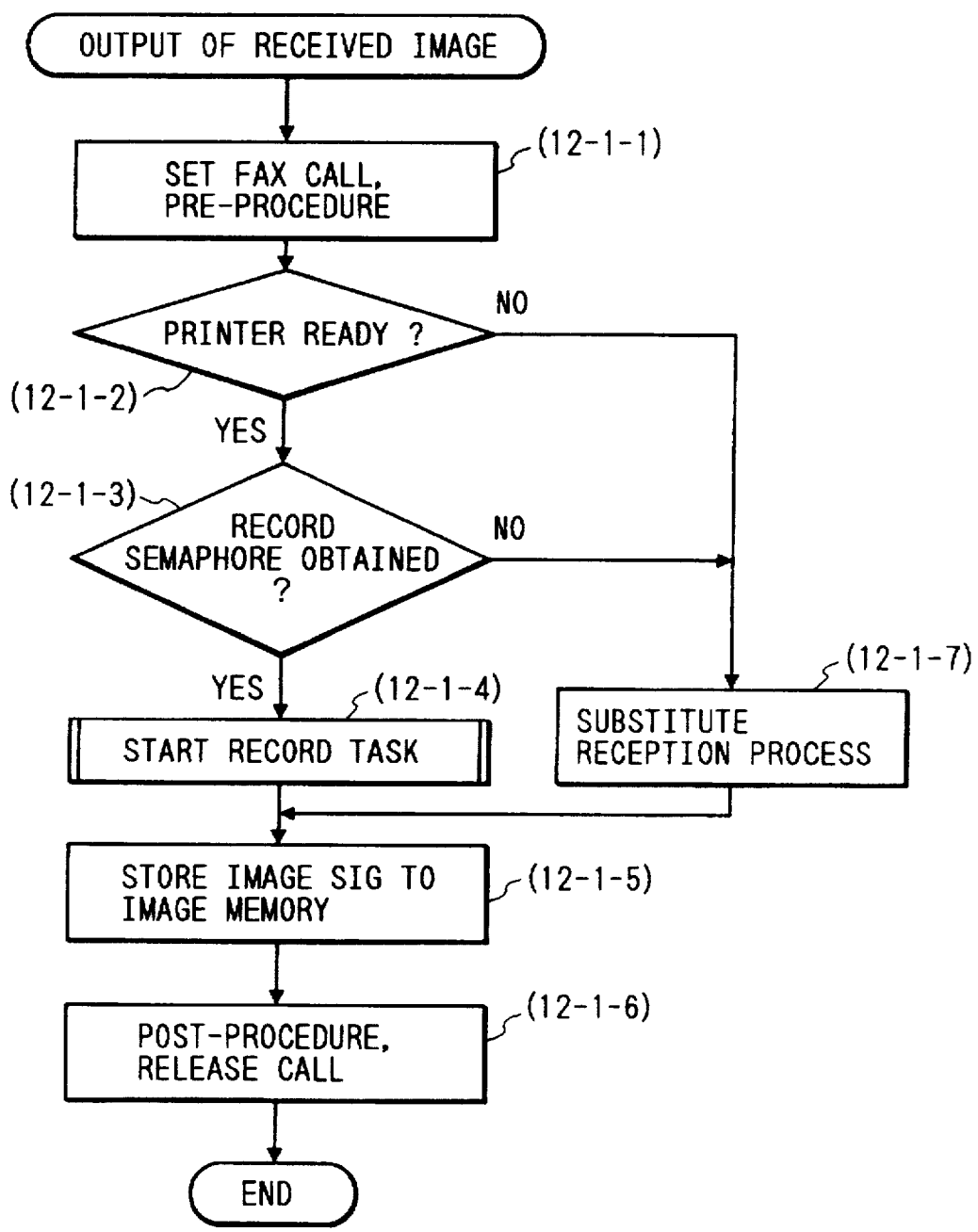

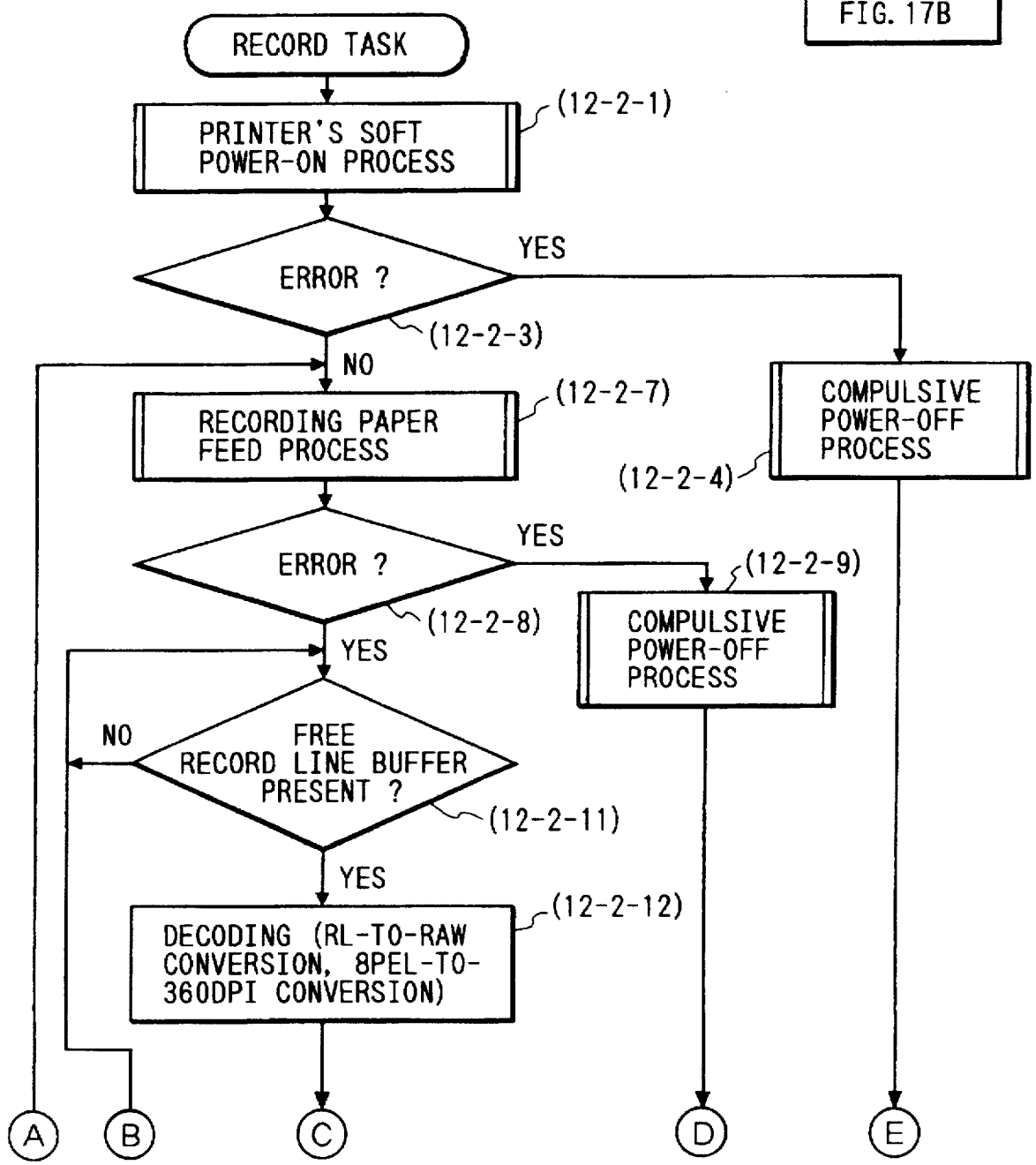

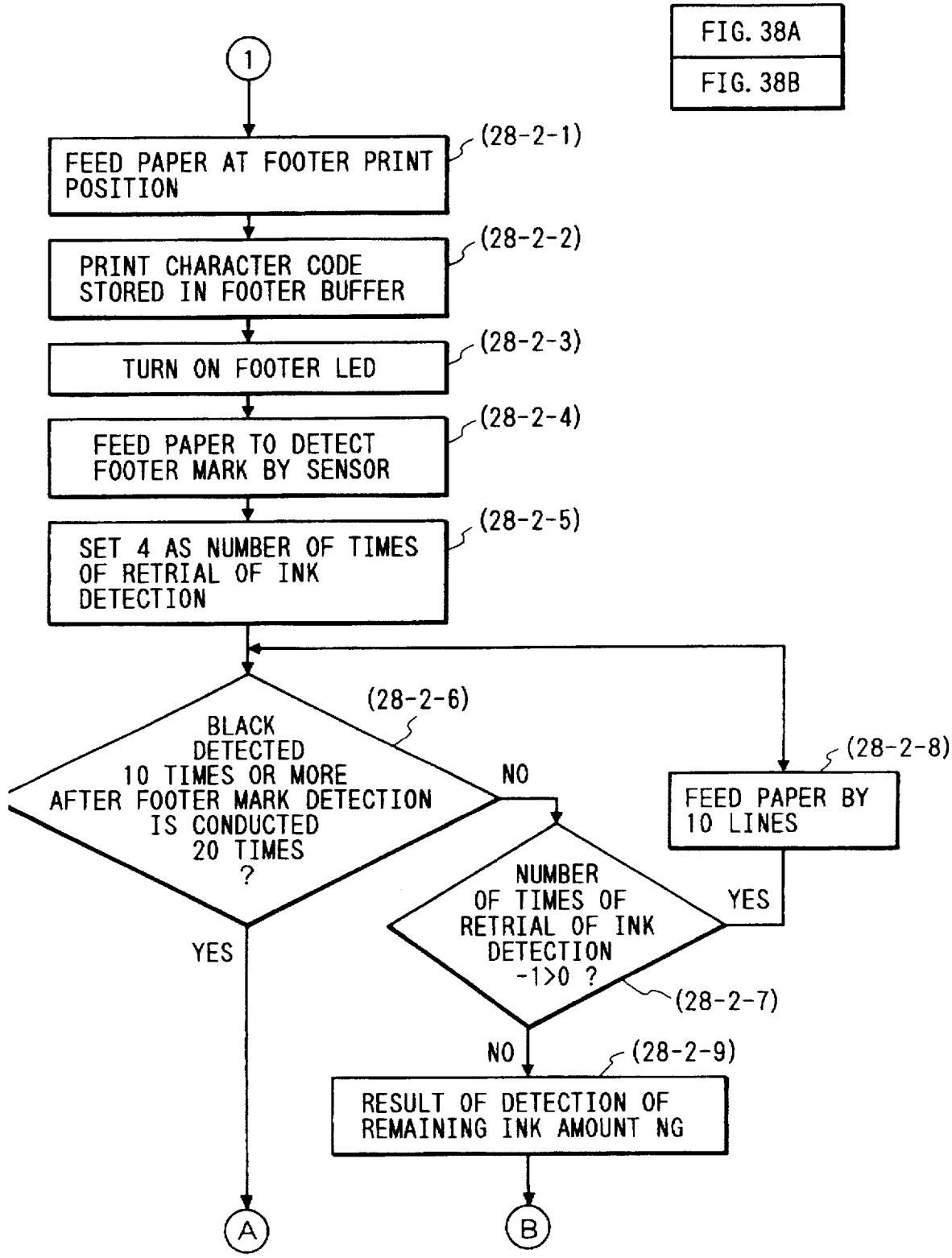

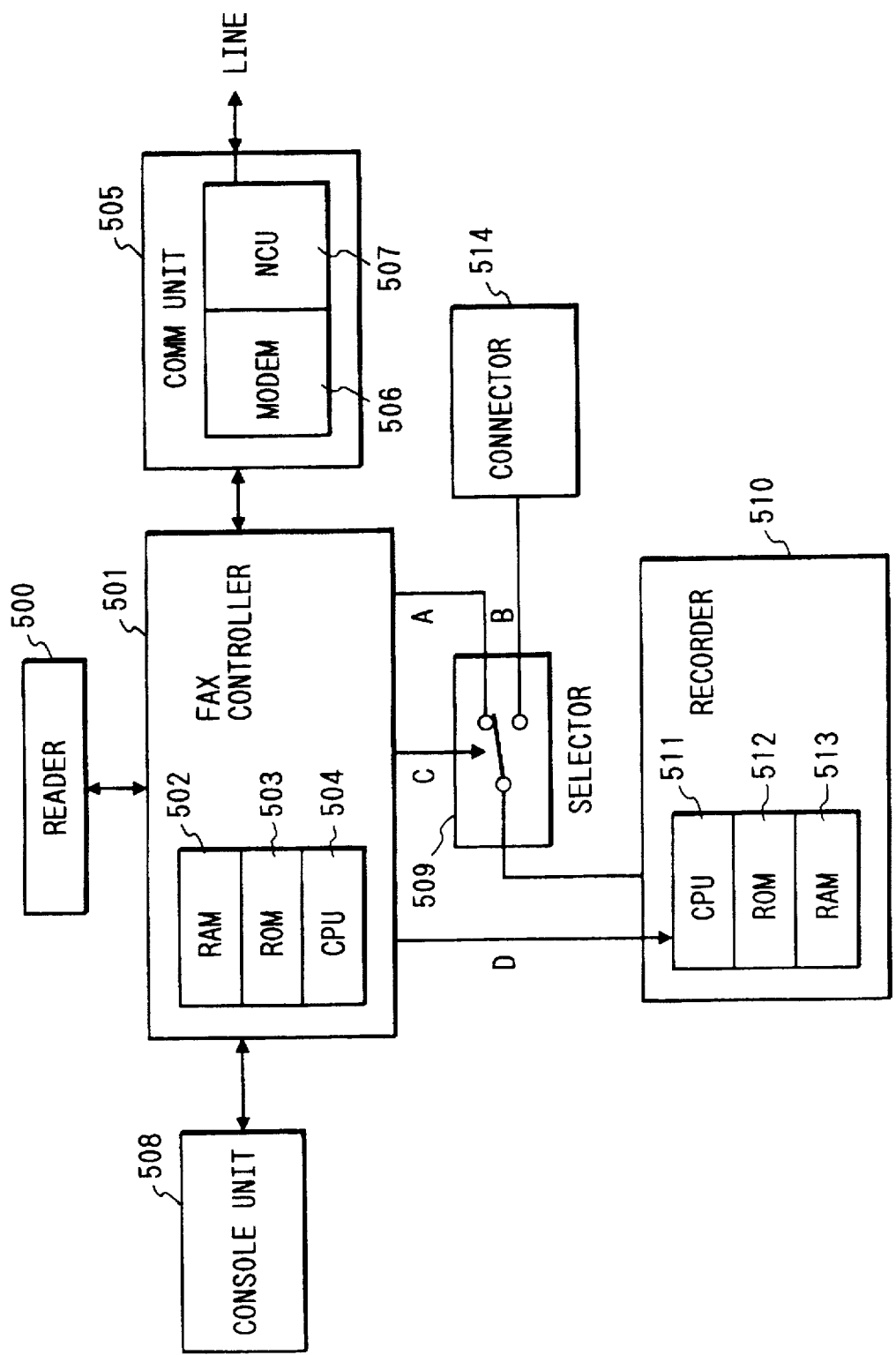

IMAGE RECORDING APPARATUS WITH RELIABLE, EFFICIENT AND POWER-SAVING STAND-BY STATE

This application is a continuation of application Ser. No. 08/314,376 filed Sep. 28, 1994, now abandoned.

BACKGROUND OF THE INVENTION

The present invention relates to an image recording apparatus, which comprises a data process unit for receiving and processing image data, and records an image on a recording medium in accordance with image data from the data process unit.

A conventional facsimile apparatus comprising a facsimile (FAX) unit and a printer unit has the following arrangement (FIG. 50).

The FAX unit comprises an MPU 101 for controlling the operation of the entire FAX unit, a ROM 102 for storing control programs to be executed by the MPU 101, a RAM 103 used as a work area for the MPU 101 and an area for storing an image, a communication unit 104 for transmitting/receiving data, and an image reader 105 for reading an image.

The printer unit comprises an MPU 201 for controlling the operation of the entire printer unit, a ROM 202 for storing control programs to be executed by the MPU 201, and a RAM 203 used as an area for storing data to be printed supplied from the FAX unit, a work area for the MPU 201, and the like.

Furthermore, a signal line 301 for exchanging data between the FAX unit and the printer unit is arranged.

However, in the above-mentioned prior art, in a state wherein the power switch is ON, the power supplies of the FAX unit and the printer unit are always set in an ON state.

If the MPU 201 of the printer unit is always set in a standby state, when a recording request for a copying or reception operation from the MPU 101 of the FAX unit, a print request from an external personal computer (not shown), and the like are input in a complicated order, the MPU 201 of the printer unit may overrun due to, e.g., data left in the printer unit.

If the same initialization as that executed in a power-ON state is executed each time the printer unit is initialized, the time required for initialization is prolonged, resulting in a decrease in performance of the system as a whole.

In a state wherein the printer unit need not be in a power-ON state, i.e., a standby state of a FAX main body, or a mode such as a transmission mode which does require a print operation, the printer unit is set in the power-ON state, and an LED and the like are kept ON, thus unnecessarily consuming electric power.

If the LED of the printer unit is kept ON, a user may erroneously recognize that the printer unit is active even though the printer unit is inactive.

When an error state of the printer unit is detected upon error termination of the printer unit due to, e.g., a paper jam, and different error cancelling methods are set in correspondence with detected error states, error canceling operations become complicated.

A user cannot tell whether the printer unit is in a power-OFF state, is being initialized, or is in a standby state.

Since the standby state of the printer unit corresponds to a print standby state, in the case of an ink-jet recording system, nozzles of an ink-jet head easily cause clogging.

That is, if the printer unit is kept in the power-ON state after a print operation, the head is not immediately capped, and is kept uncapped for a while to wait for the next print data.

When the printer unit is used in the above-mentioned printer mode, the print operation may often be interrupted and restarted. As a means for interrupting the print operation in such a case, a method of setting the printer unit in an off-line state is known. This method is realized by depressing an on-line key.

However, when the on-line state is set again to restart the print operation, since the contents stored in a buffer memory before interruption are printed from the beginning, an unnecessary print operation must be performed until target information is output.

In order to prevent this, it has been conventionally proposed to reset the printer unit.

In this method, a reset key for the printer unit is arranged on an operational panel, and when the user resets the printer unit, the contents of the buffer are erased. More specifically, when the printer unit is reset before the print operation is restarted, target information can be immediately printed.

However, when the reset key is arranged, the operational panel becomes complicated. In particular, in an apparatus of this type, since keys for the FAX mode and keys for the printer mode are present on a single operational panel, and the number of keys is very large, not only a user may feel that the apparatus is not easy to use, but also each key size actually becomes small and the sizes of letters indicating each key function become small. Therefore, when the reset key is arranged, the apparatus becomes inconvenient to use.

SUMMARY OF THE INVENTION

The present invention has been made in consideration of the above situation, and has as its object to provide an improved image recording apparatus.

It is another object of the present invention to provide an image recording apparatus, which can prevent an erroneous operation of a recording unit and can improve reliability of the apparatus.

It is still another object of the present invention to provide an image recording apparatus which can execute an initialization operation of a recording unit at high speed.

It is still another object of the present invention to provide an image recording apparatus which can prevent wasteful power consumption.

It is still another object of the present invention to provide an image recording apparatus which can easily restart a recording operation when an error has occurred in a recording unit.

It is still another object of the present invention to provide an image recording apparatus which can efficiently perform a print operation after the print operation is interrupted in a printer mode.

It is still another object of the present invention to provide an image recording apparatus which performs a first initialization process when the power supply of the apparatus is turned on, so as to set a recording unit in a standby state, and thereafter, performs a second initialization process upon generation of an initialization factor.

It is still another object of the present invention to provide an image recording apparatus which performs initialization when the power supply of the apparatus is turned on, so as to set a recording unit in a standby state, and limits power consumption of members except for recording control means in the recording unit in the standby state.

It is still another object of the present invention to provide an image recording apparatus which performs a first initialization process when the power supply of the apparatus is turned on, so as to set a recording unit in a standby state, performs a second initialization process in response to a recording start request or a recording mode setting request later, and stands by in a state wherein the first initialization process has been finished when an operation of the recording unit is terminated with an error.

It is still another object of the present invention to provide an image recording apparatus which executes a power-ON process for a recording unit in response to a recording start request or a recording mode setting request, and executes a power-OFF process for the recording unit upon completion of recording or recording mode setting.

It is still another object if the present invention to provide an image recording apparatus which initializes a recording unit in accordance with a selection operation of a selection means for selecting a recording mode.

The above and other objects of the present invention will become apparent from the following detailed description taken in conjunction with the accompanying drawings.

BRIEF DESCRIPTION OF THE DRAWINGS

FIG. 2 is a diagram for explaining signal lines between a facsimile unit and a printer unit in the facsimile apparatus shown in FIG. 1;

FIG. 3 is a sectional view showing the arrangement of the facsimile apparatus shown in FIG. 1;

FIG. 4 is a sectional view of the facsimile apparatus in a state wherein original sheets are set;

FIG. 13 is a flow chart for explaining the multi-copy operation;

FIG. 16 is a flow chart for explaining the received image output operation;

FIG. 39 is a block diagram of a facsimile apparatus according to the second embodiment of the present invention;

DETAILED DESCRIPTION OF THE PREFERRED EMBODIMENTS

Figure 1:
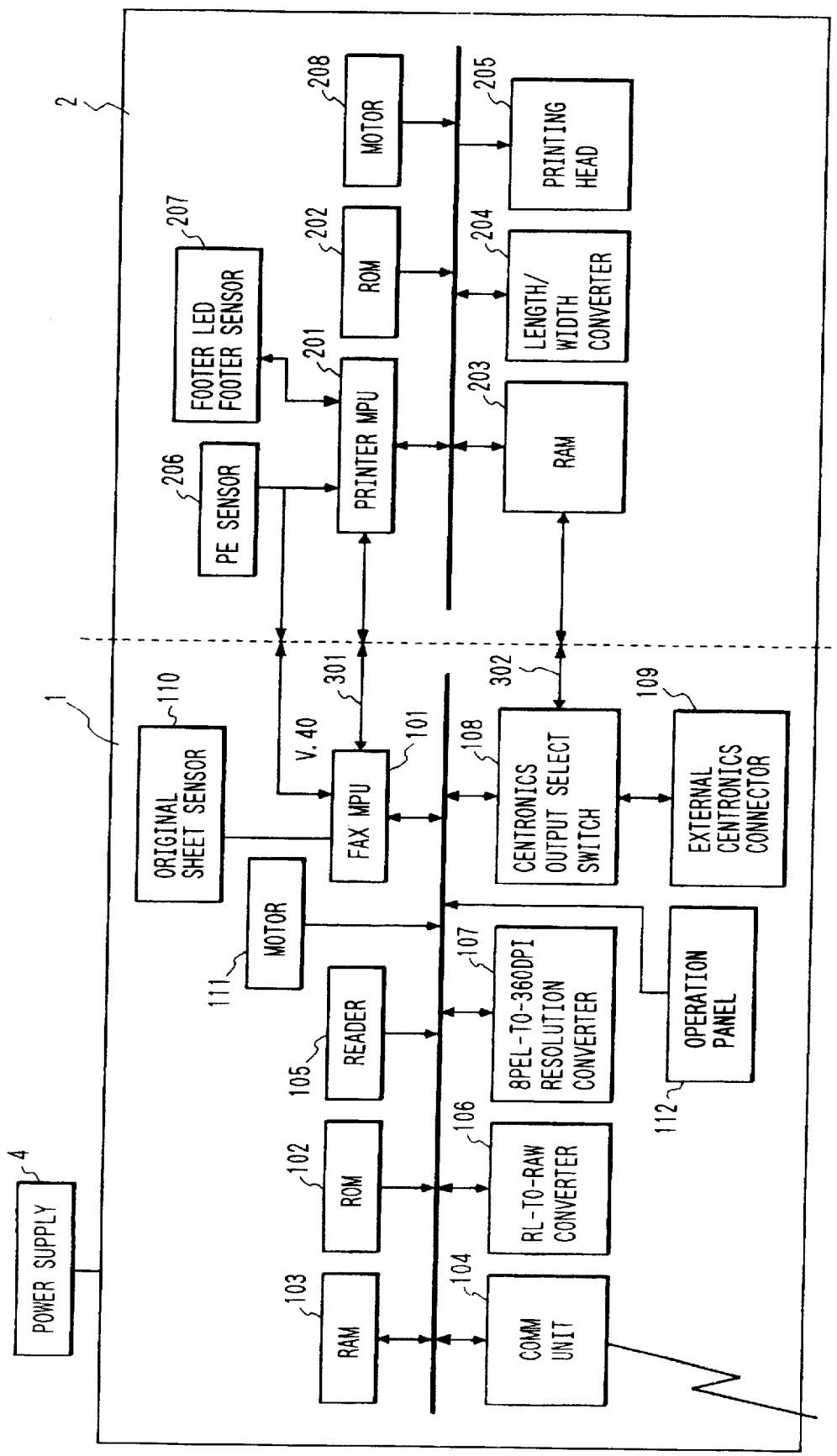
FIG. 1 is a block diagram showing the arrangement of a facsimile apparatus to which the present invention is applied.

The present invention will be described in detail hereinafter with reference to its preferred embodiments.

(First Embodiment)

FIG. 3 is a sectional view showing the arrangement of a facsimile (FAX) apparatus to which the present invention is applied.

On an original tray 305, an original sheet to be FAX-transmitted or copied is placed with its image surface facing down. An actuator 301 is started by an original sheet, and sets an original detection sensor 110 comprising a reflection type sensor in an inactive state when no original sheet is set. The center of gravity of the actuator 301 is set so as to set the original detection sensor 110 in an inactive state when the FAX apparatus is placed, as shown in FIG. 3.

A roller 304 is used for feeding an original sheet to a read position, and feed rollers 306, 307, and 308 are used for feeding an original sheet on a reader 309 having a contact sensor at a proper speed.

A paper cassette 310 stores a plurality of cut sheets (recording paper sheets) of a predetermined size. The recording paper sheets stored in the paper cassette 310 are picked up one by one upon operation of a pickup roller 313, and the picked-up sheet is fed to the position of a recording paper tail edge sensor (PE sensor) 206 by recording paper feed rollers 311.

The recording paper sheet fed to the position of the PE sensor 206 is further fed on the recording position by the rollers 311 and rollers 303 and 312.

A recording head 205 is used for performing ink-jet recording. The recording head 205 is repetitively moved in the main scanning direction (a direction perpendicular to the plane of the drawing of FIG. 3) by a scanning mechanism (carriage; not shown), thus sequentially recording an image on the recording paper sheet. The recording head 205 of this embodiment is of a type for ejecting ink droplets from ejection orifices by causing a change in state in an ink using heat energy. The recording head 205 has 64 nozzles in the sub-scanning direction, and can record an image at a resolution of 360 dpi.

The PE (recording paper tail edge) sensor 206 is used for detecting the leading and tail edges of the fed recording paper sheet. A footer sensor 207 is used for detecting a footer recorded on the recording paper sheet.

The pickup roller 313 for picking up a recording paper sheet from the cassette 310 is driven by a motor for driving the rollers 304 and 306 to 308 which are used for feeding an original sheet.

A recovery system unit 314 comprises a cap member for capping the ejection orifices of the recording head 205, a suction pump, and the like. In an auto-recovery or manual recovery mode, the recovery system unit 314 starts the suction pump while the ejection orifices of the recording head 205 are capped by the cap member, thereby discharging an ink from the ejection orifices.

The discharged ink is guided to a discharged ink tank 315.

Figure 6:
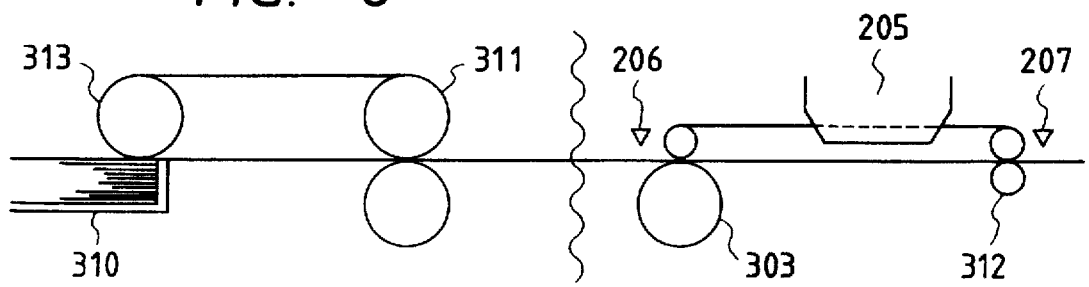
FIG. 6 is a view showing a recording paper feed system of the facsimile apparatus.

FIG. 6 is a view showing the arrangement of a recording paper feed system.

A recording paper sheet fed from the cassette 310 by the pickup roller 313 is fed by the feed rollers 311, and after the leading edge of the recording paper sheet is detected by the PE sensor 206, the recording paper sheet is fed by a predetermined amount to be set at the record position of the recording head 205. The recording head 205 performs main scanning to record a band having a recording width corresponding to 64 nozzles. Upon completion of the main scanning, the recording paper sheet is fed by a distance corresponding to the recording width to achieve sub-scanning. By repeating the main scanning and the sub-scanning a plurality of number of times, an image for one page is recorded. After the image for one page is recorded, a footer mark for detecting the presence/absence of an ink is recorded on the tail edge portion of the recording paper sheet, and is detected by the footer sensor 207. Thereafter, the presence/absence of the ink is discriminated in accordance with the detection result of the sensor 207.

FIG. 1 is a block diagram showing the arrangement of the FAX apparatus to which the present invention is applied. The FAX apparatus of this embodiment comprises a FAX unit 1 on the left side of a dotted line, and a printer unit 2 on the right side thereof.

The FAX unit 1 executes various functions of the FAX operations such as a facsimile communication, image reading, image memory management, user registration, and the like, except for an image recording operation. The printer unit 2 executes recording operations of a copy image, received image, and externally input image.

The FAX unit 1 comprises the following components. A FAX MPU 101 is used for controlling the operations of the FAX unit 1. A ROM 102 stores program codes, initial value data, table data, TTi font data, and the like. The TTi font data stored in the ROM 102 are those used for transmission source information to be added to image data upon transmission of image data, and have characters such as numerals, English letters, katakana characters, symbols, and the like.

A RAM 103 is allocated with an image storage buffer, read line buffers, record line buffers, a user registration data area, a work area, and the like. The image storage buffer is a buffer for storing received image data or non-printed image data, and is also called an image memory. The read line buffers include line buffers having a total capacity corresponding to four lines of raw image data after reading (216 bytes×4 lines), and the record line buffers include line buffers having a total capacity corresponding to four lines of raw image data (including commands) before recording (400 bytes×4 lines).

A communication unit 104 comprises an image communication modem, an NCU, and the like.

A reader 105 comprises a contact sensor for reading an image, an image process LSI for executing an image process of a read image, and the like, and performs read control.

A converter 106 is used for converting image data in a run length (RL) format software-decoded by the FAX MPU 101 into raw image (RAW) data.

A resolution converter 107 is used for converting raw image data having a resolution, in the main scanning direction, of 8 pel/mm on the side of the FAX unit 1 into raw image data having a resolution, in the main scanning direction, of 360 dpi (dots per inch) on the side of the printer unit 2.

A select switch 108 is used for selecting data to be transferred to the printer unit via a Centronics interface and, more specifically, a Centronics output select switch which performs a select operation in accordance with an instruction from the FAX MPU 101, i.e., depending on a FAX mode in which the printer unit operates as a recording system of the FAX unit 1 or a printer mode in which the printer unit operates as a printer of an external device such as a wordprocessor, a personal computer, or the like.

An external Centronics connector 109 complies with the Centronics standards, and is used for connecting an external device in the printer mode.

An original sheet sensor 110 detects an original sheet, a motor 111 is used for picking up an original sheet or a recording paper sheet, and an operational panel 112 includes a keyboard having a copy key, a printer key, and the like.

The arrangement of the printer unit 2 will be explained below.

The printer unit 2 has the following arrangement.

A printer MPU 201 is used for controlling the operations of the printer unit 2. A ROM 202 stores program codes, initial value data, table data, various font data, and the like. A RAM 203 is allocated with a reception buffer, a raster buffer, a text buffer, a print buffer, a footer buffer, a work area, and the like. The reception buffer is a buffer for temporarily holding received data since the Centronics output select switch 108 of the FAX unit 1 transfers data at high speed. The raster buffer is a buffer used when the printer MPU analyzes data in the reception buffer in units of bytes to extract only print data. The text buffer is a buffer used when the printer MPU analyzes data in the reception buffer in units of bytes to extract only character codes. The print buffer is a print data buffer used immediately before a print operation, and has areas having a capacity for two scans (360 bytes×64 nozzles×2 scans), which areas are alternately used. The footer buffer is a character code buffer used for printing footer characters.

A length/width converter 204 is used for storing print data in the raster buffer of the width format into the print buffer of the length format, and the printing (recording) head 205 ejects an ink by a heater driver.

The above-mentioned PE (recording paper tail edge detection) sensor 206 detects the leading and tail edges of a recording paper sheet.

The footer sensor 207 comprises an LED light source for footer detection, and a light-receiving element for detecting light reflected by a footer mark. The footer sensor is a sensor used for detecting the remaining ink amount in an ink cartridge, and detects whether or not a predetermined pattern (footer mark) is printed at a predetermined position on a recording paper sheet.

A motor 208 is used for feeding a recording paper sheet.

Interfaces between the FAX unit 1 and the printer unit 2 will be explained below.

A signal line 301 connects the MPU 101 of the FAX unit and the MPU 201 of the printer unit, and will be described in detail later.

A Centronics interface (I/F) 302 connects the Centronics output select switch 108 and the RAM 203, and transfers, from the FAX unit 1, control commands, image data, and character code data in accordance with a general command system and a FAX command system. The Centronics output select switch 108 is connected to the external Centronics connector 109, and is connected, via the external Centronics connector 109, to an external device (not shown) such as a personal computer. With this arrangement, control commands, image data, and character code data from the external device are transferred to the printer unit 2 in accordance with the general command system.

The FAX mode and the printer mode are selected by the Centronics output select switch 108. A power supply 4 is connected to the FAX unit 1.

FIG. 2 is a diagram showing the details of the signal line 301. The signal line 301 includes two different signal line groups, i.e., a signal line group 301-1 extending from the MPU 101 of the FAX unit to the MPU 201 of the printer unit, and a signal line group 301-2 extending from the MPU 201 of the printer unit to the MPU 101 of the FAX unit.

The signal line group 301-1 extending from the MPU 101 of the FAX unit to the MPU 201 of the printer unit includes the following lines.

(1) Reset Signal Line

This line is used when the power supply is turned on and when an abnormality of the printer unit 2 is to be canceled.

(2) Auto-recovery Inhibit Signal Line

This line is used when the auto-recovery operation of the printer unit 2 is to be inhibited. More specifically, this line is used when no auto-recovery operation is required, in a service man mode, and in an assembling process in the factory. That is, this line is used for preventing an ink leakage occurring when a recovery operation is performed in a stand-up state of the main body, as will be described later.

(3) FAX Mode Signal Line

This line is used for informing, to the printer unit 2, that the apparatus is operating in the FAX mode. The FAX command system (to be described later) can be used only when the FAX mode signal line is active. The printer MPU 201 discriminates, using this FAX mode signal line, whether data and commands sent to the printer unit 2 via the Centronics I/F 302 are those from the FAX unit 1 or from an external computer.

(4) Emulation Mode Signal line

This line is used for informing, to the printer unit 2, the type of emulation mode in the printer mode. The emulation mode can be changed in a user registration operation. This signal line is used for selecting a command system since the printer uses different command systems depending on the types of external devices.

(5) Soft Power Switch Signal Line

This line is used for ON/OFF-controlling the power supply of the printer unit 2 in a software manner. The power supply of the printer unit 2 is turned on in a software manner using this soft power switch signal line when the power supply is turned on, before and after the print operation, when a printer setting registration is changed, and when the operation mode is transferred to the printer mode. This line will be described in detail later.

(6) On-line Switch

This line is used for controlling the on- or off-line state between the FAX unit 1 and the printer unit 2.

The signal line group 301-2 extending from the MPU 201 of the printer unit to the MPU 101 of the FAX unit will be explained below.

(7) Idle Signal Line

This line is used for informing, to the FAX unit 1, the idle state of the printer unit 2. The idle state means a state wherein the printer unit 2 has processed all the received control commands. When the printer unit 2 is not in the idle state, the FAX unit 1 must not perform a soft power-OFF process of the printer unit 2.

(8) Paper Feed Request Signal Line

This line is used for informing, to the FAX unit 1, that the printer unit 2 is about to feed a recording paper sheet. In the FAX mode, when data to be printed is received from the FAX unit 1, or when print data has a length exceeding one recording paper sheet, the paper feed request signal line is used. In the printer mode as well, when data to be printed is received from an external device, or when print data has a length exceeding one recording paper sheet, the paper feed request signal line is used. Exceptionally, the paper feed request signal line is also used in a paper feed operation in a test print mode in the printer mode.

(9) Remaining Ink Amount Detection Output Signal Line

This line is used for informing, to the FAX unit 1, that the ink presence/absence result has been discriminated. This line achieves a function in combination with a remaining ink amount detection result signal line in the next item. The facsimile apparatus of this embodiment has a remaining ink amount detection function which is enabled during only a print operation of a received image in the FAX mode, and which is provided for the following reason. The received image must be reliably printed due to its nature. Therefore, when an ink is used up, a message indicating this is informed to the FAX unit 1. The FAX unit 1 stores the received image in the memory, and displays, e.g., a message for urging a user to exchange a cartridge. Thereafter, the printer unit attempts to print the received image again. As a method of detecting the remaining ink amount, footer print detection is performed. In the footer print detection, a remaining ink amount detection mark (footer) is printed at a predetermined position on the tail edge portion of each page of a received image, and the mark is detected by a photosensor. If the output from the photosensor indicates "black", the presence of an ink is determined; if the output from the photosensor indicates "white", the absence of an ink is determined.

(10) Remaining Ink Amount Detection Result Signal Line

This line is used for informing the ink presence/absence result to the FAX unit 1. This line achieves a function in combination with the remaining ink amount detection output signal line in the previous item. When the absence of an ink is detected, after this remaining ink amount detection result signal is output, the remaining ink amount detection output signal line in the above item is activated. Therefore, the FAX unit 1 refers to this remaining ink amount detection result signal after it confirms the remaining ink amount detection output signal line in the above item, thus detecting the presence/absence of an ink. The remaining ink amount detect process will be described later.

(11) Color Recording Paper Signal Line

This line is used for informing, to the FAX unit 1, that the recording paper sheet is color paper. This line achieves a function in combination with the remaining ink amount detection output signal line in the second previous item. When it is detected that the recording paper sheet is color paper, the remaining ink amount detection output signal line in the second previous item is activated after this color recording paper signal is output. Therefore, the FAX unit 1 refers to this remaining ink amount detection result signal after it confirms the remaining ink amount detection output signal line in the above item, thus determining whether or not the recording paper sheet is color paper. The remaining ink amount detect process will be described later.

(12) Cartridge Presence/absence Signal Line

This signal line is used for informing the presence/absence of an ink cartridge to the FAX unit 1. When the printer unit 2 successively detects a cartridge absence or presence state 16 times in timer interrupts at 100-msec intervals, it changes the cartridge presence/absence signal line. Upon detection of the absence of a cartridge based on this cartridge presence/absence signal line, the FAX unit 1 displays a message for urging a user to attach a cartridge on, e.g., an LCD display, and inhibits a print operation in the FAX mode.

(13) Normal/wrong Cartridge Signal Line

This line is used for informing, to the FAX unit 1, if the cartridge is normal. When the printer unit 2 successively detects a wrong or normal cartridge attached state 16 times in timer interrupts at 100-msec intervals, it changes the normal/wrong cartridge signal line. Upon detection of attachment of a wrong cartridge based on the normal/wrong cartridge signal line, the FAX unit 1 displays a message for urging a user to attach a normal cartridge on, e.g., an LCD display.

(14) Soft Power Signal Line

This line indicates the power state in a software manner. In the FAX mode, this signal line indicates an ON state during a print operation and a recovery operation. On the other hand, in the printer mode, this signal line always indicates an ON state independently of a recording operation or a standby state.

(15) On-line Signal Line

This line indicates the on- or off-line state of the printer unit 2 in the FAX mode. In the off-line state, commands using the Centronics I/F are not accepted.

(16) Error Signal Line

This line indicates the error state of the printer unit 2.

The command system will be described in detail below.

The command system using the Centronics I/F 302 includes a general command system and a FAX command system.

The general command system is one to be generally used, and can be used in both the FAX mode and the printer mode. The command system set in the printer mode can be changed by a user registration operation.

The FAX command system is a special command system prepared for functions, which cannot be realized by only the general command system. Since this command system realizes special functions, it is supported in only the FAX mode. When commands in the FAX command system are received while the printer unit is in the printer mode, such commands are ignored.

The FAX command system includes the following commands.

(1) Printer Setting Command

This command is associated with initial setting of the printer unit 2. This command is used when the power supply is turned on, when the printer setting registration is to be changed, when a recording paper sheet is fed or discharged in the FAX mode, and when the FAX mode is abnormally terminated.

(2) Bi-directional Print Correction Command

This command is used for correcting a print offset between forward and backward paths upon execution of a bi-directional print operation. This command is used when the power supply is turned on and when a recording paper sheet is fed in the FAX mode. Since the printer unit 2 adopts a shuttle print system for recording an image while moving the head having a plurality of ink ejection orifices in the main scanning direction via the carriage, a value for correcting a print offset between forward and backward scans is transferred to the printer unit 2 as a value for each print mode or for each apparatus. The printer unit 2 performs bi-directional print correction in the soft power-ON process and immediately before the beginning of a print operation.

(3) Bi-directional Print Command

This command is associated with a bi-directional or uni-directional print mode. This command is used when a recording paper sheet is fed in the FAX mode. This command transfers, to the printer unit, a bi-directional or uni-directional print mode selected in the user registration operation (which mode is separately set in correspondence with an image print operation and a character code print operation in the FAX mode). In the printer mode, the operation does not comply with the user registration contents.

(4) Footer Print Command

This command includes data indicating whether or not a received information footer is printed, data indicating whether or not the remaining ink amount is detected, the number of scans corresponding to the beginning of recording paper tail edge detection, and footer character codes. This command is used when recording paper sheets are fed in units of pages of a received image.

The received information footer is information characters including a date of reception of an image by the own apparatus, a reception number, a received image page number, and the like. When it is set in the user registration contents that the received information footer is to be printed, the printer prints information characters, which are developed using font data of the printer on a received image, on the tail edge portion of a recording paper sheet immediately before the recording paper sheet is discharged. When it is set in the user registration contents that the remaining ink amount is to be detected, the printer prints a remaining ink amount detection mark (footer) in the same scan as the received information footer, and performs the remaining ink amount detect process.

(5) FAX Image Command

This command is used for transferring the conversion ratio of resolution conversion in the sub-scanning direction together with image data for one line. This command is used when a received image, a copy image, and an untransmitted image are printed. Resolution conversion in the main scanning direction is realized by a hardware circuit (8 pel-to-360 dpi resolution converter 107), but resolution conversion in the sub-scanning direction is realized in a software manner. A software program of the MPU 101 in the FAX unit 1 calculates the conversion ratio, and transfers the calculated conversion ratio of the resolution conversion together with image data for one line in this command. On the other hand, a software program of the MPU 201 of the printer unit 2, which received image data for one line and the conversion ratio, expands the image data for one line on the basis of the received conversion ratio, and prints the expanded data.

(6) FAX Reset Command

This command is used for initializing various flags of the printer unit used in the FAX mode. This command is used when a recording paper sheet is discharged in the FAX mode.

The following operations will be described in detail below:

Operation upon Power-ON

Operation in Standby State

Copy Operation

Received Image Output Operation

Report Output Operation

Operation in Printer Mode

[Operation upon Power-ON]

The operation upon power-ON will be described below with reference to FIGS. 7, 8, and 9.

When the power supply of the FAX apparatus is turned on, the FAX unit 1 initializes peripheral devices (the communication unit, reader, RL-RAW converter, and the like) (7-1), and thereafter, resets the printer unit 2 via the reset signal line to the printer unit 2 (7-2). After an elapse of a wait time of 100 msec (7-3), the MPU 101 executes a soft power-ON process of the printer unit via the soft power switch signal line of the signal line 301 (7-4), and checks an error (7-5). In this case, the MPU 101 waits for 100 msec to wait for the end of initialization which is executed by the printer unit 2 simultaneously with the power-ON operation. If an error is detected, an error message is displayed (7-6), and thereafter, a soft power-OFF process is executed (7-8). If no error is detected, a printer setting process is executed (7-7) to complete final initialization of the printer unit. Thereafter, the soft power-OFF process is executed (7-8), and the printer unit is set in a standby state. Thereafter, a memory clear report is output if necessary (7-9), and the FAX unit is set in a standby state.

Figure 7:
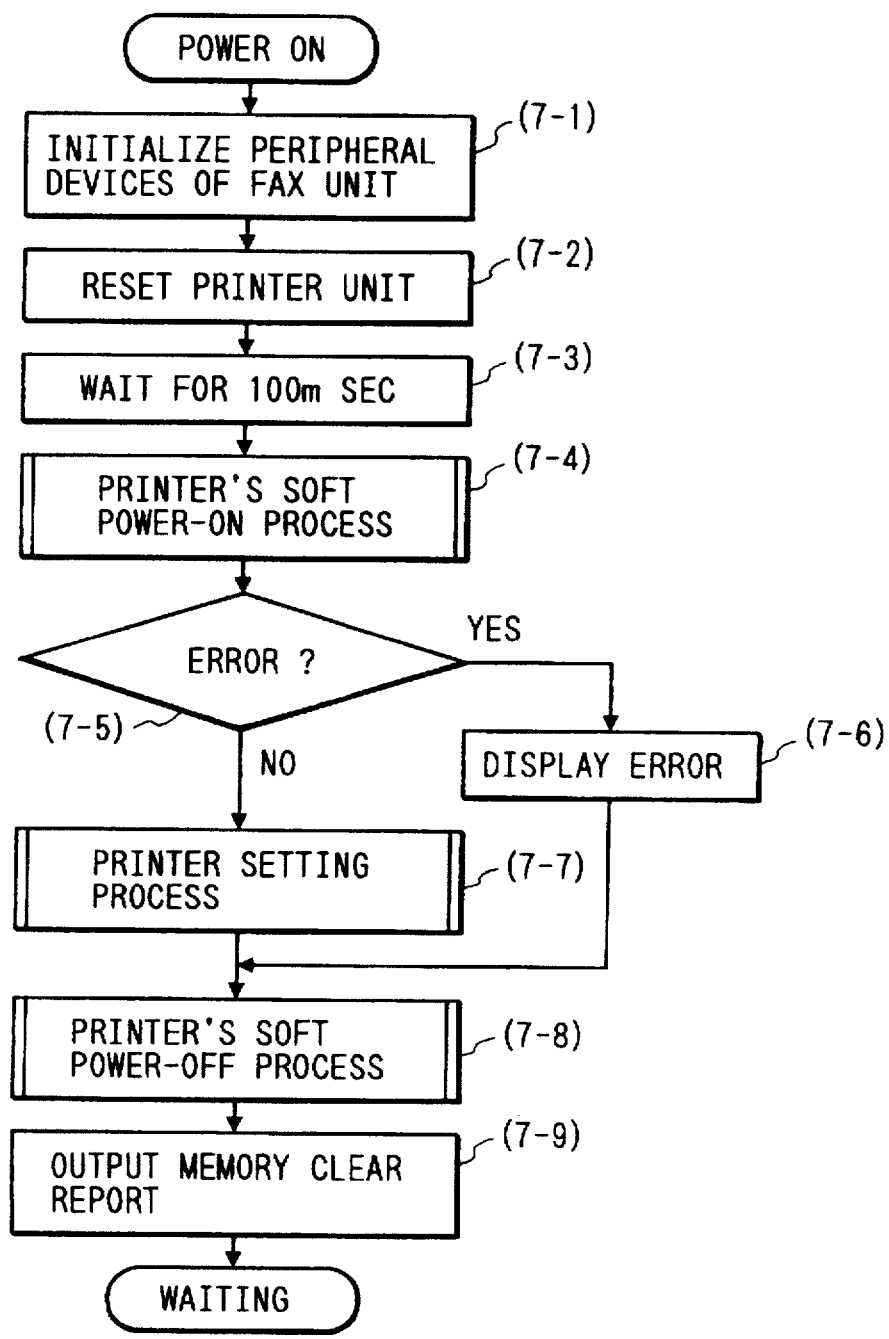
FIG. 7 is a flow chart for explaining the power-ON operation of the facsimile unit.
Figure 8:
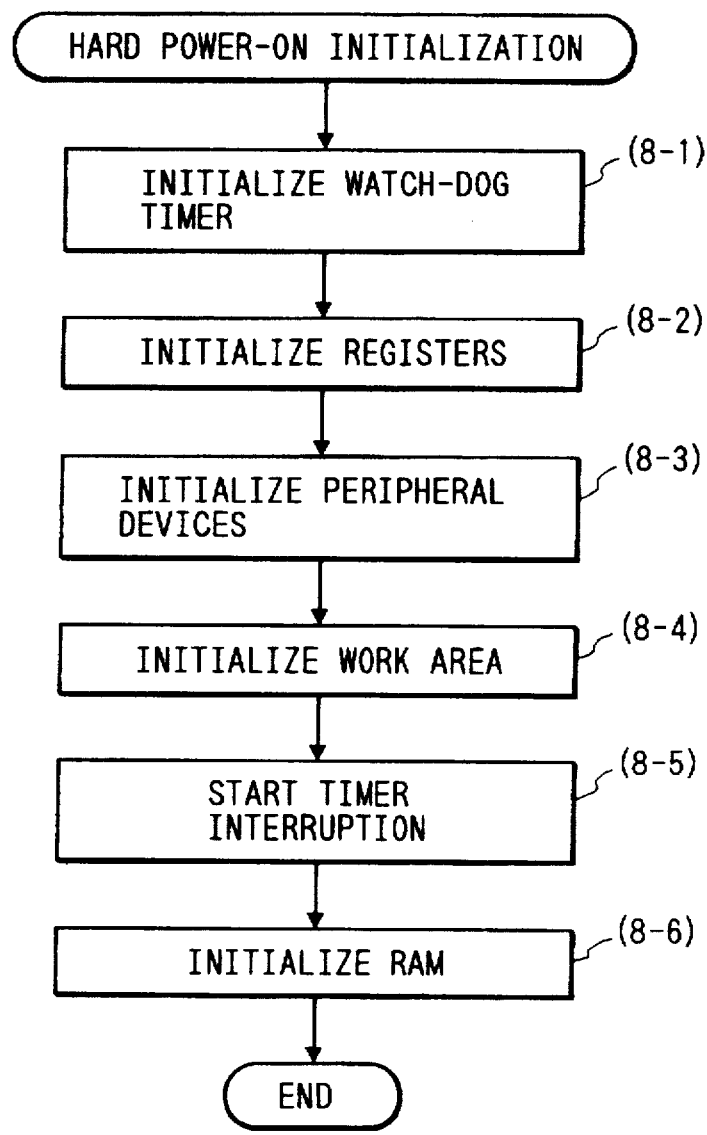
FIG. 8 is a flow chart for explaining the initialization operation executed in a power-ON state of the printer unit.

On the other hand, when the power supply is turned on, the printer unit 2 executes a hard power-ON initialization process shown in FIG. 8 in response to the reset signal output in step (7-2) in FIG. 7. In order to prevent overrun of the MPU 201, a watch-dog timer is initialized (8-1), and in order to prevent an erroneous operation of the MPU 201, registers are initialized (8-2). Furthermore, the peripheral devices such as the length/width converter 204, the Centronics I/F 302, and the like are initialized (8-3). In order to prevent an erroneous operation of the MPU 201 and to set initial values of parameters, the work area of the RAM is initialized (8-4). Thereafter, a timer interruption is started (8-5). Then, the RAM is initialized to erase data left in the buffers (8-6).

Figure 9:
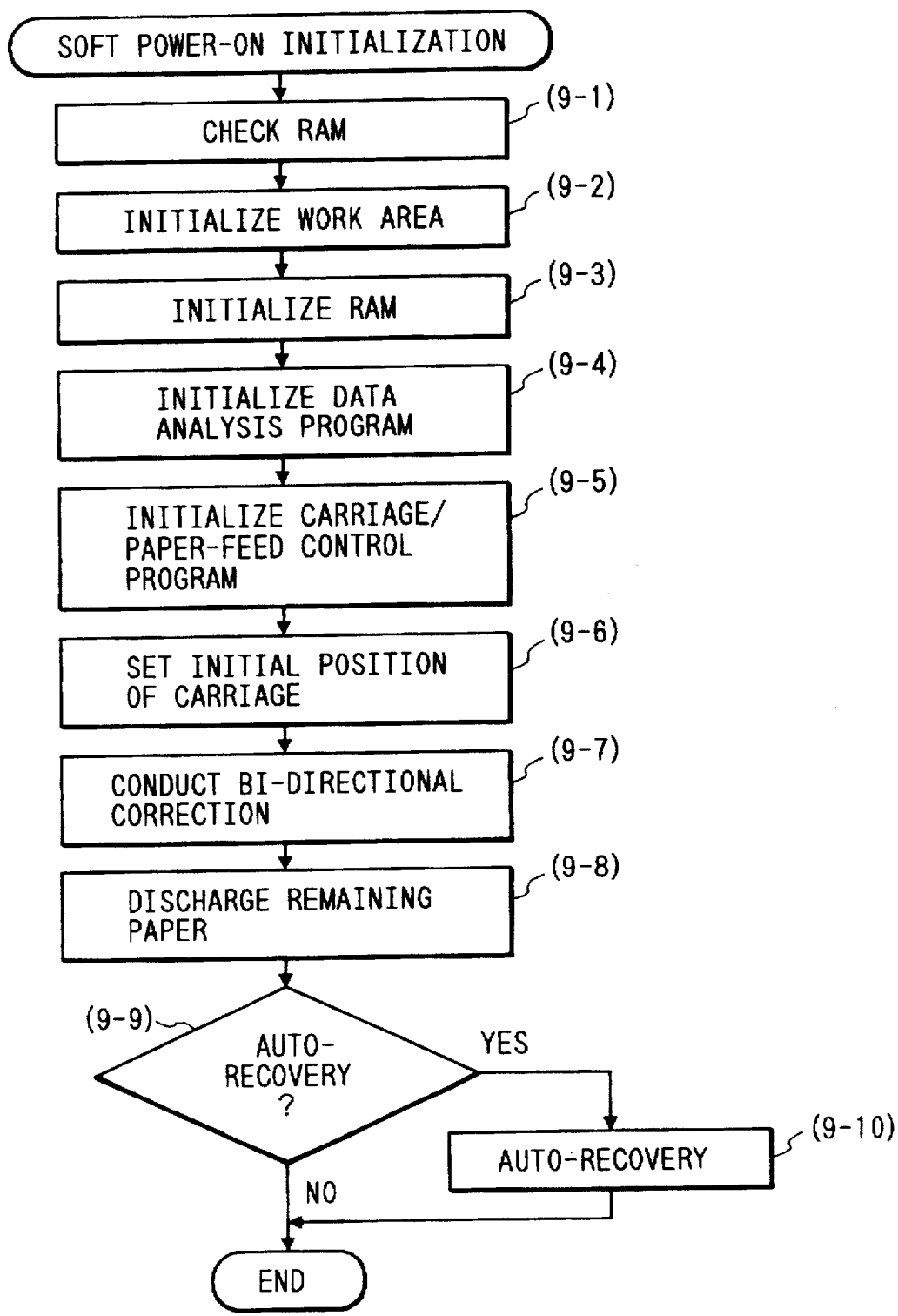
FIG. 9 is a flow chart for explaining the initialization operation executed in a soft power-ON state of the printer unit.

When the software power supply is turned on via the soft power switch signal line in the signal line 301 by the MPU 101 in the FAX unit 1, the printer unit 2 executes initialization upon soft power-ON (FIG. 9).

The FAX apparatus of this embodiment has three power supply states. In the first state, the power supply is turned off in a hardware manner, and no electric power is supplied to the printer unit 2 and the FAX unit 1.

In the second state, the power supply is turned on in a hardware manner, and electric power is supplied to both the FAX unit 1 and the printer unit 2. However, in this state, since the printer unit 2 is subjected to only the hard power-ON initialization process, and LEDs and the like are turned off, the printer unit 2 is apparently in the same state as a power-OFF state.

In the third state, the power supply is turned on in a hardware manner, electric power is supplied to both the FAX unit 1 and the printer unit 2, and the printer unit 2 is active (recording, printer setting, and the like).

These three states are prepared for the following reasons.

If the MPU 201 of the printer unit 2 is always set in a standby state, when a recording request of a copy or received image from the MPU 101 of the FAX unit 1 and a print request from an external device (not shown) are input in a complicated order, the MPU 201 of the printer unit 2 may overrun. In order to prevent this, each time a print request of a copy or received image is issued, the MPU 201 of the printer unit 2 is initialized. This is the first reason.

Each time the printer unit 2 is initialized, if the same initialization operation as that executed upon power-ON is executed, the time required for initialization is prolonged, and the performance of the system as a whole is lowered. This is the second reason.

The third reason is to prevent wasteful power consumption in a case wherein the LEDs and the like of the printer unit 2 are turned on even in a non-use state of the printer unit 2 such as a transmission mode or a memory reception mode.

The fourth reason is to prevent a user from erroneously recognizing that the printer unit 2 is active if the LEDs of the printer unit 2 are kept ON.

The fifth reason is to easily cancel an error state by initializing the printer unit 2 when the printer unit 2 is terminated with an error.

The initialization upon soft power-ON will be described below with reference to FIG. 9. In the initialization upon soft power-ON, only resources used after the soft power-ON process are initialized. First, the RAM is checked (9-1), and thereafter, the work area (9-2), the RAM (9-3), a data analysis program sent from the Centronics I/F (9-4), and a carriage/paper feed control program (9-5) are initialized in turn. The MPU 201 of the printer unit 2 initially sets the carriage position, i.e., the position of the printing head 205 using a home position sensor (not shown) (9-6). In this process, since the carriage position is recognized based on the number of pulses applied to a pulse motor for driving the carriage, the reference position of the carriage is set using the home position sensor. Thereafter, in order to conduct bi-directional correction, the carriage is moved forward from the reference position by a predetermined amount, and thereafter is moved backward, thus sampling the state of the home position sensor (9-7). That is, the number of pulses required for the forward movement and the number of pulses required for the backward movement are counted, and a correction value in the bi-directional print mode is calculated on the basis of these count values. When this correction value has exceeded a predetermined range, an error is determined, and the recording operation is disabled.

It is then checked using, e.g., the PE sensor 206 if a paper sheet remains in the unit, and if any remaining paper sheet is detected, it is discharged (9-8).

It is checked if an auto-recovery operation is performed (9-9). The auto-recovery operation is a process executed for preventing clogging of nozzles when the printing head 205 is an ink-jet type head. In this decision, it is checked if the MPU 101 of the FAX unit 1 inhibits the auto-recovery operation via the signal line 301. If the auto-recovery operation is to be performed in accordance with a condition (to be described later), the auto-recovery operation is performed (9-10), thus ending the initialization process. On the other hand, if the auto-recovery operation is inhibited, the initialization process directly ends.

The auto-recovery operation will be described below.

The auto-recovery inhibit signal line in the signal line 301 is used for inhibiting the auto-recovery operation of the printer unit 2 from the MPU 101 of the FAX unit 1. In the ink-jet recording system, a printing ink non-ejection state often occurs due to, e.g., clogging of printing ink ejection nozzles although the printing ink remains in the cartridge. An operation for preventing the printing ink non-ejection state is the auto-recovery operation, and is performed as follows. That is, after the ejection orifices of the printing head are recovered, the suction pump is driven to discharge the ink from the ejection orifices while the head is capped by the cap member in the unit 314. On the other hand, when the head has already suffered the non-ejection state, the above-mentioned operation can be performed by operating keys (not shown) to perform a manual recovery operation.

The auto-recovery operation is performed under the following conditions:

Hard power-ON

Lapse of 72 hours from the previous recovery operation

Exchange of cartridge

The auto-recovery operation is actually performed at the following timings:

Upon soft power-ON

Immediately before paper feed

Immediately after paper discharge

The time required for the auto-recovery operation is about 15 sec in the case of hard power-ON or the lapse of 72 hours, and is 30 sec in the case of the exchange of a cartridge. Therefore, when the FAX unit 1 determines that the auto-recovery operation is not required, the time can be prevented from being wasted by inhibiting the auto-recovery operation using the auto-recovery inhibit signal line.

By utilizing the fact that the output from an original sensor changes to a state indicating the presence of an original sheet when the housing is set in a stand-up state, the auto-recovery operation is inhibited in this situation. Thus, ink leakage upon execution of the auto-recovery operation in the stand-up state of the housing can be prevented.

This state will be explained below with reference to FIGS. 3 to 5.

Figure 5:
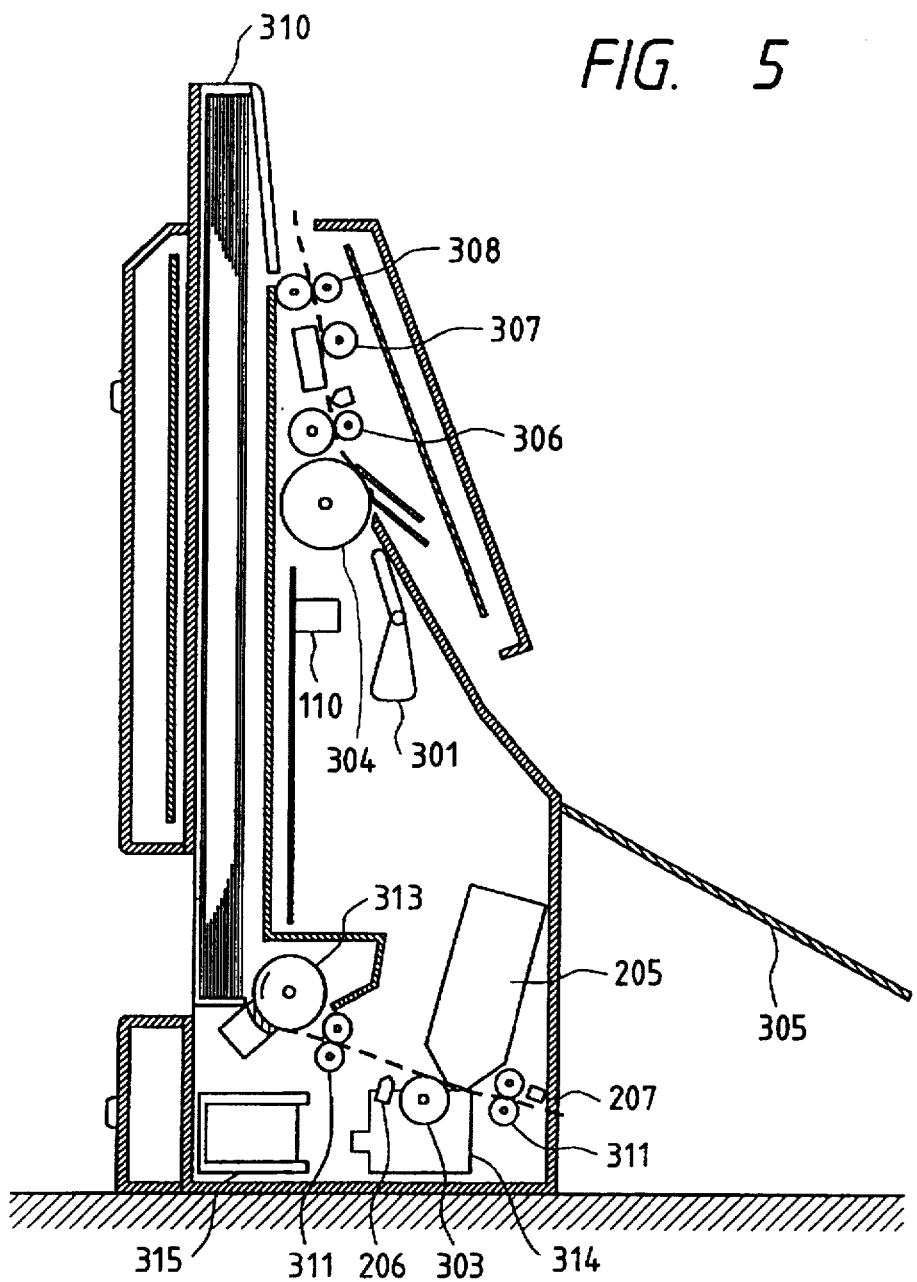
FIG. 5 is a sectional view of the facsimile apparatus in a stand-up state.

FIG. 3 shows a state wherein the housing is normally set, FIG. 4 shows a state wherein an original sheet is present, and FIG. 5 shows a state wherein the housing is set in a stand-up state. Referring to FIG. 3, the actuator 301 closes the original sheet sensor. On the other hand, due to the presence of an original sheet in FIG. 4, and due to the weight of the actuator in FIG. 5, the original sheet sensor 110 is not closed. Therefore, when the housing is set in the stand-up state, the original detection sensor 110 is set in the same state as in the original presence state. In this embodiment, by utilizing this output, the auto-recovery operation is inhibited.

Conditions for determining that "the auto-recovery operation is not required" are as follows.

(1) Assembling Process in Factory

Time can be prevented from being wasted by the auto-recovery operation during assembling, thus improving assembling efficiency. In addition, ink leakage upon assembling in a stand-up state of the housing can be prevented.

(2) Test Print

Time can be prevented from being wasted during the test print operation. If a printing ink non-ejection state occurs, a manual recovery operation is performed.

(3) When Original Sensor 110 Indicates Original Presence State upon Power-ON

The power supply may be turned on while the housing is set in the stand-up state, and in this state, ink leakage caused by the auto-recovery operation can be prevented.

(4) Printer Setting Process

During the printer setting process, a print operation is never performed, and hence, the auto-recovery operation is not required. Thus, time can be prevented from being wasted by the auto-recovery operation.

[Operation in Standby State]

The standby states after the end of initialization of the FAX unit 1 and the printer unit 2 will be described below with reference to FIGS. 10A to 11.

Figure 10C:
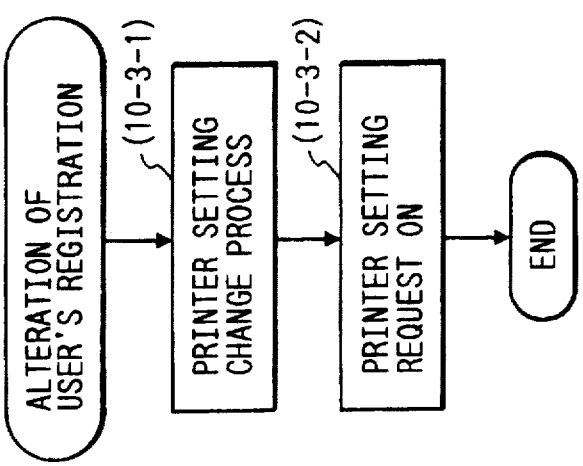
FIGS. 10A to 10C are flow charts for explaining the operation in a standby state of the facsimile unit.
Figure 10B:
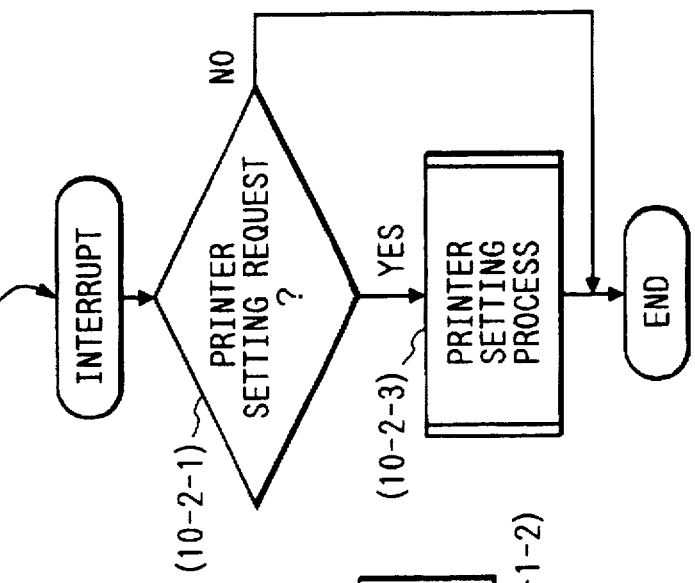
Figure 10A:
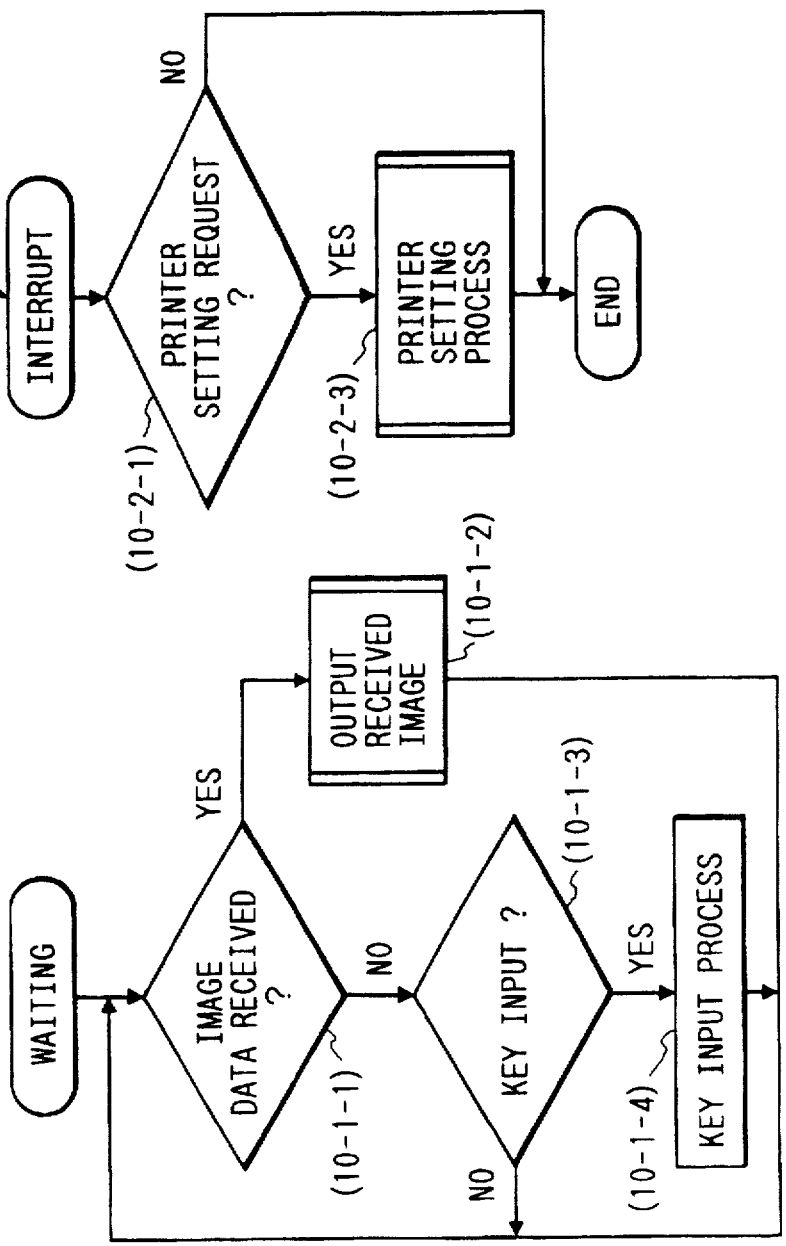

Standby State of FAX Unit (FIGS. 10A to 10C)

In the standby state of the MPU 101 of the FAX unit 1, the presence/absence of reception (10-1-1) and a key input by a user (10-1-3) are monitored. If image data is received, a received image is output (10-1-2); if a key input is made, a key input process is executed (10-1-4). In a timer interrupt, a printer setting request indicating whether the bi-directional or uni-directional print mode is set, whether or not a footer mark is printed, or the like is monitored (10-2-1). When the previous print operation is abnormally terminated or when the printer setting contents are changed in the user registration contents (10-3-1), the printer setting request is activated (10-3-2). If the printer setting request is activated (10-2-1), a printer setting process is executed (10-2-3).

Figure 11:
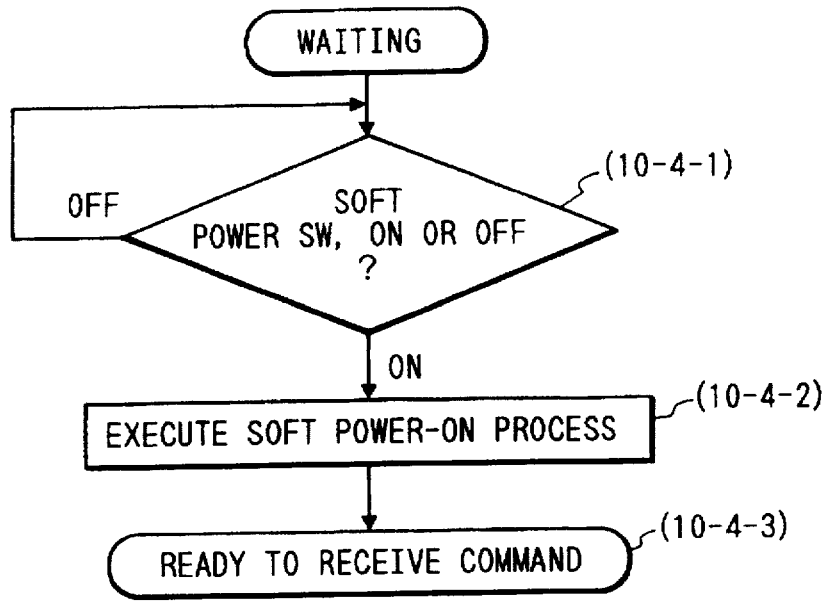
FIG. 11 is a flow chart for explaining the operation in a standby state in the printer unit.

Standby State of Printer Unit (FIG. 11)

The standby state of the MPU 201 of the printer unit corresponds to a soft power-OFF state, and it is monitored if the soft power switch signal line in the signal line 301 is changed to an ON state by the MPU 101 of the FAX unit 1 (10-4-1). As described above, the soft power switch signal line is changed to an ON state when the printer setting registration is changed or when the operation mode is transferred to the printer mode. When the soft power switch signal line is changed to an ON state, a soft power-ON process is executed (10-4-2), and the MPU 201 is ready to receive commands (10-4-3).

Initialization upon execution of the soft power-ON process has been described above with reference to FIG. 9.

[Copy Operation]

The copy operation will be described below.

When the copy operation is instructed by a key (not shown), different processes are executed depending on the number of sets of copies. More specifically, when the number of sets of copies is 1, a single copy operation is performed; when it is 2 or more, a multi-copy operation is performed.

Figure 12B:
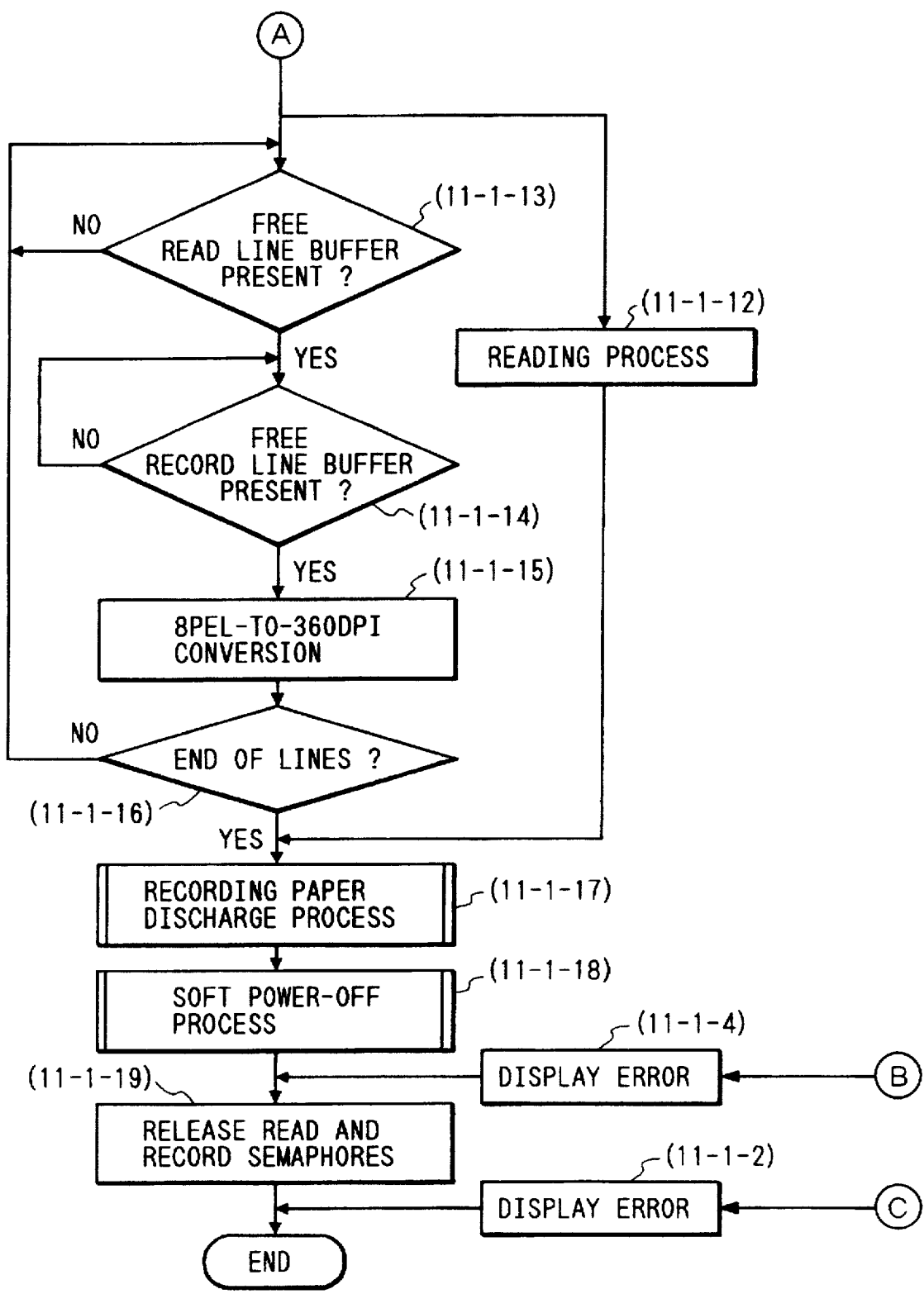
FIG. 12 is comprised of FIGS. 12A and 12B showing flow charts for explaining the single copy operation.

The single copy operation will be described below with reference to FIGS. 12A and 12B.

In this mode, the single copy operation is realized by converting the resolution of raw image data on an original sheet read by the original reader 102 using the resolution converter 107, and then transferring the converted data to the printer unit 2.

When the copy operation is performed, it is checked if the printer is ready (11-1-1). In the printer ready state, recording paper sheets are present, the ink cartridge is present, the recording cover is closed, no recording system error is detected, and the power supply of the printer unit is OFF. If the printer is not ready, an error message is displayed (11-1-2), and the copy operation ends. If the printer is ready, read and record semaphores are obtained (11-1-3). The record semaphore cannot be obtained when another task (reception, recording, transmission) is active. If at least one of the two semaphores cannot be obtained, the semaphores are released, and an error message is displayed (11-1-4), thus ending the copy operation. If both the semaphores can be obtained, a soft power-ON process is executed (11-1-5). If an error has occurred during the soft power-ON process (11-1-6), a compulsive soft power-OFF process is executed (11-1-7), an error message is displayed (11-1-4), and the semaphores are released. Thereafter, the copy operation ends. If no error is detected, a recording paper feed process is executed. If an error has occurred during the recording paper feed process, the compulsive soft power-OFF process is executed (11-1-10), a printer setting request is activated (11-1-11), an error message is displayed (11-1-4), and the semaphores are released (11-1-19). Thereafter, the copy operation ends.

If no error is detected in the recording paper feed process, reading and recording operations are started. These processes are parallelly executed.

In the original reading operation (11-1-12), a free read line buffer of the line buffers for four lines in the RAM 103 is searched for in a 10-msec timer interrupt (11-1-13). If no free read line buffer is found, the timer interrupt process ends. If a free read line buffer is found, the read line buffer is reserved, and a signal for triggering transfer of image data from the reading system is generated.

In the next timer interrupt, since the read line buffer reserved in the previous timer interrupt has already stored image data, the read line buffer is determined as a full buffer, and another free read line buffer of those for four lines is searched for again (11-1-14). This reading operation is repeated until the reading operation ends.

On the other hand, in the recording operation, a full read line buffer is searched, and image data read out from the full read line buffer is subjected to an 8 pel-to-360 dpi resolution conversion process (white data at the right end is ignored) by the resolution converter 107 (11-1-15), and thereafter, the converted data is developed on a free record line buffer. Thereafter, in an interrupt process of recording, image data is transferred, and the record line buffer is released. Upon repetition of the above-mentioned operation, the reading and recording operations end. As post-processes, a recording paper discharge process (11-1-17) and a soft power-OFF process (11-1-18) are executed, and the read and record semaphores are released (11-1-19). Thereafter, the single copy print operation ends.

Figure 14:
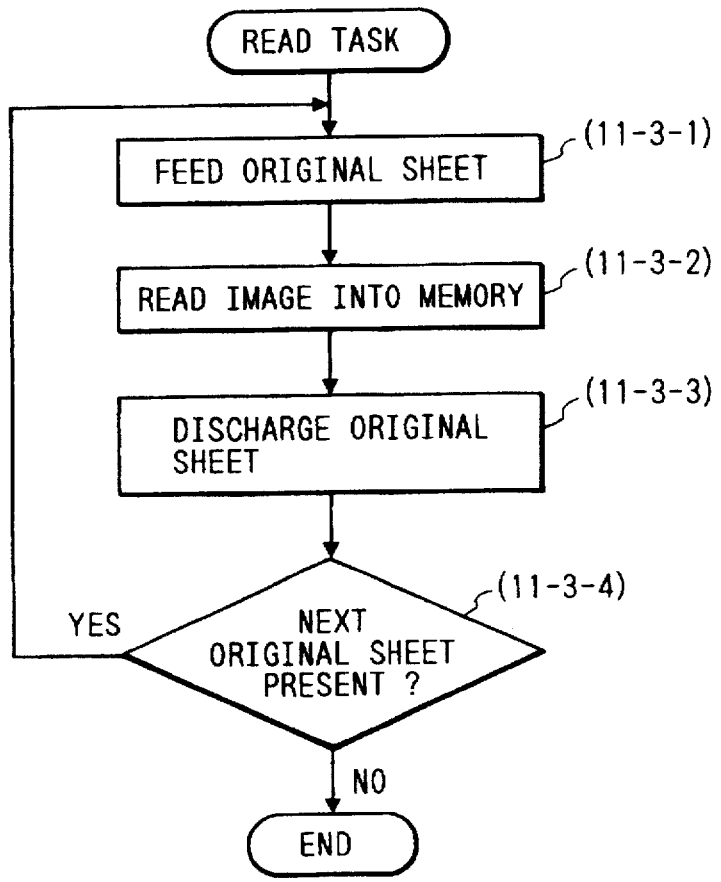
FIG. 14 is a flow chart for explaining the original read task.
Figure 15:
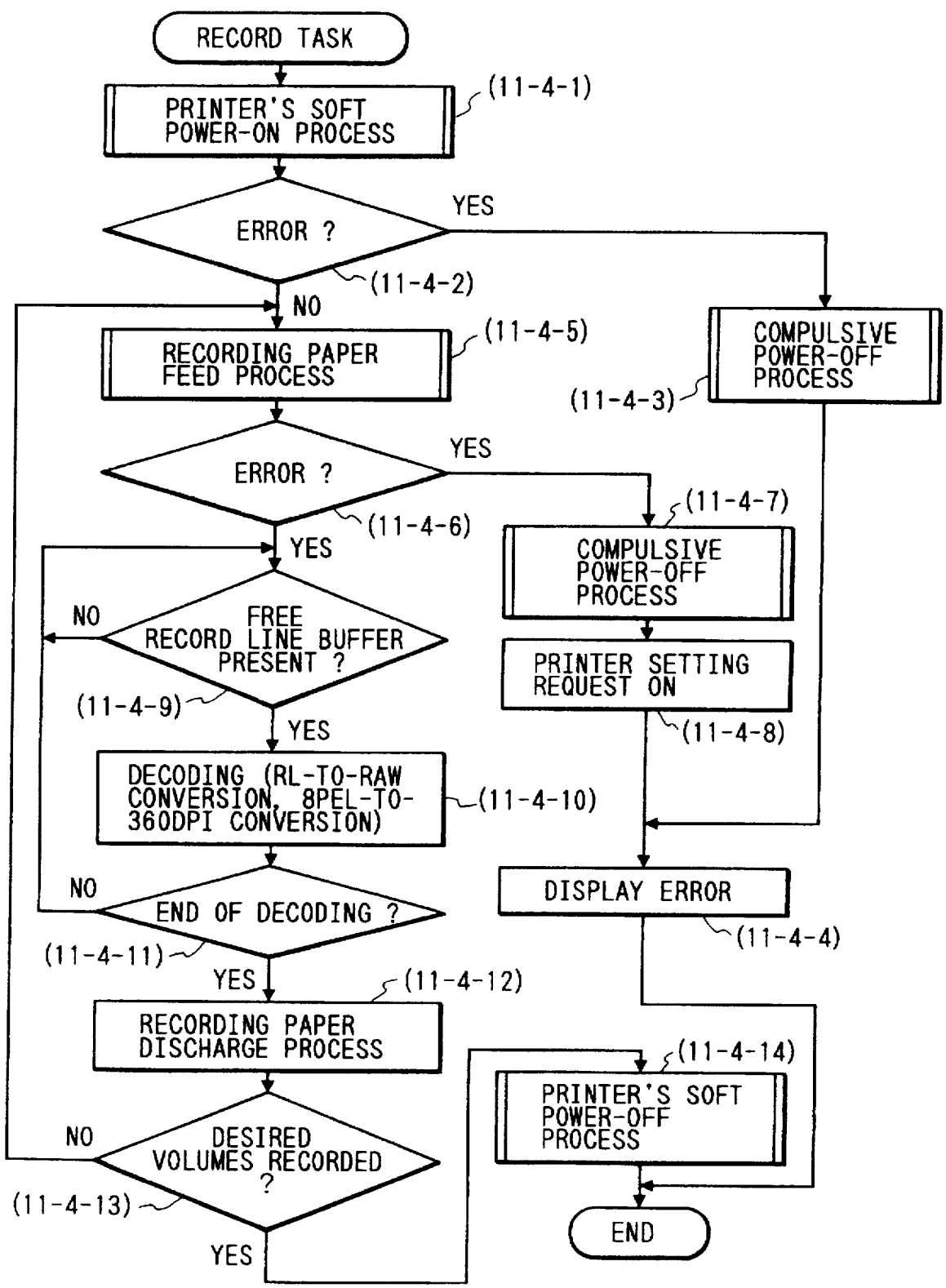
FIG. 15 is a flow chart for explaining the record task.

The multi-copy operation will be described below with reference to FIGS. 13, 14, and 15.

In this mode, the multi-copy operation is realized by temporarily storing raw image data obtained by reading an original image in the image memory (the image storage buffer in the RAM 103), and repeating, in units of sets of copies, an operation for reproducing the image data from the image memory, resolution-converting the reproduced image data, and transferring the converted data to the printer unit 2.

When a copy operation is performed, it is checked if the printer is ready (11-2-1). If the printer is not ready, an error message is displayed, and thereafter, the copy operation ends. If the printer is ready, read and record semaphores are obtained (11-2-2). If at least one of the two semaphores cannot be obtained, an error message is displayed (11-2-7) after the semaphores are released, thus ending the copy operation. If both the semaphores can be obtained, read and record tasks are started (11-2-3). The following description will be made in units of tasks. Read Task (FIG. 14).

An original sheet is fed to the read position (11-3-1). Thereafter, image data is transferred to the read line buffer in the same manner as in the read operation in the single copy operation, the stored image data is encoded into, e.g., MMR codes, and the encoded data is stored in the image memory (11-3-2). Upon completion of reading of a single original sheet, after the original sheet is discharged (11-3-3), it is checked if the next original sheet is present (11-3-4). If the next original sheet is not present, the read task ends; otherwise, the flow returns to step (11-3-1). Record Task (FIG. 15).

The soft power-ON process of the printer unit is executed (11-4-1). If an error has occurred during the soft power-ON process (11-4-2), the compulsive soft power-OFF process is executed (11-4-3), and an error message is displayed (11-4-4). Thereafter, the record task ends itself. If no error is detected, an image memory (copy read image) to be recorded is searched for (11-4-9). If an image memory is found, a recording paper feed process is executed.

If an error has occurred during the recording paper feed process, the compulsive soft power-OFF process is executed (11-4-7), a printer setting request is activated (11-4-8), and an error message is displayed (11-4-4). Thereafter, the record task ends itself.

If no error is detected, the image data read out from the image memory is subjected to a decode process to run length data (11-4-10), an RL (run length)-to-RAW (raw) conversion process, and an 8 pel-to-360 dpi resolution conversion process (11-4-10), and the converted data is developed on a free record line buffer. Note that white data at the right end is ignored since image data is transferred from the Centronics I/F. The way of using the line buffers is the same as that of the read line buffers. Thereafter, image data is transferred and the record line buffer is released in the interrupt process of recording.

Upon completion of the print operation of the image memory (copy read image) to be recorded (11-4-11), a recording paper discharge process is executed as a post-process (11-4-12), thus completing the copy operation of a set of copies. If there are remaining sets of copies, the above-mentioned operation is repeated from the recording paper feed process (11-4-13). If the copy operation of the predetermined number of sets of copies is completed, the soft power-OFF process is executed (11-4-14), and thereafter, the record task ends itself.

When both the read and record tasks end, the multi-copy operation ends.

[Received Image Output Operation]

The received image output operation will be described below with reference to FIG. 16.

In a FAX communication task, after a FAX call is set and a pre-procedure is executed (12-1-1), a received image is stored in the image memory. At the same time, it is checked if the printer is ready (12-1-2). If the printer is ready, a record semaphore is obtained (12-1-3). If the semaphore cannot be obtained or if the printer is not ready, a substitute reception process is executed (12-1-7). If the semaphore is obtained, a record task is started (12-1-4), and the output operation of the received image is simultaneously processed (the image signal is stored in the image memory) (12-1-5). Upon completion of the FAX communication, the FAX communication task ends itself (12-1-6).

The operation of the record task (12-1-4) will be described below with reference to FIGS. 17A and 17B.

Figure 17B:
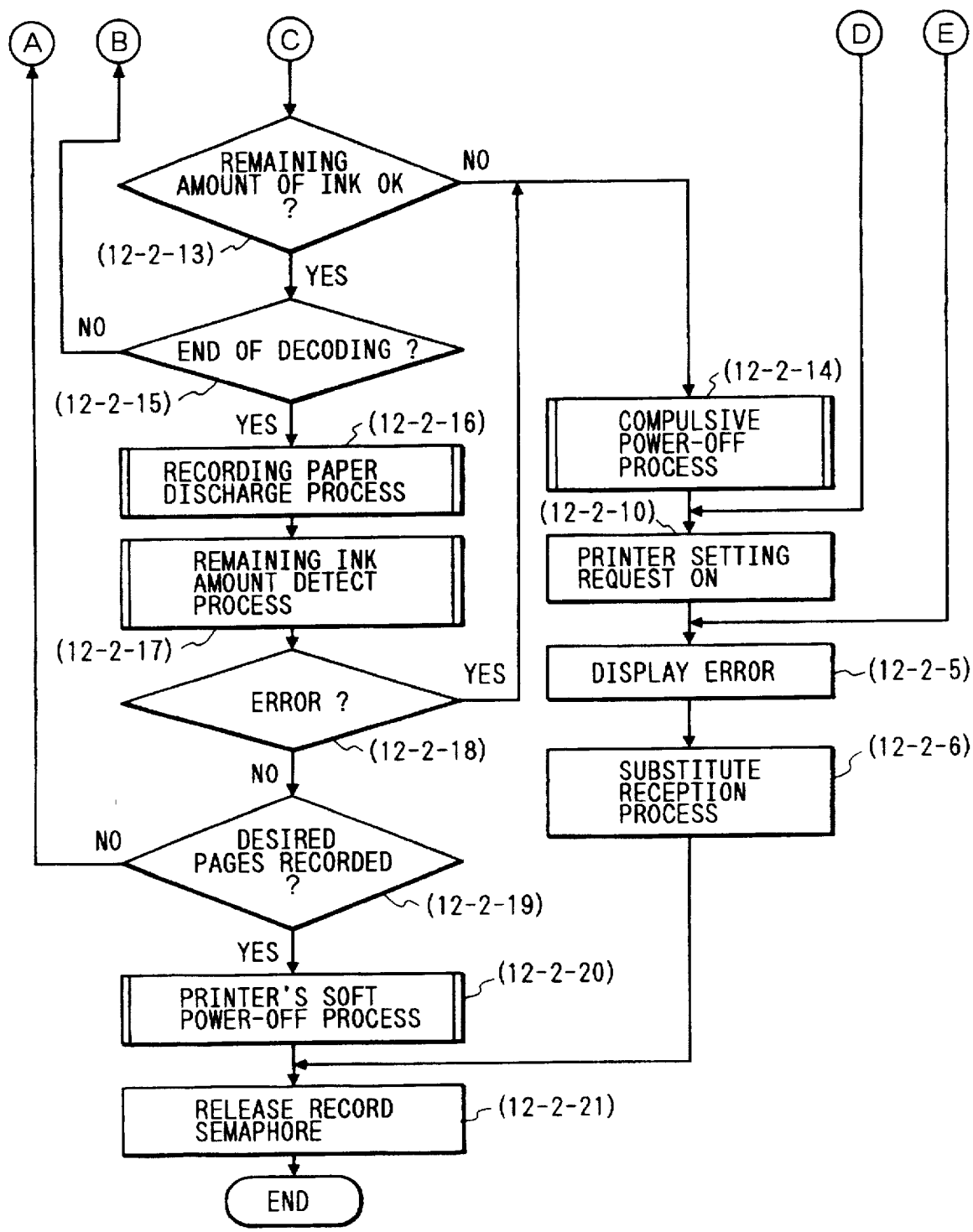
FIG. 17 is comprised of FIGS. 17A and 17B showing flow charts for explaining the record task.

Record Task (FIGS. 17A and 17B).

The soft power-ON process of the printer unit 2 is executed (12-2-1). If an error has occurred during the soft power-ON process (12-2-3), a compulsive soft power-OFF process (12-2-4) is executed, an error message is displayed (12-2-5), a substitute reception process is executed (12-2-6), and the record semaphore is released (12-2-21). Thereafter, the record task ends itself. If no error is detected, an image memory (received image) to be recorded is searched for. If an image memory is found, the recording paper feed process is executed (12-2-7). If an error has occurred during the recording paper feed process (12-2-8), a compulsive soft power-OFF process is executed (12-2-9), a printer setting request is activated (12-2-10), an error message is displayed (12-2-5), a substitute reception process is executed (12-2-6), and the record semaphore is released (12-2-21). Thereafter, the record task ends itself. If no error is detected, the image data in the image memory is subjected to a decode process for converting the image data into run length (RL) data, an RL-to-RAW conversion process, and an 8 pel-to-360 dpi resolution conversion process (12-2-12), and thereafter, the converted data is developed on a free record line buffer (white data at the right end is ignored).

The remaining ink amount detection result (to be described later) is monitored for each one-line process (12-2-13). If the remaining ink amount detection result indicates "NG", a compulsive soft power-OFF process is executed (12-2-14), a printer setting request is activated (12-2-10), an error message is displayed (12-2-5), a substitute reception process is executed (12-2-6), and the record semaphore is released (12-2-21). Thereafter, the record task ends itself.

The way of using the line buffers is the same as that of the read line buffers. Thereafter, in the interrupt process of recording, image data is transferred and the record line buffer is released. Upon completion of the print operation of the image memory (received image) to be recorded, as post-processes, a recording paper discharge process (12-2-16) and a remaining ink amount detect process (12-2-17) are executed. If an error has occurred in the remaining ink amount detect process (12-2-18), a compulsive soft power-OFF process is executed (12-2-14), a printer setting request is activated (12-2-10), an error message is displayed (12-2-5), a substitute reception process is executed (12-2-6), and the record semaphore is released (12-2-21). Thereafter, the record task ends itself. If a remaining page is present (12-2-19), the above-mentioned operation is repeated from the recording paper feed process. Upon completion of the print operation of the received image, a soft power-OFF process is executed (12-2-21), and the record semaphore is released. Thereafter, the record task ends itself.

[Report Output Operation]

The report output operation will be described below.

The report output operation includes two different output operations, i.e., a normal report output operation for printing a report using only font data of the printer unit 2, and an untransmitted image report output operation for printing both the font data of the printer unit 2 and image data in the image memory.

Figure 18:
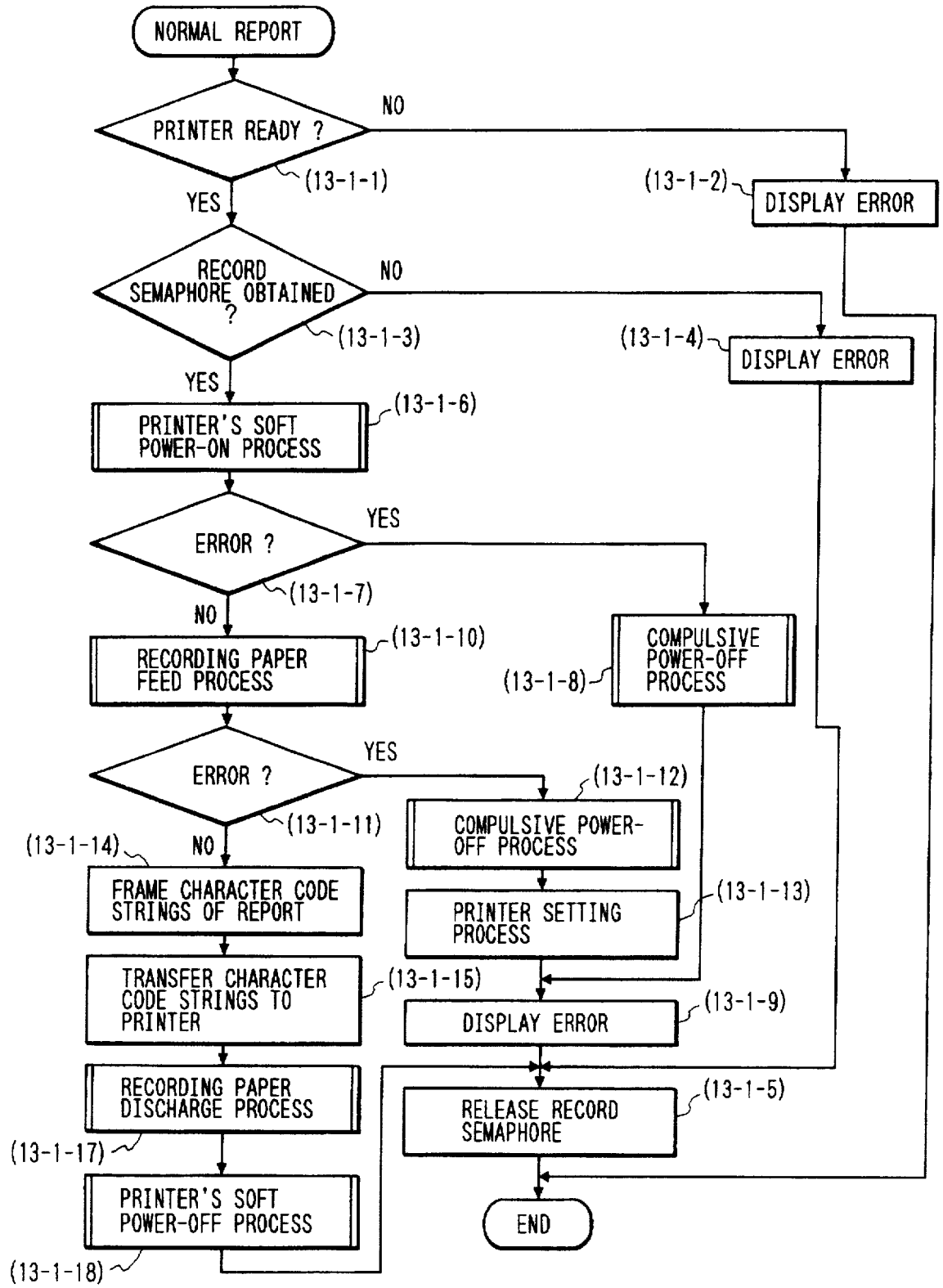
FIG. 18 is a flow chart for explaining the normal report output operation.

The normal report output operation will be described below with reference to FIG. 18.

It is checked if the printer is ready (13-1-1). If the printer is not ready, an error message is displayed (13-1-2), and thereafter, the report output operation ends. If the printer is ready, a record semaphore is obtained (13-1-3). If the record semaphore cannot be obtained, an error message is displayed (13-1-4), and thereafter, the record semaphore is released (14-1-5), thus ending the report output operation. If the record semaphore can be obtained, a soft power-ON process of the printer unit is executed (13-1-18). If an error has occurred during the soft power-ON process (13-1-7), a compulsive soft power-OFF process is executed (13-1-8), an error message is displayed (13-1-9), and the record semaphore is released (13-1-5). Thereafter, the report output operation ends. If no error is detected, a recording paper feed process is executed (13-1-10). If an error has occurred during the recording paper feed process (13-1-11), the compulsive soft power-OFF process is executed (13-1-12), a printer setting request is activated (13-1-13), an error message is displayed (13-1-9), and the record semaphore is released (13-1-5). Thereafter, the report output operation ends.

If no error is detected, normal report print information (header, report title, and contents) is generated as character code strings (13-1-14), and the character code strings are transferred to the printer unit 2 via the Centronics I/F 302 (13-1-15). The printer unit 2, which received the character code strings, stores only character codes stored in the reception buffer in the character buffer, develops images of the character codes in the character buffer, stores the developed images in the printer buffer, and prints the stored images using the printing head 205. In the FAX unit 1, after all the character code strings are transferred, a recording paper discharge process (13-1-17) and a soft power-OFF process (13-1-18) are executed, and the record semaphore is released (13-1-5), thus ending the normal report output operation.

The untransmitted image report output operation will be described below with reference to FIG. 19.

Figure 19:
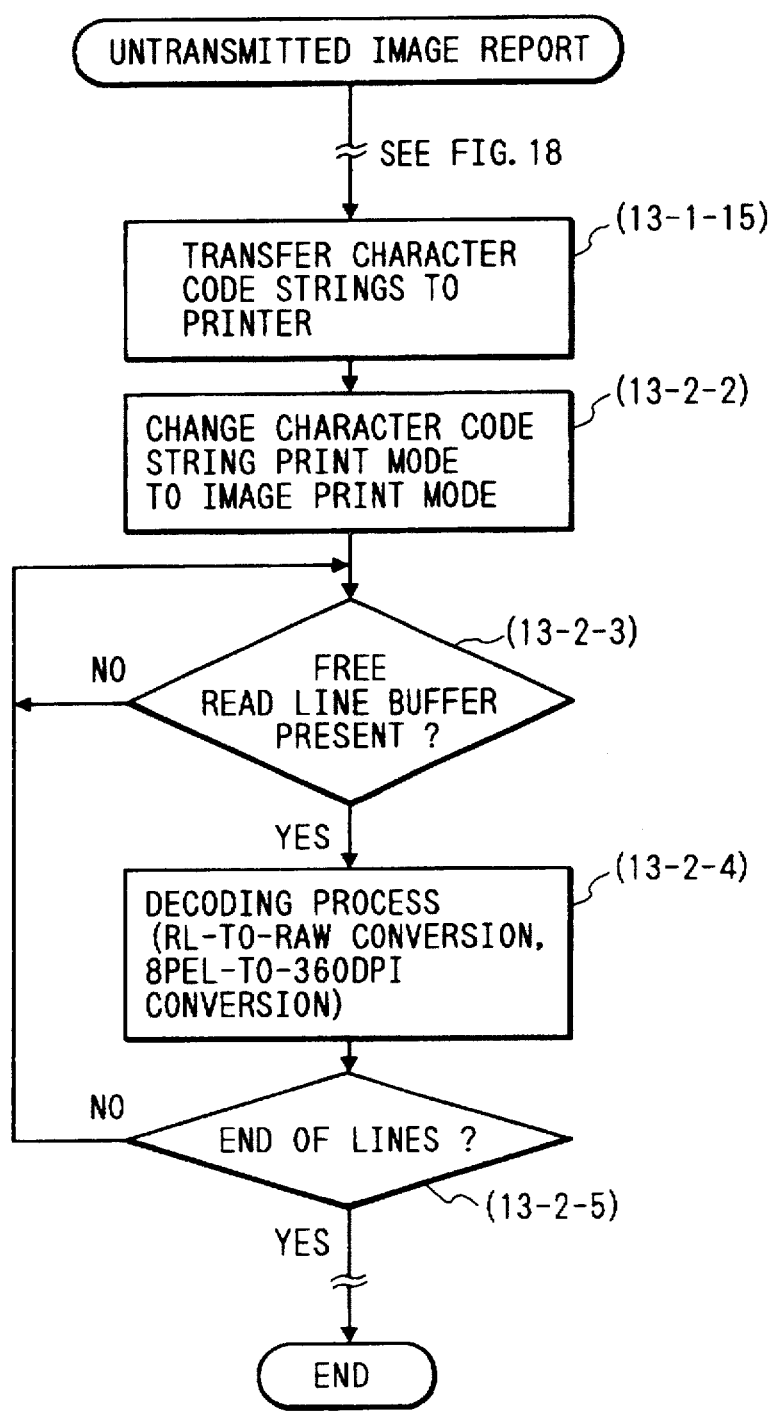
FIG. 19 is a flow chart for explaining the untransmitted image report output operation.

In the untransmitted image report output operation, steps 13-2-2 to 13-2-5 in FIG. 19 are inserted after "transfer character code strings to the printer unit" in step 13-1-14 in the normal report output operation. More specifically, the print mode is switched from the character code string print mode to the image print mode (13-2-2), and an image memory (untransmitted image which cannot be transmitted due to a transmission error) to be recorded is searched for (13-2-3). If an image memory is found, image data in the image memory is subjected to a decode process, an RL-to-RAW conversion process, and an 8 pel-to-360 dpi resolution conversion process (13-2-4), and thereafter, the converted data is developed on a free record line buffer (white data at the right end is ignored). The way of using the line buffers is the same as that of the read line buffers. Thereafter, in the interrupt process of recording, image data is transferred and the record line buffer is released.

Upon completion of the print operation of the image memory (untransmitted image which cannot be transmitted due to a transmission error) to be recorded, the flow advances to the "recording paper discharge process" in the normal report output operation (13-2-5).

[Operation in Printer Mode]

The FAX apparatus of this embodiment has two modes, i.e., the FAX mode in which the printer unit 2 is used as the recording system of the FAX unit 1, and the printer mode in which the printer unit is used as a printer for an external device such as a personal computer, a wordprocessor, and the like.

Figure 20:
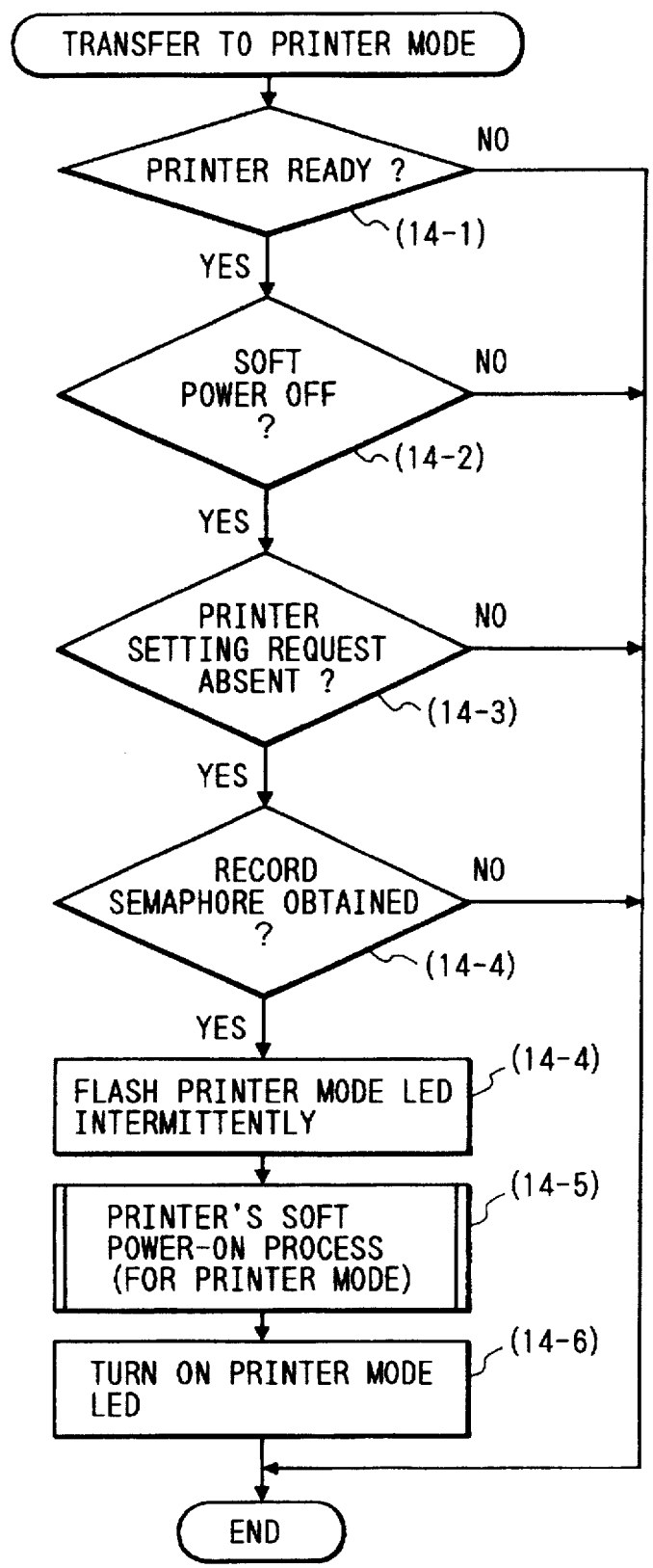
FIG. 20 is a flow chart showing the transfer sequence to a printer mode.

FIG. 20 shows the transfer sequence from the FAX mode to the printer mode.

The FAX mode is transferred to the printer mode by depressing a printer key (not shown) on the operational panel 112 of the main body. Upon depression of the printer key, the state of a printer LED built in the printer key is changed from an OFF state to an intermittent flashing state (14-4), and a soft power-ON process (printer mode) is executed (14-5). Thereafter, the state of the printer LED built in the printer key is changed to an ON state indicating the printer mode (14-6). In this case, the transfer conditions include the following items:

Printer ready (14-1)

Soft power-OFF (14-2)

No printer setting request (14-3)

Record semaphore obtained (14-4)

Figure 21:
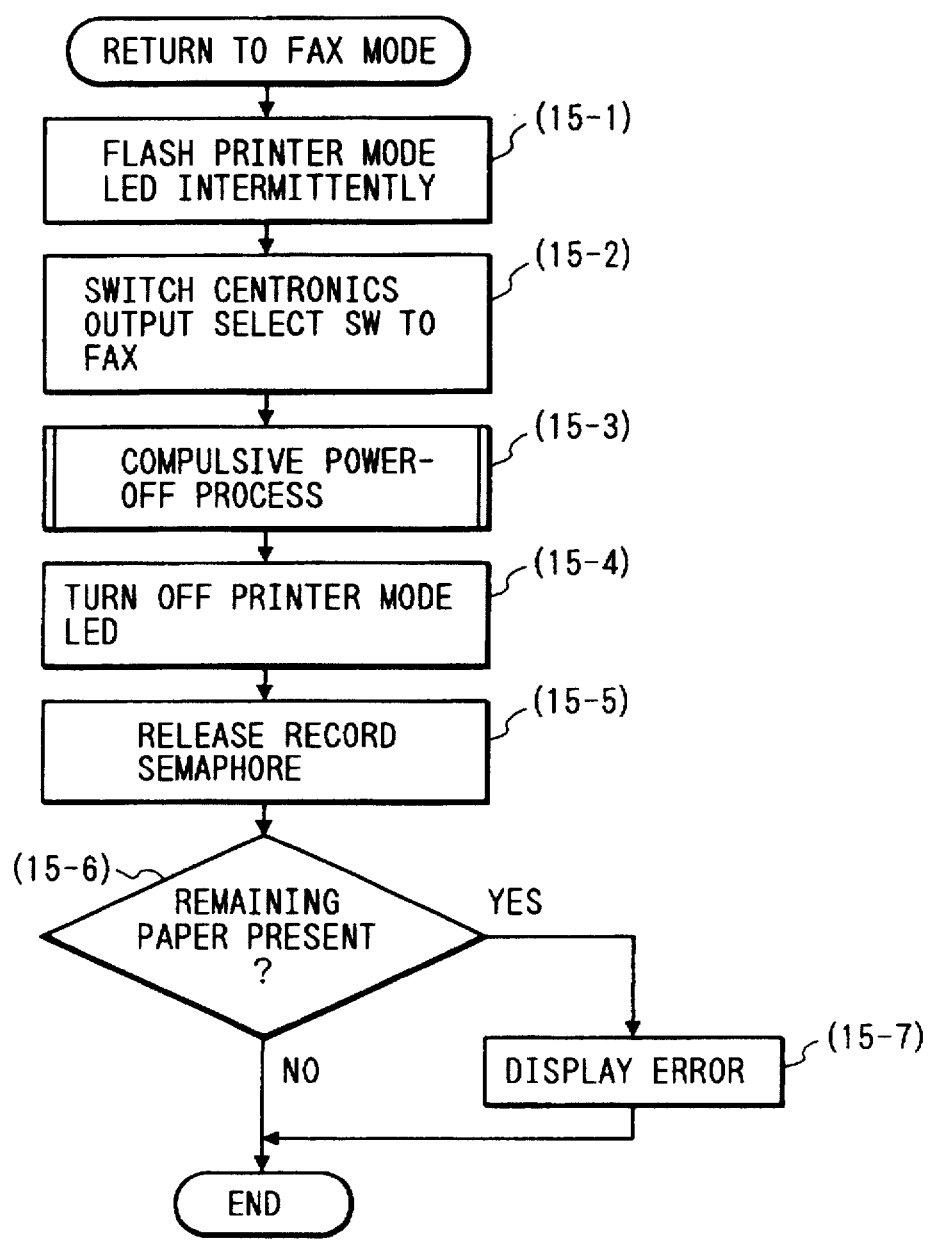
FIG. 21 is a flow chart showing the return sequence to a facsimile mode.

FIG. 21 shows the return sequence from the printer mode to the FAX mode.

The printer mode returns to the FAX mode upon depressing the printer key on the main body. Upon depression of the printer key (not shown), the state of the printer LED built in the printer key is changed from an ON state to an intermittent flashing state (15-1), and the Centronics switch is switched to a FAX unit-printer unit side (15-2). Then, a compulsive soft power-OFF process is executed. Thereafter, the state of the printer LED built in the printer key is changed to an OFF state indicating the FAX mode (15-4), and the record semaphore is released. In this case, there are no transfer conditions. However, if a remaining paper sheet is present (15-6), a message indicating this is displayed (15-7).

When the operation of the FAX unit is required in the printer mode, since the printer unit 2 is used by an external personal computer in the printer mode, the copy operation, the received image print operation, and the report output print operation cannot be performed. In this case, when a FAX image is received, the received image is substitute-received in the image memory in the FAX unit 1. Thus, the FAX reception operation can be performed even in the printer mode.

Figure 22:
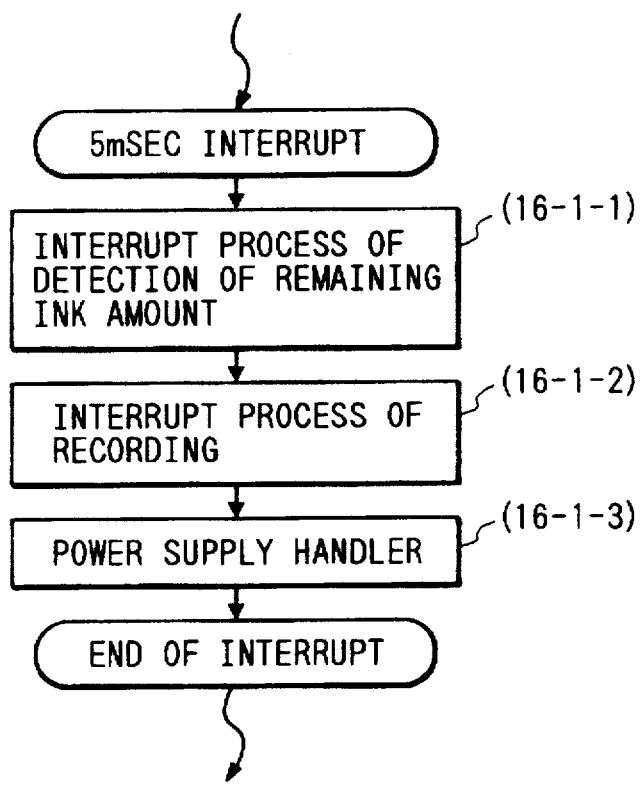
FIG. 22 is a flow chart showing the timer interrupt process of the facsimile unit.

The MPU 101 of the FAX unit 1 has the following three processes shown in FIG. 22 as timer interrupt processes, and these processes are executed in turn at 5-msec intervals.

Interrupt process of detection of remaining ink amount (16-1-1)

Interrupt process of recording (16-1-2)

Power supply handler of the printer unit (16-1-3)

These interrupt processes will be described in detail later.

Figure 23:
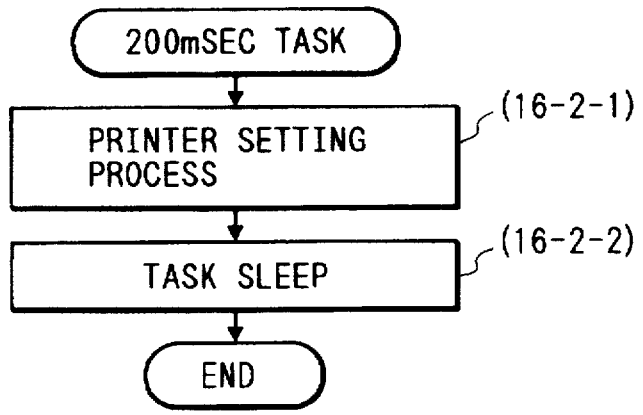
FIG. 23 is a flow chart showing the periodic task process of the facsimile unit.

Furthermore, the MPU 101 of the FAX unit 1 has the following process shown in FIG. 23 as a periodic task process, and this process is started at 200-msec intervals.

Printer setting process (same as in FIG. 10B) (16-2-1)

The operations on the printer unit side will be described below.

Figure 24:
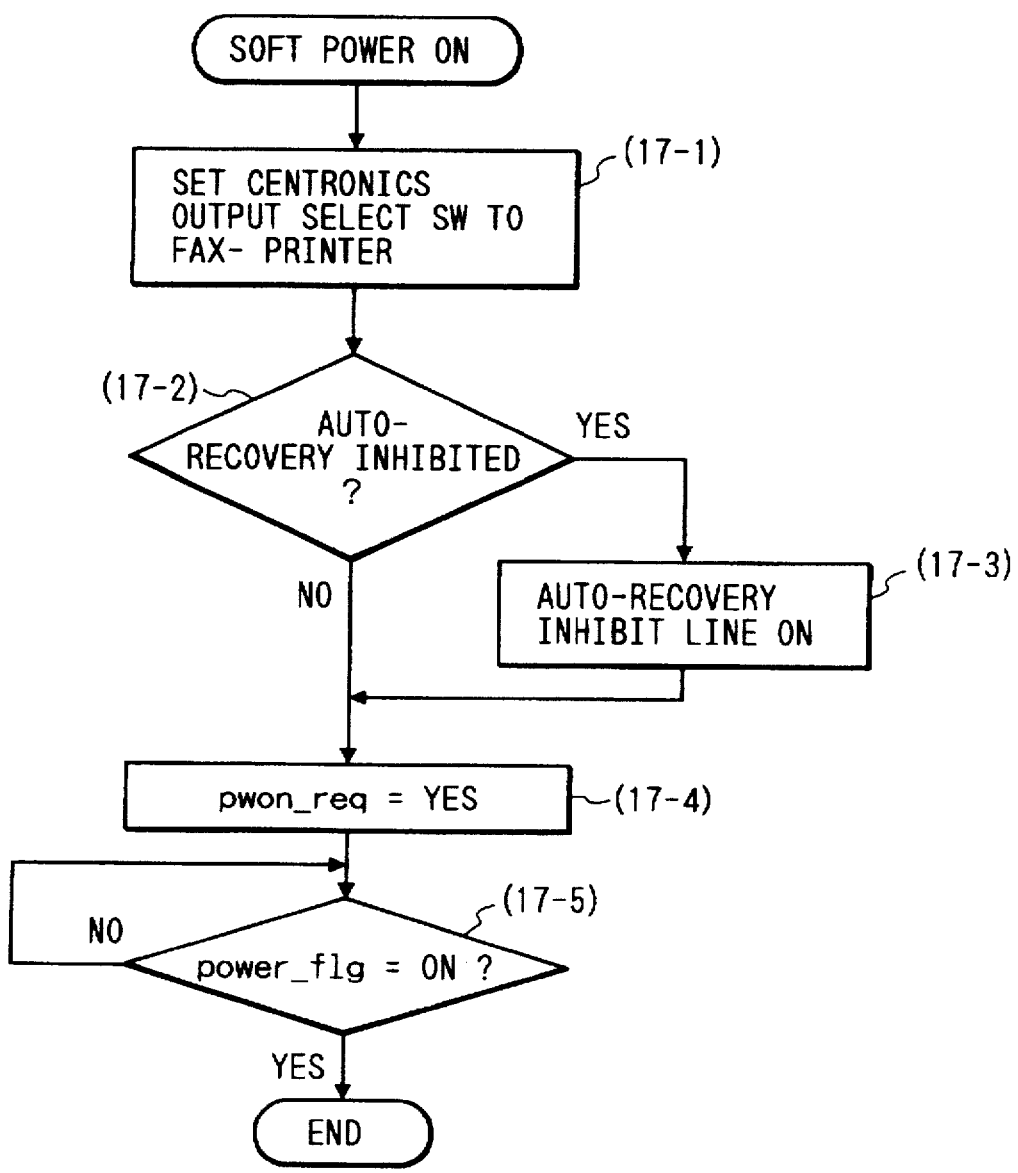
FIG. 24 is a flow chart showing the soft power-ON process in the facsimile mode.

The soft power-ON process in the FAX mode will be described below with reference to FIG. 24.

The soft power-ON process of the printer unit 2 is realized by issuing a request (pwon_req=YES) from the MPU 101 of the FAX unit 1 to a soft power supply handler (to be described later).

More specifically, the Centronics output select switch 108 is set at the FAX unit 1-printer unit 2 side (17-1), the auto-recovery inhibit signal line is activated (17-3) when the auto-recovery operation is inhibited (17-2), and pwon_req=YES is set (17-4). Thereafter, the soft power supply handler (to be described later) waits until the soft power supply (power_flg) is turned on (17-5).

Figure 25:
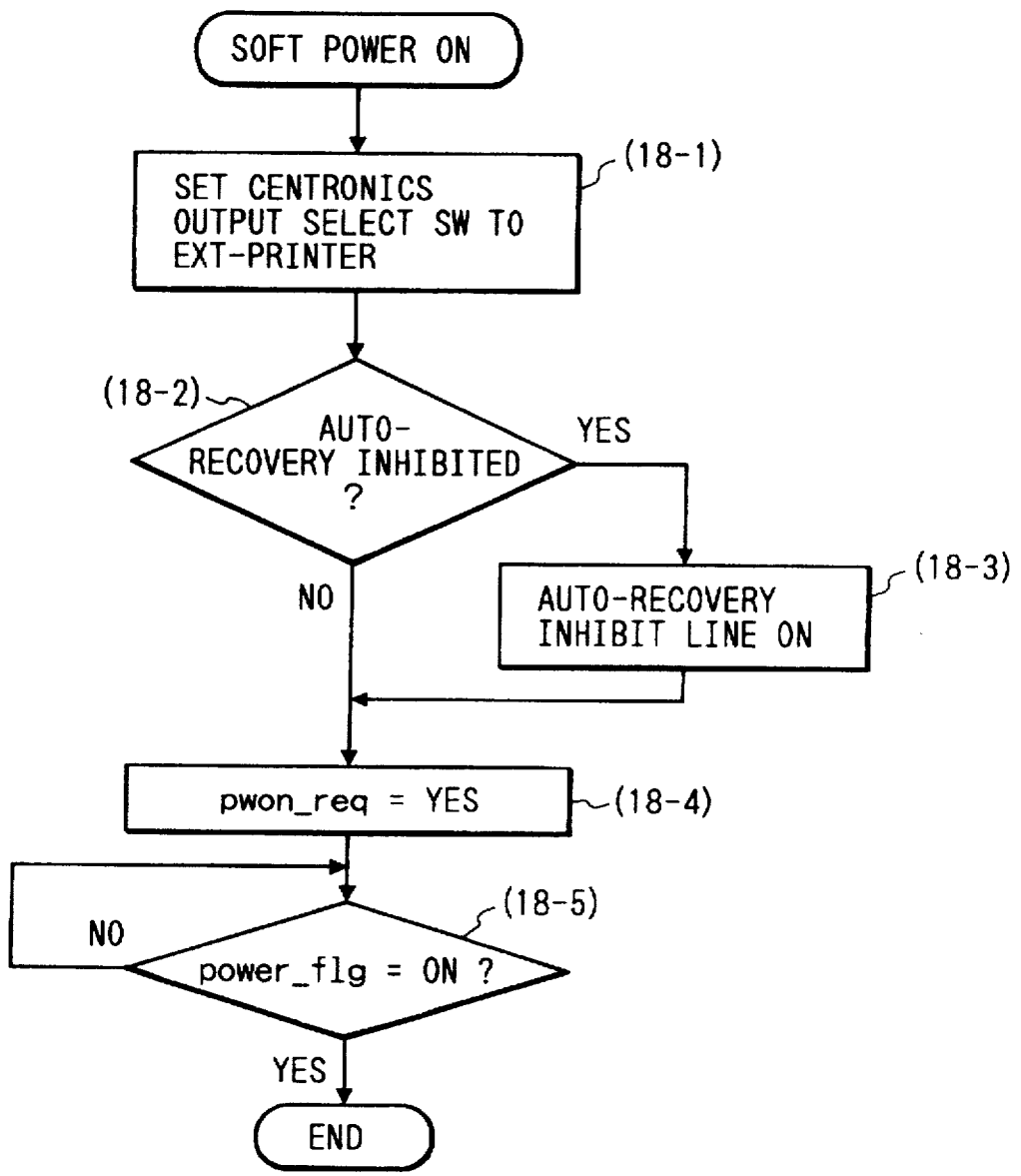
FIG. 25 is a flow chart showing the soft power-ON process in the printer mode.

The soft power-ON process in the printer mode will be described below with reference to FIG. 25.

The soft power-ON process of the printer unit is realized by issuing a request (pwon_req=YES) from the MPU 101 of the FAX unit 1 to the soft power supply handler.

More specifically, the Centronics output select switch 108 is set at the external device-printer unit 2 side (18-1), the auto-recovery inhibit signal line is activated (18-3) when the auto-recovery operation is inhibited (18-2), and pwon_req=YES is set (18-4). Thereafter, the soft power supply handler waits until the soft power supply (power_flg) is turned on (18-5).

Figure 26:
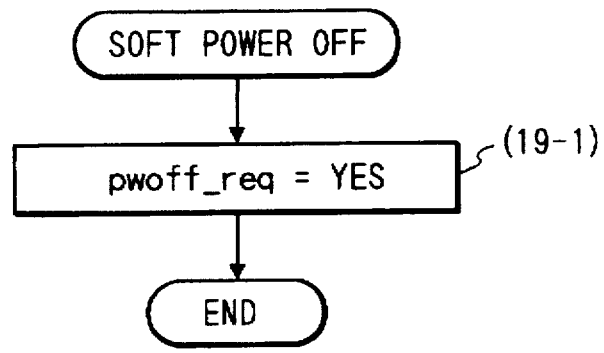
FIG. 26 is a flow chart showing the soft power-OFF processing.

The soft power-OFF process will be described below with reference to FIG. 26.

The soft power-OFF process of the printer unit 2 is realized by issuing a request (pwoff_req=YES) to the soft power supply handler. More specifically, pwoff_req=YES is set (19-1).

Figure 27:
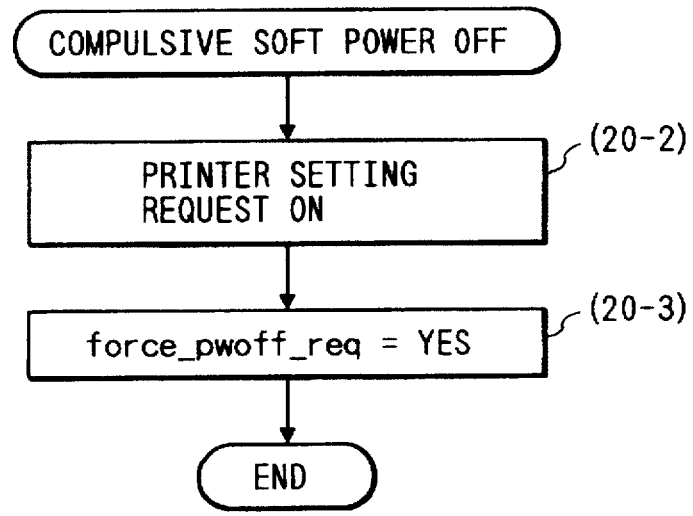
FIG. 27 is a flow chart showing the compulsive soft power-OFF process sequence.

FIG. 27 shows the compulsive soft power-OFF process.

The compulsive soft power-OFF process of the printer unit 2 is realized by issuing a request (force_pwoff_req=YES) to the soft power supply handler.

More specifically, since the compulsive soft power-OFF process is executed in an abnormal termination state, a printer setting request is activated (20-2). Then, force_pwoff_req=YES is set (20-3).

The soft power supply handler used in the soft power-ON/OFF process described above will be explained below with reference to FIG. 28.

The soft power supply control of the printer unit 2 is performed by the 5-msec timer interrupt of the FAX unit 1. In this control, the MPU 101 of the FAX unit generates a pseudo 1,000-msec pulse signal for turning on the power switch of the printer unit 2 so as to turn on the power supply of the printer unit 2.

When all requests associated with the soft power-ON process are "NO", the control advances to the soft power-OFF process (FIGS. 29 and 30) without executing any process, and exits from the timer interrupt.

If the request pwon_req is set to be YES (21-1-1), pwon_req=NO, power_flg=ERROR, pwon_push_req=

YES, and pwon_push_time=1,000 msec are set, and thereafter, the soft power switch is turned on, thus exiting from the timer interrupt (21-1-2).

In the next timer interrupt, since pwon_push_req=YES is set (21-1-3), (pwon_push_time−5) msec are calculated to subtract 5 msec from pwon_push_time. If pwon_push_time>0 (21-1-5), the control exits from the timer interrupt. On the other hand, if pwon_push_time=0, pwon_push_req=NO, pwon_wait_req=YES, and pwon_wait_time=2,000 msec are set, and thereafter, the soft power switch is turned off, thus exiting from the timer interrupt (21-1-5). In this manner, a pulse signal having a pulse width of 1,000 msec is formed.

In the next timer interrupt, since pwon_wait_req=YES is set (21-1-7), (pwon_wait_time−5) msec are calculated to subtract 5 msec from pwon_wait_time (21-1-8). If pwon_wait_time>0, the control exits from the timer interrupt (21-1-9). However, if pwon_wait_time=0, pwon_wait_req=NO and power_flg=ON are set, and thereafter, the control exits from the timer interrupt (21-1-10).

With the above-mentioned control, the soft power supply of the printer unit is turned on by the pulse signal having the pulse width of 1,000 msec, and the control ends.

Figure 29:
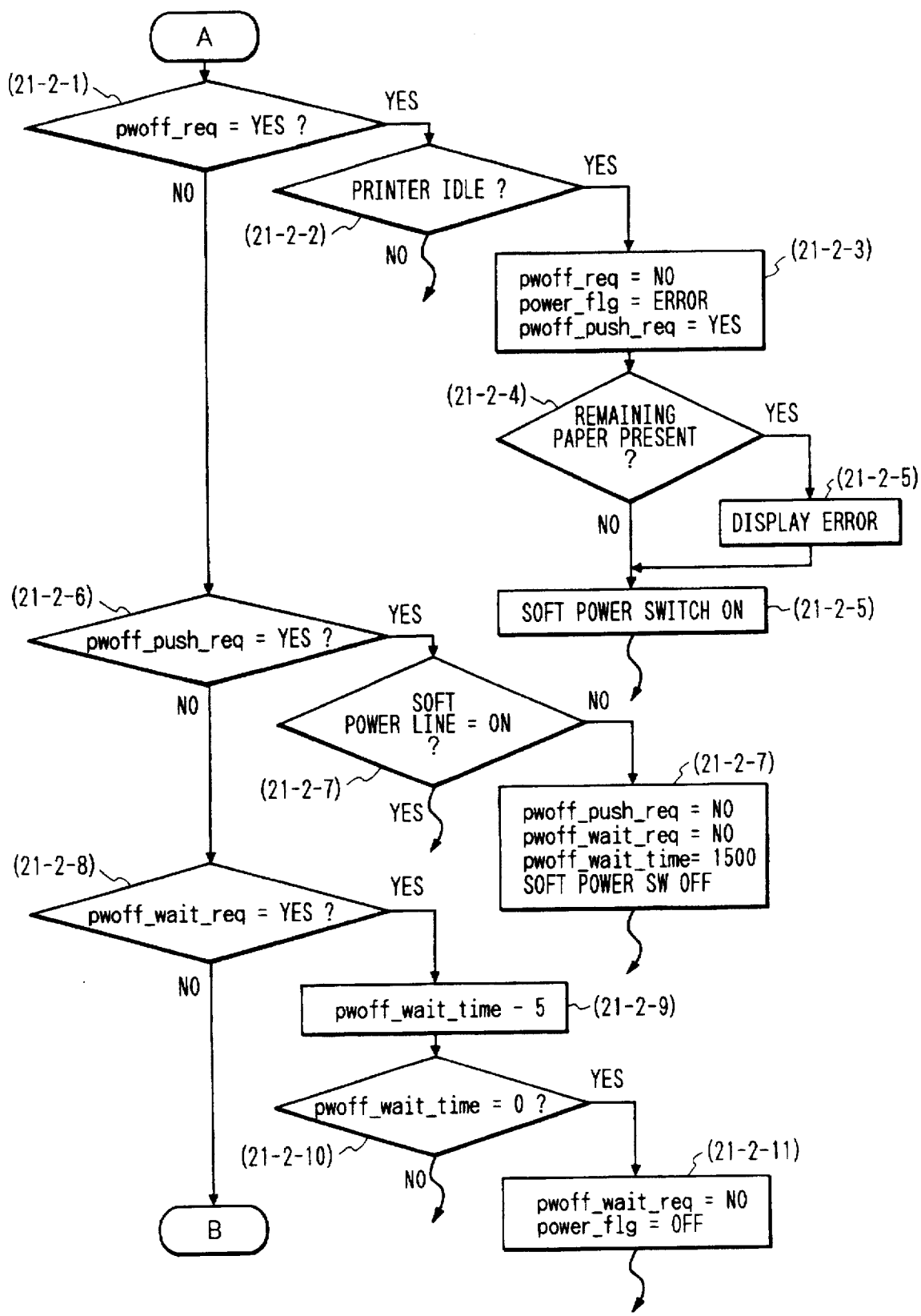
FIG. 29 is a flow chart showing the soft power-OFF processing.

FIG. 29 shows the soft power-OFF sequence.

Figure 28:
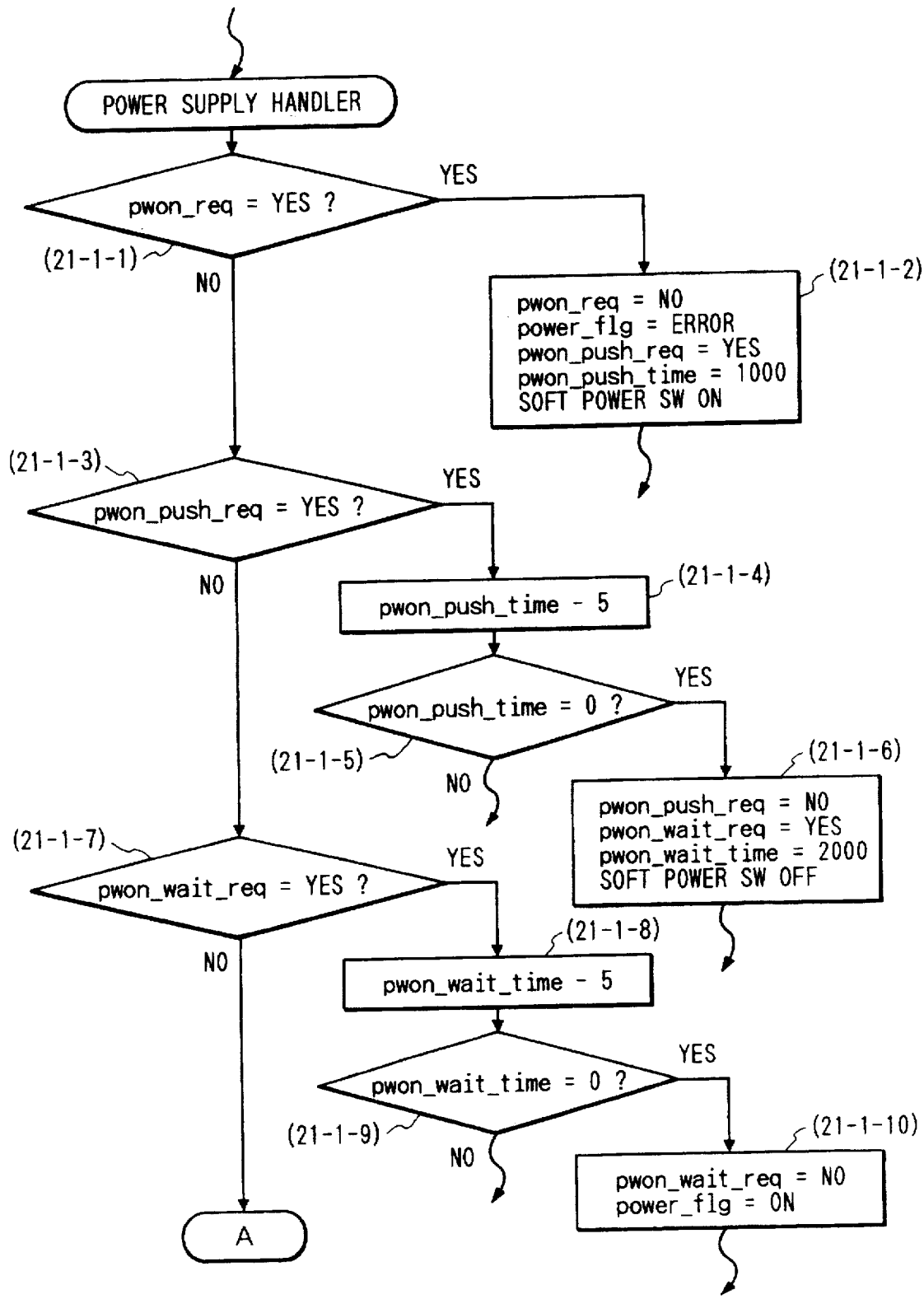
FIG. 28 is a flow chart showing the soft power supply handler process sequence.

The process shown in FIG. 29 is executed after the interrupt process shown in FIG. 28. If all requests associated with the soft power-OFF process are "NO" (21-2-1), the control advances to the compulsive soft power-OFF process (FIG. 30) without executing any process, and exits from the timer interrupt.

If pwoff_req=YES is set (21-2-1), the idle state of the printer unit is checked (21-2-2). If the printer unit is not in the idle state, the control exits from the timer interrupt; otherwise, pwoff_req=NO, power_flg=ERROR, and pwoff_push_req=YES are set (21-2-3). Thereafter, if a remaining paper sheet is present in the recording system (21-2-4), a recording paper jam is determined, and an error message is displayed (21-2-5). The soft power switch is turned on, and the control exits from the timer interrupt (21-2-5).

In the next timer interrupt, since pwoff_push_req=YES is set (21-2-6), if the soft power switch signal line is ON (21-2-7), the control exits from the timer interrupt. However, if the soft power switch signal line is OFF, pwoff_push_req=NO, pwoff_wait_req=YES, and pwoff_wait_time=1,500 msec are set. Thereafter, the soft power switch is turned off, and the control exits from the timer interrupt (21-2-7).

In the next timer interrupt, since pwoff_wait_req=YES is set (21-2-8), (pwoff_wait_time−5) msec are calculated to subtract 5 msec from pwoff_wait_time (21-2-9). If pwoff_wait_time>0 (21-2-10), the control exits from the timer interrupt. However, if pwoff_wait_time=0 (21-2-10), pwoff_wait=NO and power_flg=OFF are set, and thereafter, the control exits from the timer interrupt. With this control, a pulse signal having a pulse width of 1,500 msec is formed.

As described above, the soft power switch of the printer unit 2 is turned off by the pulse signal having a pulse width of 1,500 msec, and the control ends (21-2-11).

Figure 30:
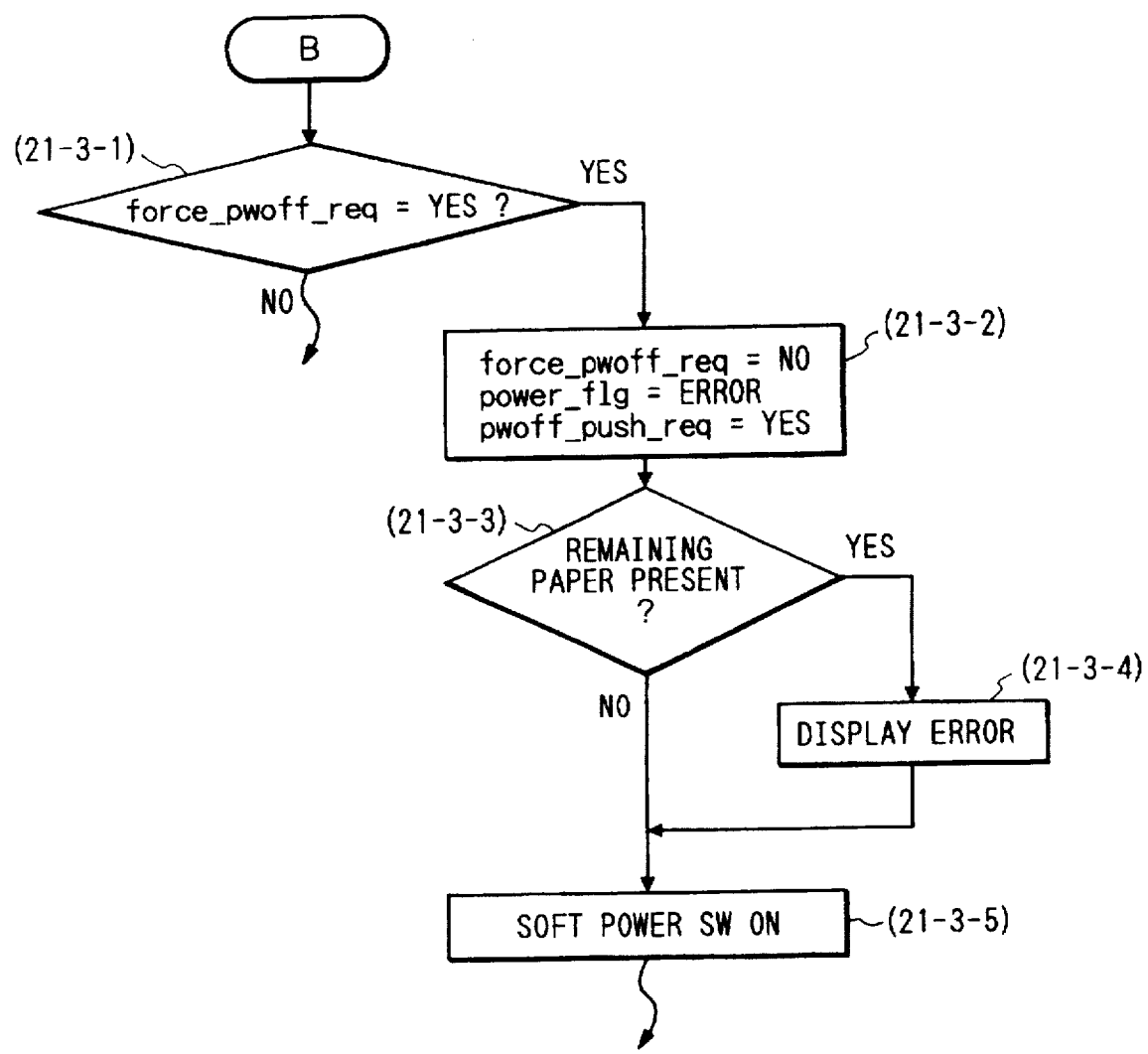
FIG. 30 is a flow chart showing the compulsive soft power-OFF sequence.

FIG. 30 shows the compulsive soft power-OFF sequence.

The process shown in FIG. 30 is executed after the soft power-OFF process shown in FIG. 29.

If all requests associated with the compulsive soft power-OFF process are "NO", the control exits from the timer interrupt without executing any process. If force_pwoff_req=YES is set (21-3-1), force_pwoff_req=NO, power_flg=ERROR, and pwoff_push_req=YES are set (21-3-2).

Thereafter, if a remaining paper sheet is present in the recording system (21-3-3), a recording paper jam is determined, and an error message is displayed (21-3-4). The soft power switch is turned on, and the control exits from the timer interrupt (21-3-5).

In the next timer interrupt, since pwoff_push_req=YES is set (21-2-6), if the soft power switch signal line is ON, the control exits from the timer interrupt (21-2-7). However, if the soft power switch signal line is OFF, pwoff_push_req=NO, pwoff_wait=YES, and pwoff_wait_time=1,500 msec are set. Thereafter, the soft power switch is turned off, and the control exits from the timer interrupt (21-2-7).

In the next timer interrupt, since pwoff_wait=YES is set (21-2-8), (pwoff_wait_time−5) msec are calculated (21-2-9). If pwoff_wait_time>0, the control exits from the timer interrupt (21-2-10). However, if pwoff_wait_time=0, pwoff_wait=NO and power_flg=OFF are set, and thereafter, the control exits from the timer interrupt (21-2-11). With this control, a pulse signal having a pulse width of 1,500 msec is formed.

As described above, the soft power supply of the printer unit 2 is compulsively turned off by the pulse signal having a pulse width of 1,500 msec, and the control ends.

Figure 31:
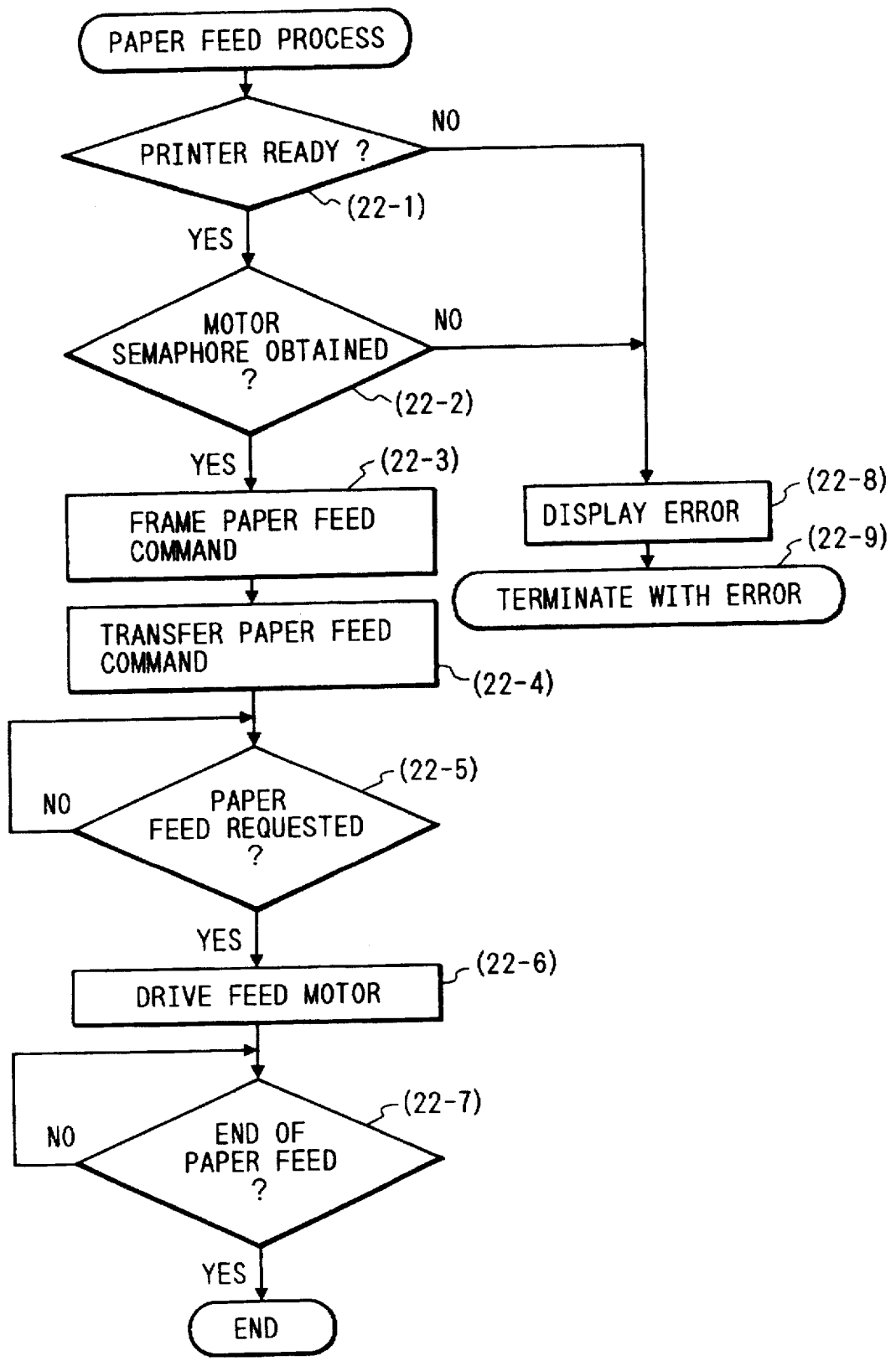
FIG. 31 is a flow chart showing the recording paper feed process sequence.

The operation in the recording paper feed process before an image print operation will be described below with reference to FIG. 31.

A process from when the FAX unit 1 generates a recording paper feed command according to the user registration contents and transfers it to the printer unit 2 until a recording paper sheet is aligned by the pickup roller 313 is the recording paper feed process.

First, it is checked if the printer is ready (22-1). If the printer is not ready, an error message is displayed (22-8), and the operation is terminated with an error (22-9). However, if the printer is ready, a motor semaphore is obtained (22-2). If the motor semaphore cannot be obtained, an error message is displayed (22-8), and the operation is terminated with an error (22-9). If the printer is ready and the motor semaphore is obtained, a recording paper feed command is generated (22-8). The recording paper feed command is a set of the following commands:

Printer reset
Print mode (normal or economy)
Printer setting
Bi-directional print correction
Page mode
Footer print
Bi-directional print
Raster skip These commands are as follows. That is, the printer is initialized in response to the printer reset command. The print mode command follows the print mode in the image print mode in the user registration contents. The printer setting command follows the contents of the FAX mode printer setting in the user registration contents. The bi-directional print correction command has a value inherent to the apparatus, and is registered not by a user but by a service man. The page mode command is a command for selecting whether, in a long data print operation, data for one page is recorded and the remaining data is ignored, or the print operation for the second and subsequent pages is continued, and is set ON for a copy or untransmitted image report print operation but is set OFF for a received image or normal report print operation. As for the footer print command, please refer to the paragraphs of the command system. The bi-directional print command follows a bi-directional print mode in an image print mode in the user registration contents. The raster skip command is a recording paper feed start command.

Upon completion of generation of the recording paper feed command in the FAX unit 1 (22-3), the commands are simultaneously transferred to the printer unit 2 via the Centronics I/F 302 (22-4). Then, the FAX unit 1 waits for a paper feed request input from the printer unit 2 (22-5). The printer unit 2, which received the recording paper feed command, analyzes and executes the commands in turn. Upon analysis of the last raster skip command in the received command, the printer unit 2 issues a paper feed request to the FAX unit 1. Upon reception of the paper feed request (22-5), the FAX unit 1 causes the motor 111 to start the paper feed operation (22-6), and ends the paper feed operation when a recording paper sheet is fed to the position of the PE sensor 206 (22-7). The following position alignment operation of a recording paper sheet is entrusted to the printer unit 2. The printer unit 2 aligns the position of the recording paper sheet in accordance with a predetermined alignment amount.

The recording paper feed process before the character code print operation will be described below. In this process, a process from when the FAX unit 1 generates a recording paper feed command according to the user registration contents and transfers it to the printer unit 2 until a recording paper sheet is aligned by the pickup roller 313 is the recording paper feed process. The process flow is the same as that of the recording paper feed process before the image print operation shown in FIG. 31.

More specifically, it is checked if the printer is ready (22-1). If the printer is not ready, an error message is displayed (22-8), and the operation is terminated with an error (22-9). However, if the printer is ready, a motor semaphore is obtained (22-2). If the printer is ready and the motor semaphore is obtained, a recording paper feed command is generated (22-3). The recording paper feed command is a set of the following commands:

Printer reset

Printer setting

Bi-directional print correction

Bi-directional print

Raster skip

Printer reset

Print mode (normal or economy)

These commands are as follows. That is, the printer is initialized in response to the printer reset command. The printer setting command follows the contents of the FAX mode printer setting in the user registration contents. The bi-directional print correction command has a value inherent to the apparatus, and is registered not by a user but by a service man. The bi-directional print command follows a bi-directional print mode in a character print mode in the user registration contents. The raster skip command is a recording paper feed start command. The print mode command follows the print mode in the character print mode in the user registration contents.

Upon completion of generation of the recording paper feed command in the FAX unit 1 (22-3), the commands are simultaneously transferred to the printer unit 2 via the Centronics I/F 302 (22-4). Then, the FAX unit 1 waits for a paper feed request input from the printer unit 2 (22-5). The printer unit 2, which received the recording paper feed command, analyzes and executes the commands in turn. Upon analysis of the last raster skip command in the received command, the printer unit 2 issues a paper feed request to the FAX unit 1. Upon reception of the paper feed request (22-5), the FAX unit 1 causes the motor 111 to start the paper feed operation (22-6), and ends the paper feed operation when a recording paper sheet is fed to the position of the PE sensor 206 (22-7). The following position alignment operation of a recording paper sheet is entrusted to the printer unit 2. The printer unit 2 aligns the position of the recording paper sheet in accordance with a predetermined alignment amount.

Figure 32:
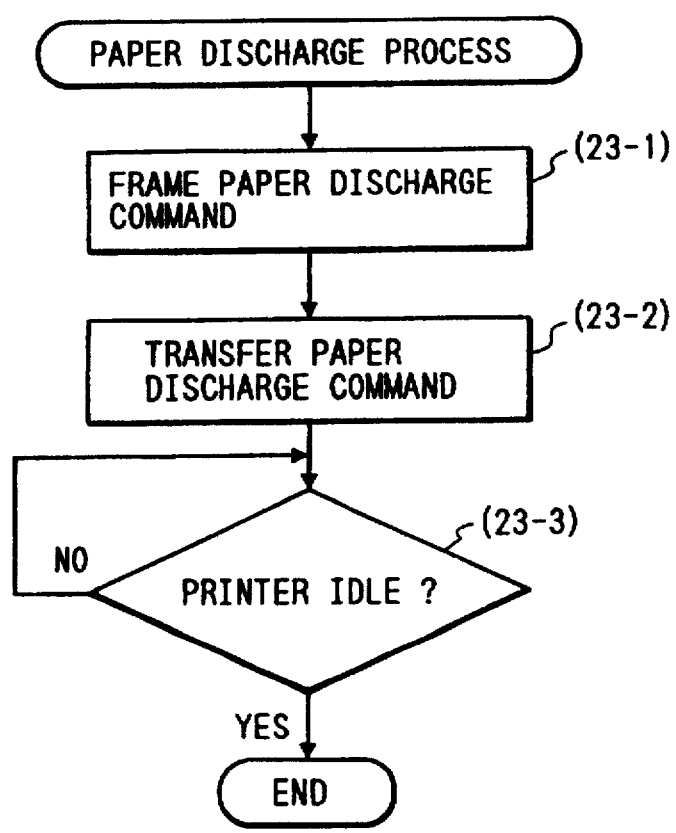
FIG. 32 is a flow chart showing the recording paper discharge process sequence.

The recording paper discharge process after the image print operation will be described below with reference to FIG. 32.

A process from when the FAX unit 1 generates a recording paper discharge command according to the user registration contents and transfers it to the printer unit 2 until a recording paper sheet is discharged is the recording paper discharge process.

The control waits until all the record line buffers become empty. Thereafter, a recording paper discharge command is generated (23-1). The recording paper discharge command is a set of the following commands.

Paper discharge

Printer setting

Printer reset

These commands are as follows. A paper discharge operation is started in response to the paper discharge command. The printer setting command follows the contents of the printer mode printer setting in the user registration contents. The printer is initialized in response to the printer reset command.

Upon completion of generation of the recording paper discharge command in the FAX unit 1 (23-1), the commands are simultaneously transferred to the printer unit 2 via the Centronics I/F 302 (23-2). The FAX unit 1 then waits for the end of the paper discharge operation. The printer unit 2, which received the recording paper discharge command, analyzes and executes the commands in turn. Upon analysis of the paper discharge command in the received command, the printer unit 2 executes the paper discharge operation. Upon completion of the paper discharge operation, the printer unit 2 sets the printer in accordance with the printer setting command to prepare for transfer to the printer mode. When the printer unit 2 is set in an idle state, the recording paper discharge operation ends (23-3).

The recording paper discharge process after the character code print operation will be described below with reference to FIG. 32.

A process from when the FAX unit 1 generates a recording paper discharge command according to the user registration contents and transfers it to the printer unit 2 until a recording paper sheet is discharged is the recording paper discharge process.

First, a recording paper discharge command is generated (23-1). The recording paper discharge command is a set of the following commands.

Paper discharge

Printer setting

Printer reset

These commands are as follows. A paper discharge operation is started in response to the paper discharge command. The printer setting command follows the contents of the printer mode printer setting in the user registration contents. The printer is initialized in response to the printer reset command.

Upon completion of generation of the recording paper discharge command in the FAX unit 1 (23-1), the commands are simultaneously transferred to the printer unit 2 via the Centronics I/F 302 (23-2). The FAX unit 1 then waits for the end of the paper discharge operation. The printer unit 2, which received the recording paper discharge command, analyzes and executes the commands in turn. Upon analysis of the paper discharge command in the received command, the printer unit 2 executes the paper discharge operation. Upon completion of the paper discharge operation, the printer unit 2 sets the printer in accordance with the printer setting command to prepare for transfer to the printer mode. When the printer unit 2 is set in an idle state, the recording paper discharge operation ends (23-3).

The printer setting process in step 16-2-1 in FIG. 23, which frequently appears in the above-mentioned description of the operations, will be described in detail below.

The printer setting process is executed by activating the printer setting request when the recording operation is abnormally terminated, as shown in FIGS. 17 and 27, or when the user registration contents associated with the printer unit 2 are changed, as shown in FIGS. 10A to 10C. The reasons for the necessity of the printer setting process are as follows. In the FAX apparatus with the printer mode function, the printer unit 2 must cope with the printer mode independently of its set timings. For this reason, the internal printer setting contents in the printer unit 2 must always be those for the printer mode.

Thus, when the recording operation normally ends, the printer setting contents for the FAX mode are changed to those for the printer mode immediately before the end of the recording operation. Therefore, when the recording operation normally ends, the printer setting process need not be executed. However, when the recording operation is abnormally terminated, or when the printer setting contents are changed by the user registration operation, the internal printer setting contents in the printer unit are not correct contents for the printer mode, thus requiring the printer setting process.

Figure 33:
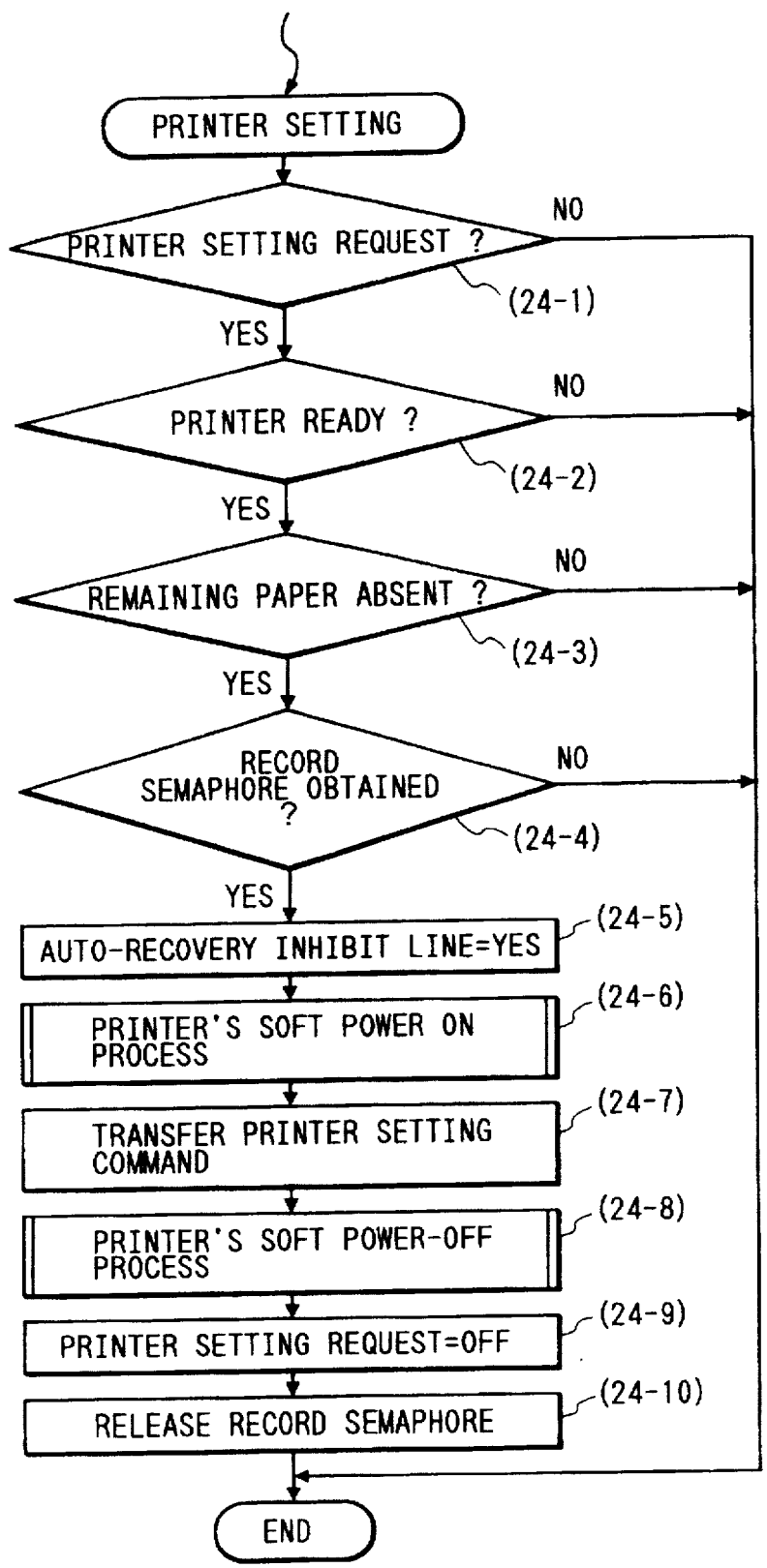
FIG. 33 is a flow chart showing the printer setting process sequence.

FIG. 33 shows the printer setting process.

The printer setting request is always monitored at 200-msec intervals (24-1). When the printer setting request is activated, it is checked if the printer is ready (24-2) and if a remaining paper sheet is absent (24-3). If Y in both steps 24-2 and 24-3, a record semaphore is obtained (24-4). If the record semaphore can be obtained, since the recovery operation is not required at that time, the auto-recovery inhibit signal line=YES is set (24-5), and thereafter, the soft power-ON process is executed (24-6). Thereafter, the setting contents are transferred to the printer 2 using the printer setting command (24-7). Subsequently, the soft power-OFF process is executed (24-8), the printer setting request is deactivated (24-9), and the record semaphore is released (24-10), thus ending the printer setting process.

Figure 34:
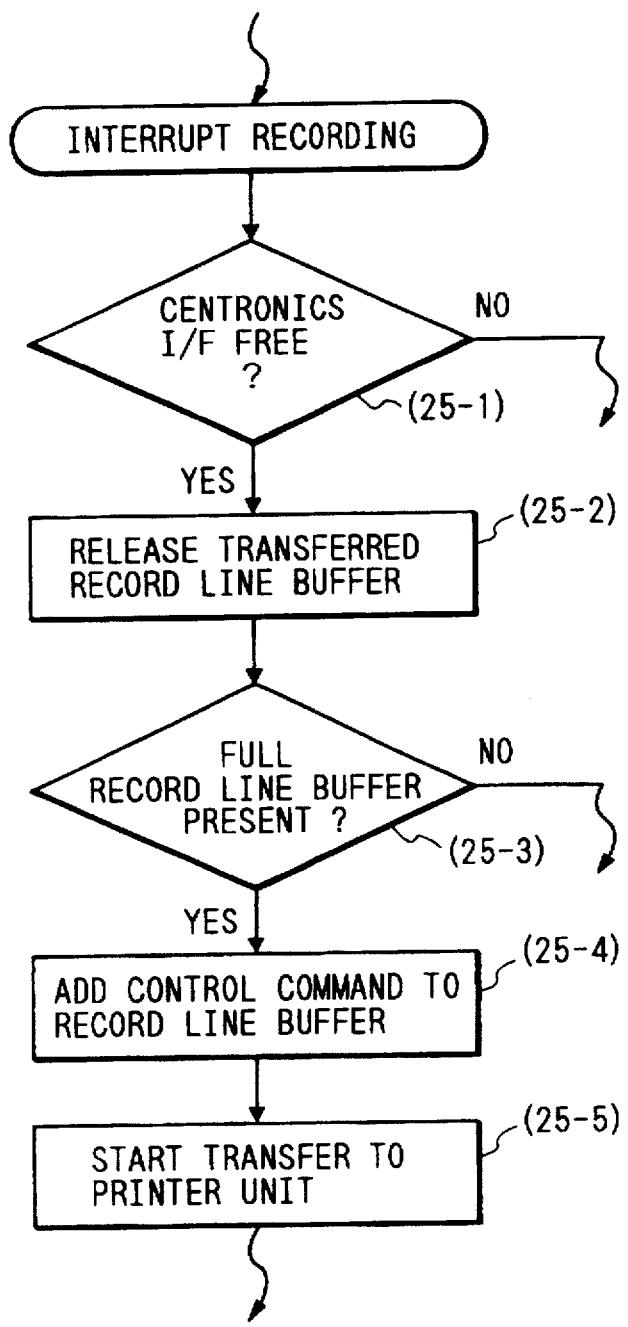
FIG. 34 is a flow chart showing the interrupt recording paper process sequence.

The interrupt process of recording in FIG. 22 will be described in detail below with reference to FIG. 34.

In the FAX mode, the FAX unit 1 executes the interrupt process of recording for transferring data in the record line buffer to the printer unit 2 in the 5-msec timer interrupts.

If the Centronics I/F 302 is free (25-1), the transferred record line buffer is released, and the next full record line buffer is acquired (25-2). When the reading operation or the received image record process is delayed and the next full record line buffer cannot be acquired (25-3), the interrupt process of recording ends. However, when the next record line buffer is acquired (25-3), control commands are added to before and after the next record line buffer which stores only print data (25-4) to obtain data in the FAX image command system. The FAX image command data begin to be transferred to the printer unit 2 via the Centronics I/F 302 (start DMA) (25-5), thus ending the interrupt process of recording. The printer unit 2 receives the FAX image command data, develops only image data on the raster buffer and the printer buffer, and prints the developed data.

The interrupt process of detection of a remaining ink amount shown in FIG. 22 will be described in detail below.

The remaining ink amount detect process includes two detection steps, i.e., ink detection and color recording paper detection. Only when "OK" is determined in both of the two steps, it is determined that the remaining ink amount detection result is "OK".

The ink detection uses the remaining ink amount detection result signal line, and the color recording paper detection uses the color recording paper signal line. Both the signal lines return effective results only when the remaining ink amount detection output signal line is in an "output" state.

Figure 35A:
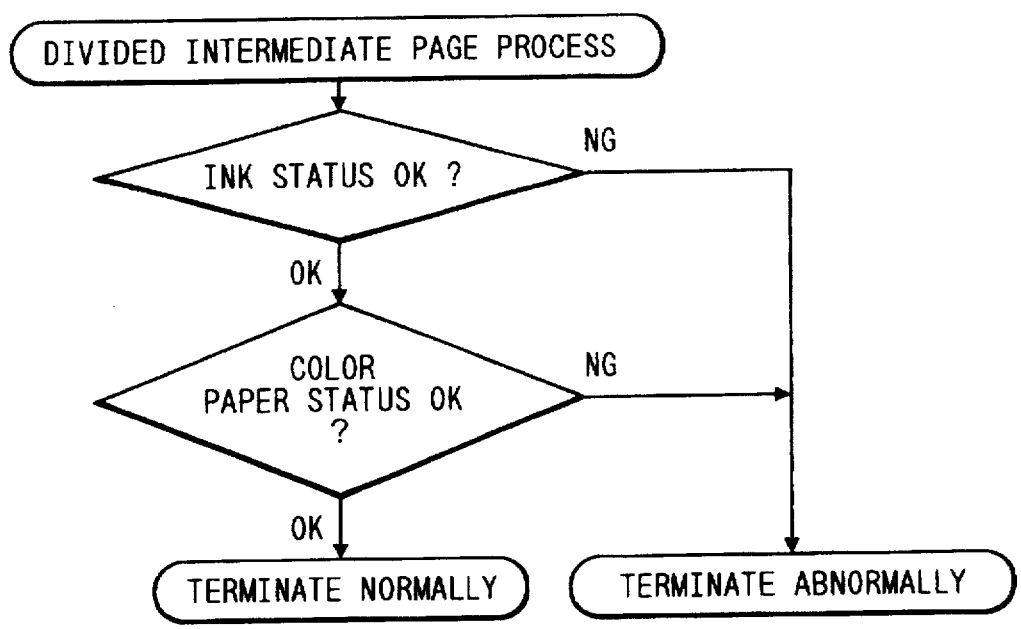
FIGS. 35A and 35B are flow charts showing the remaining ink amount detect process sequence.
Figure 35B:
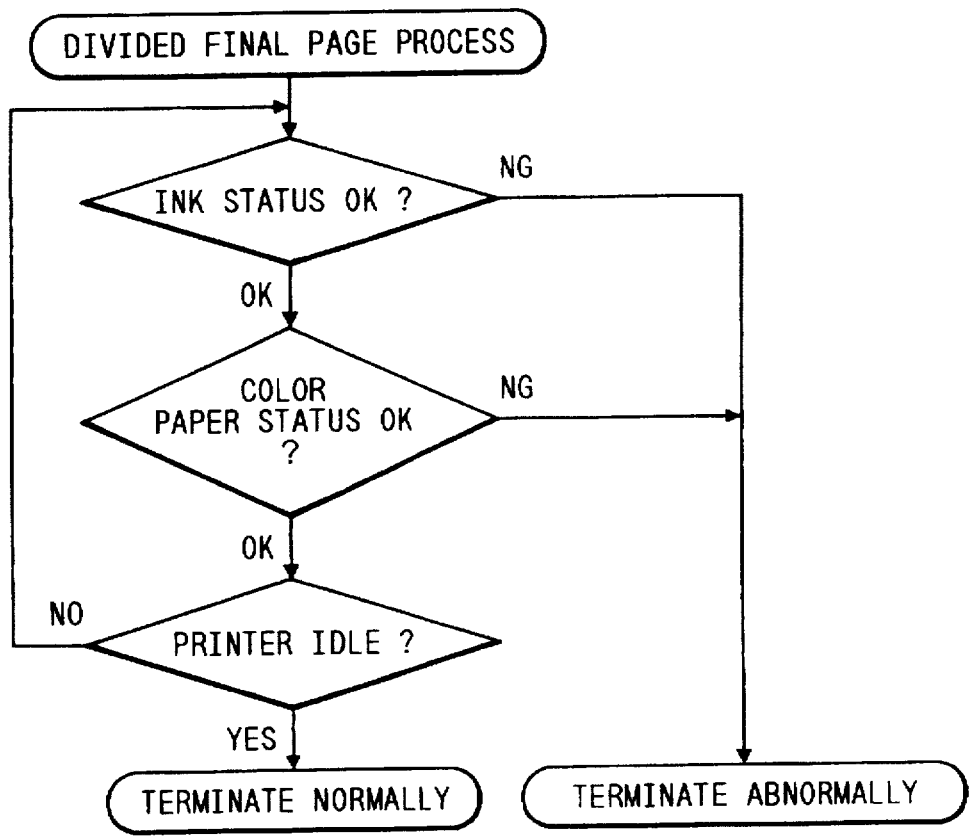

The remaining ink amount detect process includes two different process methods. One method is a divided intermediate page process executed when the length of received print data is larger than that of a recording paper sheet, and a divided print operation is performed, as shown in FIG. 35A. The other method is a process when a divided final page in the divided print operation is to be printed or when the length of received print data is shorter than that of a recording paper sheet, as shown in FIG. 35B. A major difference between these two processes is as follows. That is, in the divided intermediate page process, the process is terminated when the ink status (which is set in the interrupt process of detection of a remaining ink amount) and the color paper status are "OK". Contrary to this, in the divided final page process, the ink status and color status are kept monitored until the idle signal line of the printer unit 2 indicates an "idle" state.

In this connection, in the ink detection, it is determined if an ink is ejected. More specifically, the remaining ink amount detect mark (footer mark) recorded on the tail edge portion of a recording paper sheet is detected (black is detected by the photosensor).

On the other hand, in the color recording paper detection, color recording paper is detected (white is detected by the photosensor) to determine whether or not black of the remaining ink amount detect mark is effective.

Figure 36:
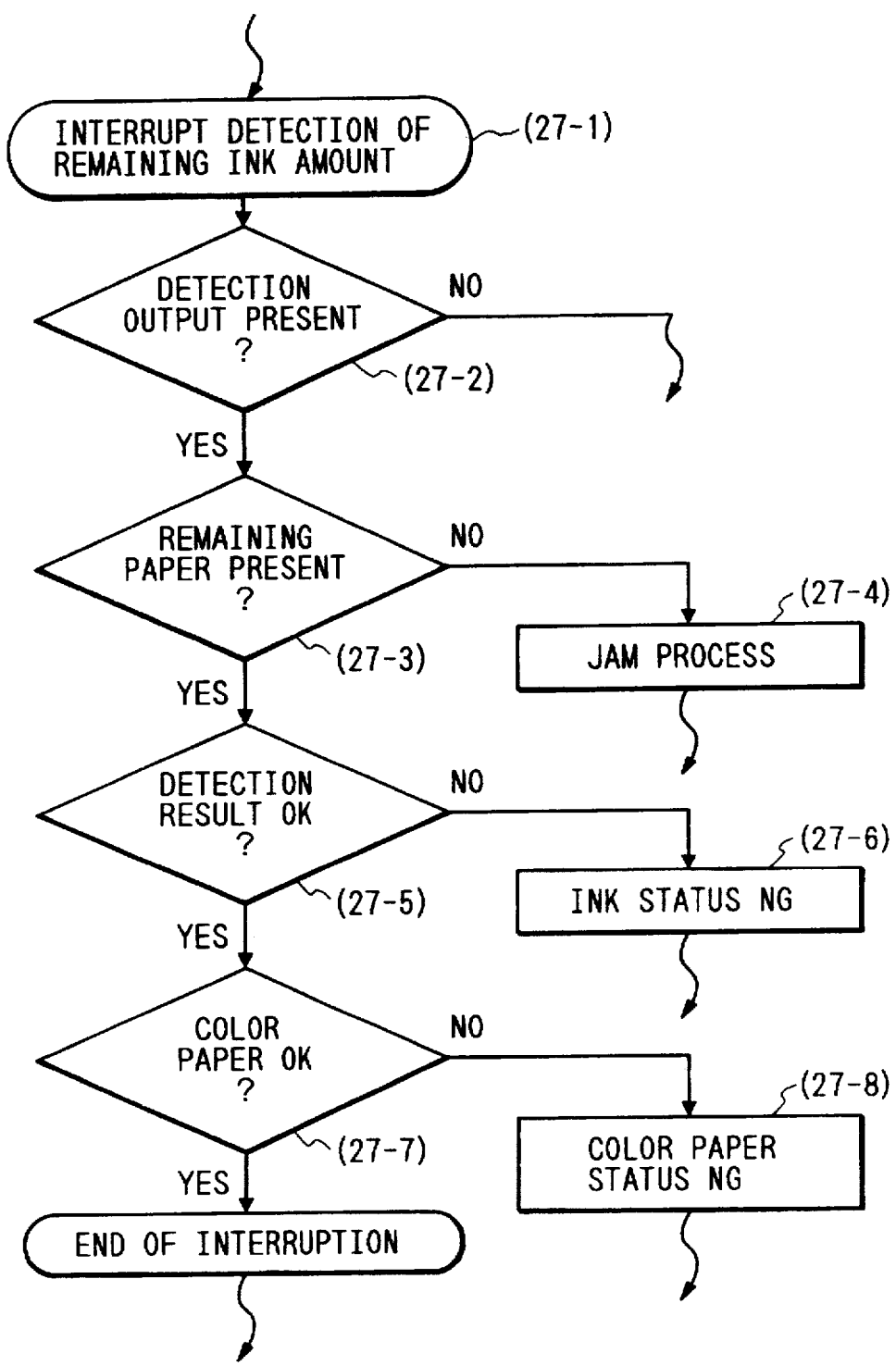
FIG. 36 is a flow chart for explaining the operation of the facsimile unit associated with the remaining ink amount detect process.

The operation of the FAX unit 1 associated with the remaining ink amount detect process will be described below with reference to FIG. 36.

The FAX unit 1 monitors the remaining ink amount detection output (27-2) in 5-msec timer interrupts (27-1). If the state of the remaining ink amount detection output is changed to "presence", it is checked if any remaining recording paper sheet is present (27-3). If a remaining recording paper sheet is present, a recording paper jam is determined (27-4). If no remaining recording paper sheet is present, the remaining ink amount detection result is checked (27-5). If the remaining ink amount detection result indicates "NG", the remaining ink amount detection status is set to be "NG". On the other hand, if the remaining ink amount detection result indicates "OK", color recording paper is detected. If the detection result of the color recording paper indicates "NG" (the recording paper sheet is color paper), the color recording paper status is set to be "NG" (27-6). On the other hand, if the detection result of the color recording paper indicates "OK" (the recording paper sheet is white paper) (27-7), it is determined that the print operation on the page of interest has normally ended, and the timer interrupt process is normally terminated.

The operation of the printer unit 2 associated with remaining ink amount detection will be described below with reference to FIG. 37.

Figure 38B:
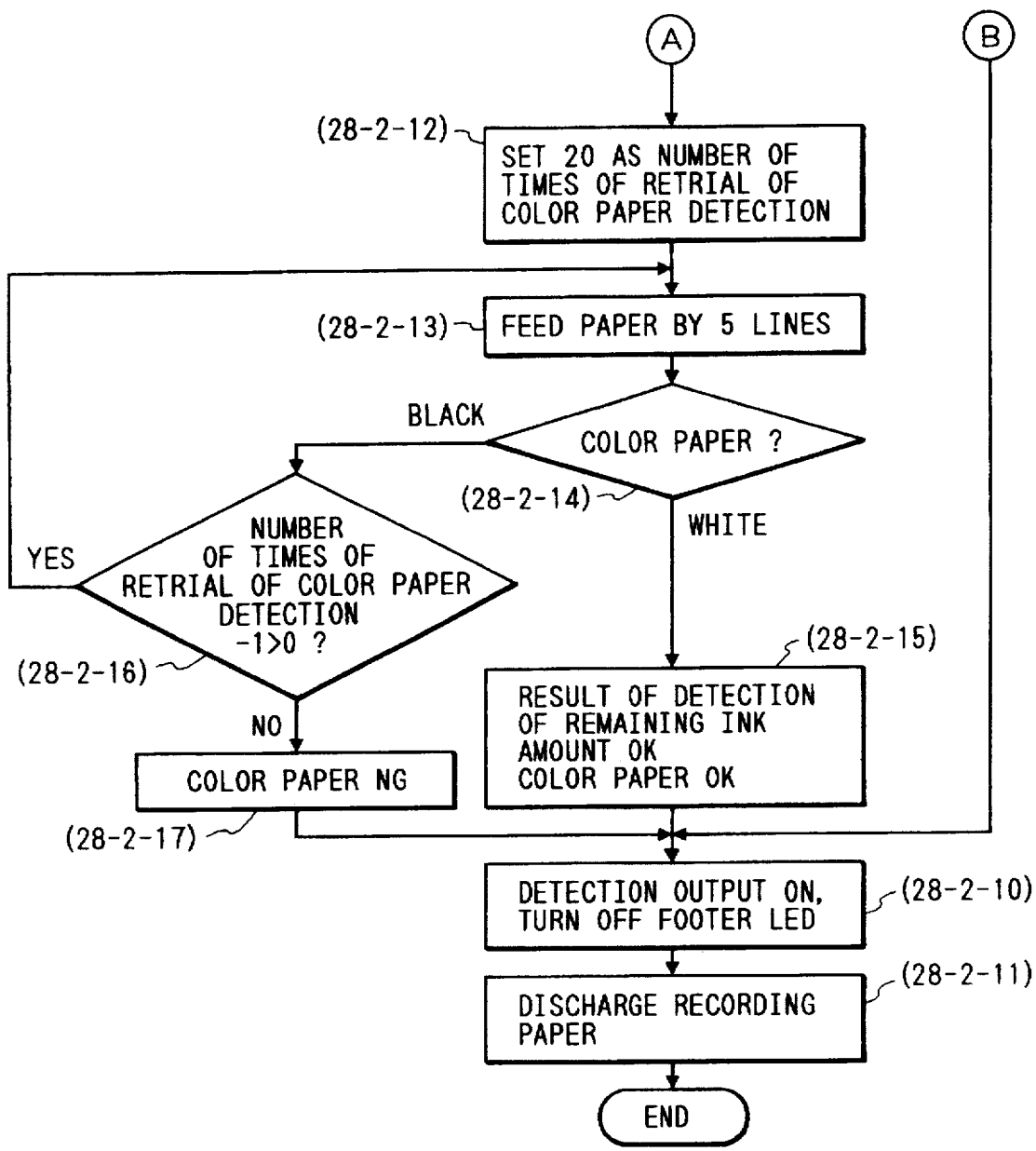
FIG. 38 is comprised of FIGS. 38A and 38B showing flow charts for explaining the footer detection operation for remaining ink amount detection.

In the paper feed process in the received image print mode, a footer print command is received from the FAX unit 1 (28-1-1). Footer character codes in the footer print command are stored in the footer buffer. After the footer print command is processed, a received image print operation is executed in accordance with a FAX image command received-from the FAX unit 1. After the print operation is performed by N scans or more (a variable N included in the footer print command) (28-1-2), detection of the tail edge of a recording paper sheet is started (28-1-3). When the tail edge of the recording paper sheet is detected by the PE sensor 206, a remaining ink amount detect process shown in FIGS. 38A and 38B is executed.

In the remaining ink amount detect process, it is checked if the print operation of the current page is normally performed in an ink presence state, and the following process is performed. The recording paper sheet is fed to a position where the footer character codes are to be printed. The footer character codes stored in the footer buffer are printed. If the printed remaining ink amount detection mark is not detected by the footer sensor 207, the remaining ink amount detection result=NG is returned to the FAX unit 1. On the other hand, if the remaining ink amount detection mark is detected by the footer sensor 207, the recording paper sheet is fed, and it is detected if the recording paper sheet is color paper. If it is determined that the recording paper sheet is color paper, the remaining ink amount detection result=NG is returned to the FAX unit. Upon completion of all the detect processes described above, the remaining ink amount detection output=OK is set to inform a message indicating this to the FAX unit 1, thus ending the remaining ink amount detect process.

Upon completion of the remaining ink amount detect process, the first page is discharged, and if print data of the next page is received (28-1-8), the second page is fed (28-1-7) to continue the print operation. If the print data received from the FAX unit 1 ends (28-1-6) before the tail edge of a recording paper sheet is detected (28-1-5), the remaining ink amount detect process is immediately executed. Thereafter, the recording paper sheet is discharged (28-1-7), and the printer unit is transferred to an idle state.

When the remaining ink amount detection status indicates "NG" or the color recording paper status indicates "NG", since the print operation of the current page may not be normally performed, the received image data of the current and subsequent pages are stored in the image memory.

The footer detection operation for remaining ink amount detection will be described in detail below with reference to FIGS. 38A and 38B.

Figure 37:
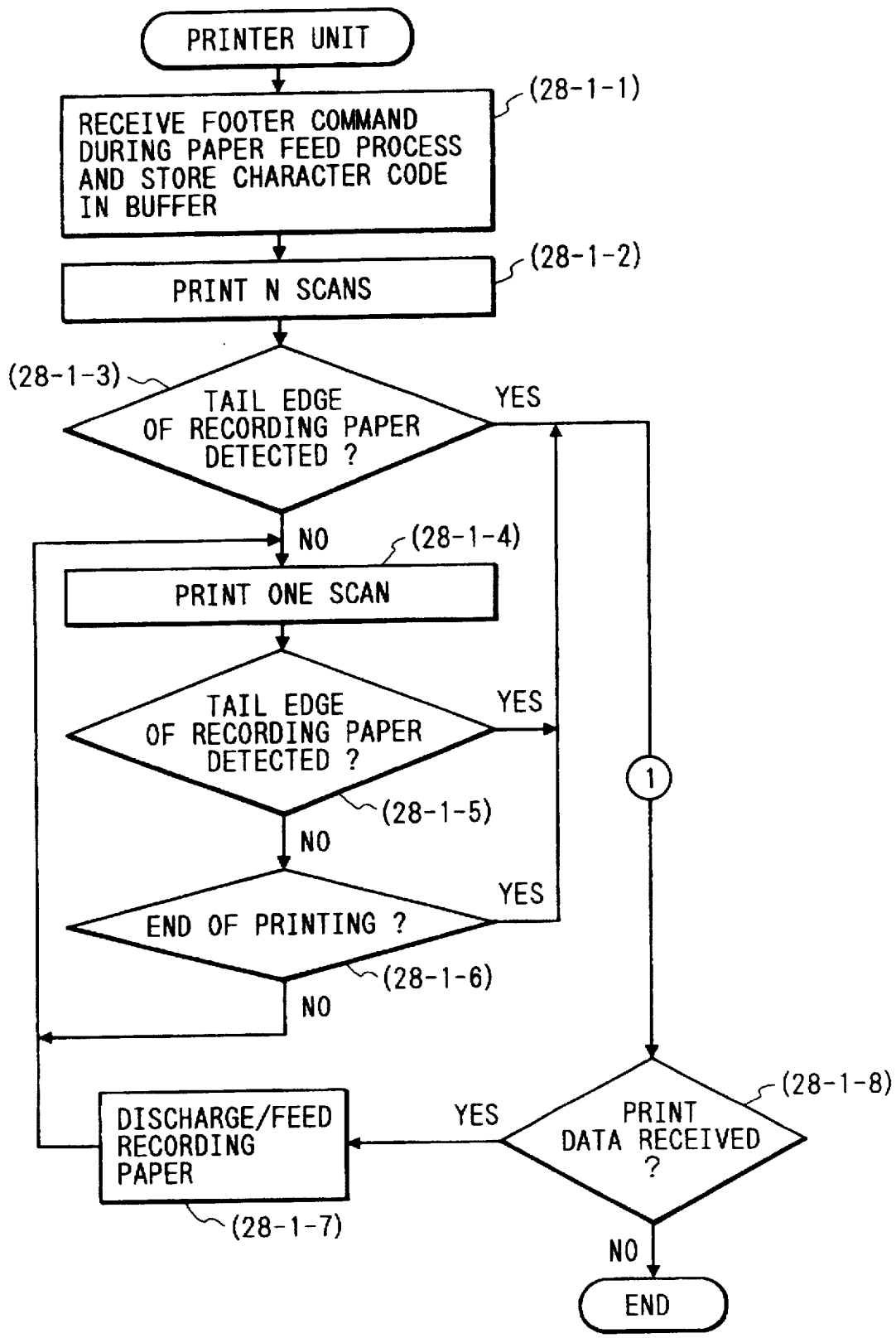
FIG. 37 is a flow chart for explaining the operation of the printer unit associated with the remaining ink amount detect process.

In FIG. 37, when the tail edge of the recording paper sheet is detected (28-1-3, 28-1-5) or when the print operation ends (28-1-6), the paper sheet is fed to the footer print position (28-2-1).

Furthermore, the character codes in the footer buffer are developed to dot patterns using the ROM 202, and the dot pattern data are transferred to the printer buffer and are printed (28-2-2). When the footer is printed, the LED of the footer sensor 207 is turned on. Then, the paper sheet is fed to a position where the footer mark can be detected by the footer sensor (207) (28-2-4).

When the paper feed operation is stopped after the paper sheet is fed to a desired position, the number of times of retrial of ink detection is set to be "4" (28-2-5), and the footer mark is sensed 20 times using the footer sensor 207 at that position (28-2-6). The reason why the footer mark is sensed 20 times is to prevent a detection error due to the influence of external light or the influence of wind near a paper discharge unit (not shown) since the footer sensor 207 is arranged at the downstream side of the recording paper convey path, as shown in FIG. 6.

If black is detected less than 10 times as a result of 20 times of footer mark detection, it is determined that the detection of the footer mark is unsuccessful, and the number of times of retrial of ink detection is decremented by "1" to retry the ink detection. If the number of times of retrial does not reach "0" (28-2-7), the paper sheet is fed by a distance corresponding to 10 lines, and the footer mark is sensed 20 times again (28-2-6). The number of times of retrial of footer mark detection is set to be "4" and the number of lines of the paper feed operation is set to be "10" since the footer mark has a length corresponding to 40 lines.

When the above-mentioned footer mark detection operation is performed until the number of times of retrial of ink detection becomes "0", the remaining ink amount detection result is set to be "NG" (28-2-9), the remaining ink amount detection output is set to be "ON", and the footer LED is turned off (28-2-10). Furthermore, the recording paper sheet is discharged (28-2-11), and the control returns to step (28-1-8) in FIG. 37.

When black is detected 10 times or more as a result of 20 times of footer mark detection (28-2-6), it is determined that the footer mark detection is successful, and the number of times of retrial of color paper is set to be "20" (28-2-12). Then, the paper sheet is fed by 5 lines, and the footer sensor 207 senses if the recording paper sheet is color paper (28-2-14). If white is detected, the remaining ink amount detection result and color recording paper status are set to be "OK" (28-2-15). Furthermore, the remaining ink amount detection output is set to be "ON", and the footer LED is turned off (28-2-10). The recording paper sheet is discharged (28-2-11), and the control returns to step (28-1-11) in FIG. 37.

On the other hand, if the footer sensor 207 detects black, the number of times of retrial of color paper detection is decremented by "1" (28-2-16), and the paper sheet is fed by 5 lines (28-2-13). This operation is repeated 20 times.

When white cannot be detected during 20 times of detection, it is determined that the recording paper sheet is color paper, and the color recording paper status is set to be "NG" (28-2-17). Then, the remaining ink amount detection output is set to be "ON", and the footer LED is turned off (28-2-10). The recording paper sheet is discharged (28-2-11), and the control returns to step (28-1-8) in FIG. 37.

The feed amount (5 lines) of the paper sheet after the footer mark detection is smaller than the feed amount (10 lines) before the footer mark detection for the following reason.

More specifically, since the footer mark is printed at a position near the tail edge of the paper sheet, if a large paper feed amount is set, a white portion cannot be detected if the white portion after the footer mark is printed is small. In order to prevent this, a small paper feed amount is set.

(Second Embodiment)

FIG. 39 is a block diagram showing the arrangement of a FAX apparatus according to the second embodiment of the present invention. Note that the mechanical arrangement of the FAX apparatus of this embodiment is the same as that of the above embodiment, and a detailed description thereof will be omitted.

A FAX controller 501 comprises a CPU 504, a ROM 503, a RAM 502, and the like, and controls the entire FAX apparatus including a reader 500, a console unit 508, a communication unit 505, a recorder 510, and the like. The ROM 503 stores control programs (to be described later). The RAM 502 is used as a work area of the CPU 504, and is also used as an image memory and the like. The reader 500 comprises a CCD, an original feed system, an image process unit, and the like, and reads an image to be transmitted or copied. The read image is stored in the RAM 502. The communication unit 505 comprises a modem 506, a network control unit (NCU) 507, and the like, and performs transmission/reception of image data and control of communication protocols. The console unit 508 comprises a display unit (LCD), a ten-key pad, switches such as one-touch keys, and the like, and achieves an interface with a user. The recorder 510 comprises a CPU 511, a ROM 512, a RAM 513, a recording paper feed system, a sensor, a head, a carriage driving system, and the like, and is controlled by a host device connected thereto via a selector 509. The CPU 511 controls the print operation of the recorder 510, and achieves an interface with the host device. The ROM 512 stores control programs and character data of the recorder 510. The RAM 513 is used as a work area of the CPU 511, and is also used as an image buffer and the like. A control line D is a control line which is output from the FAX controller 501 and used for ON/OFF-controlling the power supply of the recorder 510. The power supply of the recorder 510 is ON/OFF-controlled via the control line D. The selector 509 is switched by a control line C output from the FAX controller 501, and selects if the host device for the recorder 510 is the FAX side (the side A) or a computer side (the side B) connected to a connector 514.

The operations of the FAX apparatus will be described below with reference to the flow charts.

(Copy Mode)

Figure 40:
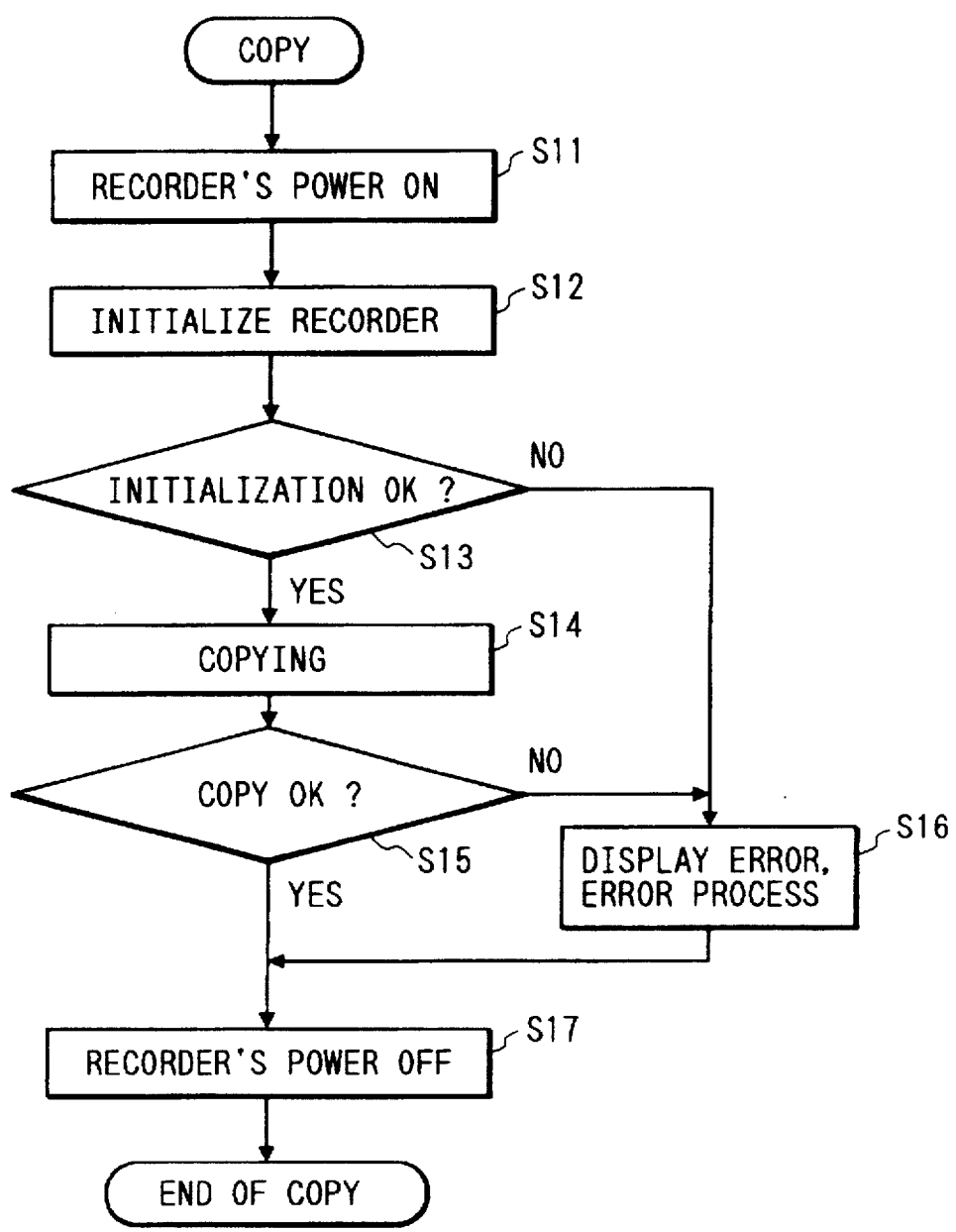
FIG. 40 is a flow chart showing the operation in a copy mode of the facsimile apparatus according to the second embodiment of the present invention.

The operation in the copy mode will be described below with reference to FIG. 40. When a user sets original sheets on the reader 500, and depresses a copy key on the console unit 508, the FAX controller 501 turns on the power supply of the recorder 510 via the control line D (S11). Upon detection of a power-ON instruction from the control line D, the recorder 510 executes an initialization process (S12). It is then checked if the initialization result is "OK" (S13). If the initialization result is "NG", an error message is displayed and an error process is executed (S16). Thereafter, the FAX controller 501 turns off the power supply of the recorder 510 (S17). On the other hand, if the initialization result is "OK", a copy operation is performed (S14). It is checked if the result of the copy operation is "OK" (S15). If the result of the copy operation is "OK", the FAX controller 501 turns off the power supply of the recorder 510 via the control line D. However, if the result of the copy operation is "NG", an error message is displayed (S16), and the FAX controller 501 turns off the power supply of the recorder 510 (S17).

(Reception Mode)

Figure 41:
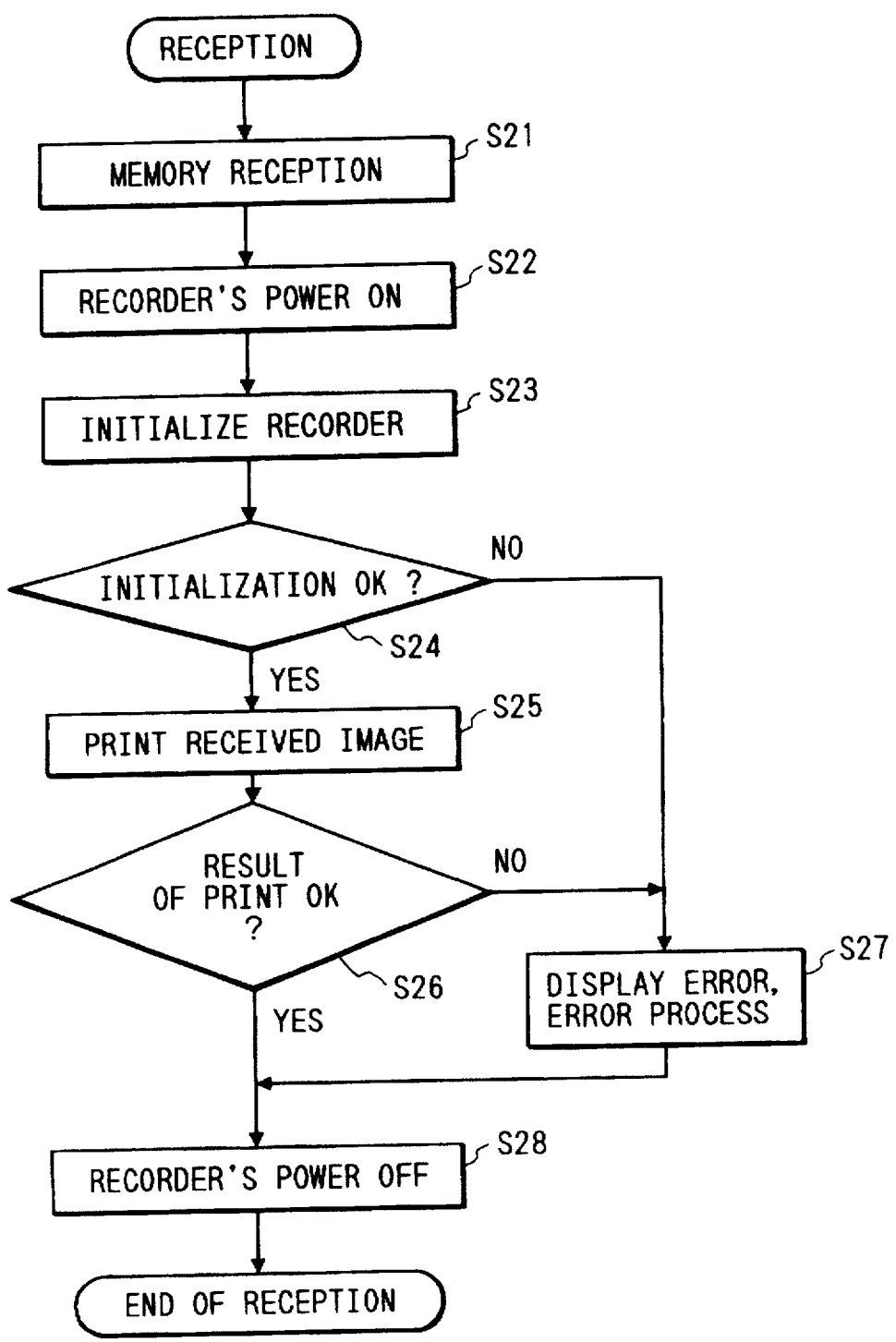
FIG. 41 is a flow chart showing the operation in a reception mode of the facsimile apparatus according to the second embodiment of the present invention.

The operation in the reception mode will be described below with reference to FIG. 41. Upon detection of a calling signal (Ci) from a line, the communication unit 505 holds the line via the NCU 507, and receives an image signal via the modem. Received image data is stored in the RAM 502 (memory reception; S21). The FAX controller 501 turns on the power supply of the recorder 510 via the control line D (S22). Upon reception of a power-ON instruction, the recorder 510 performs an initialization process (S23). Then, the result of the initialization process is checked (S24). If the result of the initialization process is "NG", an error message is displayed and an error process is executed (S27). Thereafter, the FAX controller 501 turns off the power supply of the recorder 510. On the other hand, if the result of the initialization process is "OK", the received image is printed (S25). Then, the print result is checked (S26). If the print result is "OK", the FAX controller 501 turns off the power supply of the recorder 510 (S28). However, if the print result is "NG", an error message display and an error process are executed (S28), and thereafter, the FAX controller 501 turns off the power supply of the recorder 510.

(Printer Setting Mode)

Figure 42:
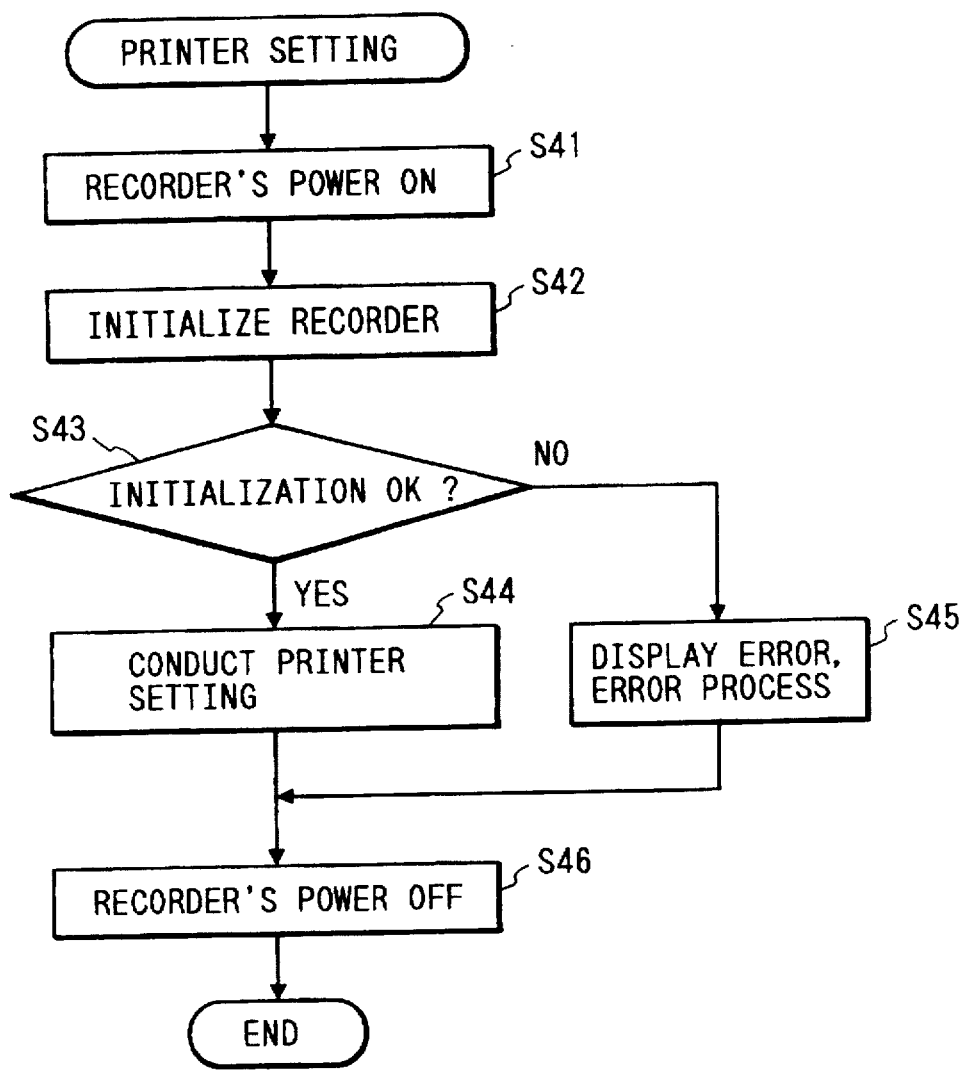
FIG. 42 is a flow chart showing the operation in a printer setting mode of the facsimile apparatus according to the second embodiment of the present invention.
Figure 43:
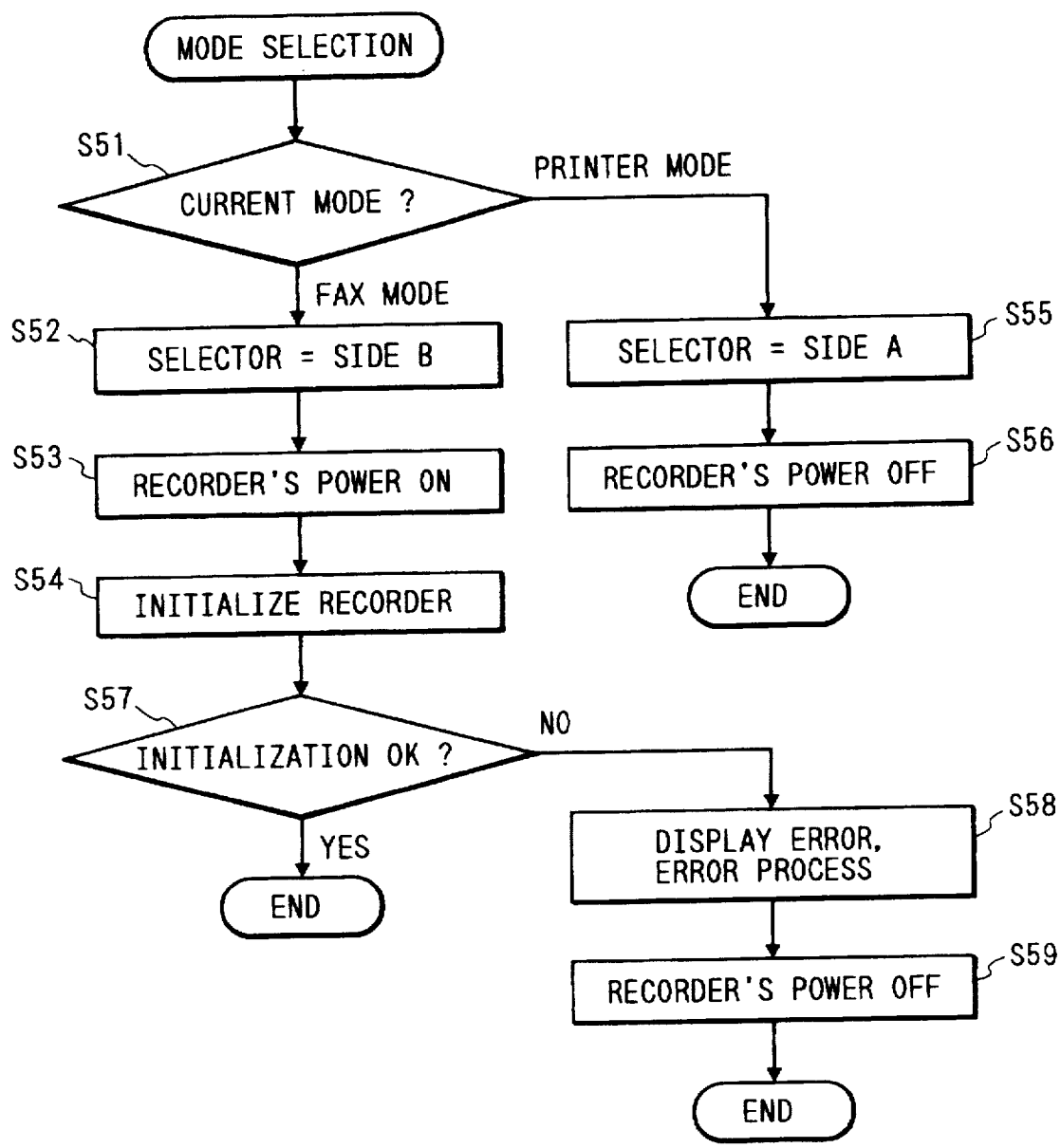
FIG. 43 is a flow chart showing the operation in a mode selection state of the facsimile apparatus according to the second embodiment of the present invention.

The operation in the printer setting mode will be described below with reference to FIG. 42. In the printer setting mode, an operation mode such as an emulation mode, codes, fonts, and the like in the printer mode are set. When a user starts the printer setting mode by a predetermined operation of keys on the console unit 508 and begins to set parameters, the FAX controller 501 turns on the power supply of the recorder 510 (S41). Then, the result of the initialization process is checked (S43). If the result of the initialization process is "OK", the printer mode parameters are set in accordance with key input data from the console unit 508 (S44). Upon completion of setting, the FAX controller 501 turns off the power supply of the recorder 510 (S46). On the other hand, if the result of the initialization process of the recorder is "NG", an error message display and an error process are executed (S45), and the power supply of the recorder 510 is turned off.

(Printer Mode)

Each time a mode select key arranged on the console unit 508 is depressed, the FAX apparatus is switched between a FAX mode and a printer mode. In the FAX mode, the recorder operates as a FAX printer. On the other hand, in the printer mode, the recorder operates as a printer of a computer connected to the connector. When the mode select key is depressed, it is checked if the current mode is the FAX mode or the printer mode (S51). If the current mode is the printer mode, the FAX controller 501 switches the selector to the side A via the control line C (S55), and turns off the power supply of the recorder 510, thus ending the mode select process. However, if it is determined that the current mode is the FAX mode, the FAX controller 501 switches the selector 509 to the side B via the control line C to select the computer as the host device of the recorder (S52). The FAX controller turns on the power supply of the recorder 510 (S53), and initializes the recorder (S54). Then, the result of the initialization process is checked (S57). If the result of the initialization process is "OK", the mode select process ends; otherwise, an error message display and an error process are performed (S58), and the power supply of the recorder is turned off.

(Operation Upon Power-ON of Recorder)

Figure 44:
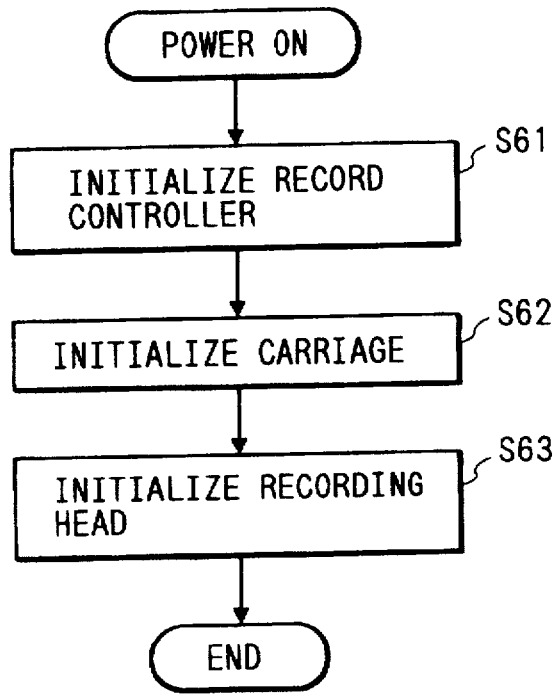
FIG. 44 is a flow chart showing the initialization process upon power-ON of a recording unit of the facsimile apparatus according to the second embodiment of the present invention.

The operation upon power-ON of the recorder 510 will be described below with reference to FIG. 44. Upon detection of a power-ON instruction from the FAX controller 501, the recorder 510 performs various initialization operations. First, a record controller is initialized (checking of the RAM, initialization of the work area, and the like) (S61). Then, a carriage is initialized (setting of a reference position) (S62). Lastly, a recovery process is executed to initialize an ink-jet type recording head (S63).

(Operation Upon Power-OFF of Recorder)

Figure 45:
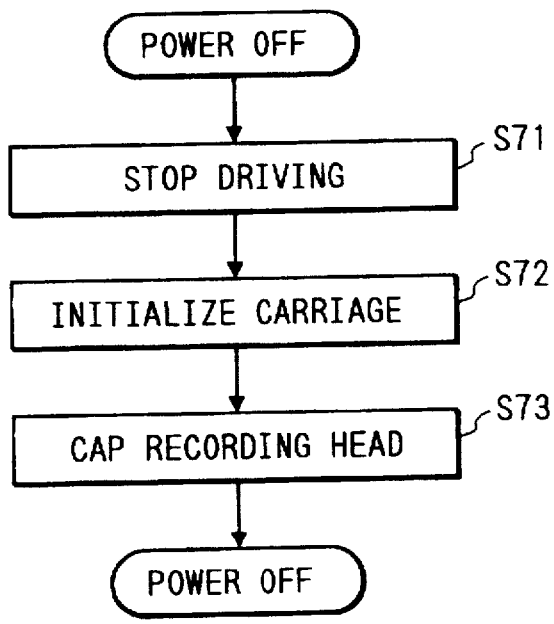
FIG. 45 is a flow chart showing the process upon power-OFF of the recording unit of the facsimile apparatus according to the second embodiment of the present invention.

The operation upon power-OFF of the recorder will be described below with reference to FIG. 45. Upon detection of a power-OFF instruction from the FAX controller 501, the recorder 510 stops the driving operations of heaters, motors, and the like (S71). Then, the recorder initializes the carriage (i.e., returns the carriage to the home position) (S72), caps the recording head (S73), and thereafter, transfers to a power-OFF state. During the power-OFF state, the recorder monitors only the power supply control line D from the FAX controller, and upon detection of a power-ON instruction, the recorder starts the power-ON initialization process.

As described above, according to this embodiment, the following effects are expected:

Since the power supply of the recorder is turned on only in the print operation of the apparatus and in the printer setting mode, electric power consumed by the recorder can be saved.

Since the power supply of the recorder is turned off immediately after the end of the print operation and the printer setting mode, the ejection surface of the recording head is positively capped to prevent clogging of the head.

(Third Embodiment)

In the above-mentioned second embodiment, when a standby function of the CPU 511 of the recorder is used in the power-OFF state of the recorder, the operation of the internal circuit of the CPU 511 can be stopped, thus more effectively saving electric power consumed by the recorder. At this time, the control line D output from the FAX controller 501 is connected to an interrupt terminal of the CPU 511.

As described above, since the power supply of the recorder is turned on only in the print operation and the printer setting mode, unnecessary power consumption can be prevented. Since the initialization process of the recorder is performed before each print operation, the print operation can be reliably performed even in an ink-jet printer with unstable print reliability. Also, by utilizing the standby function of the CPU in the recorder, the power saving effect and the clogging prevention effect of the ink-jet head can be more effectively expected.

In the above embodiments, a recording apparatus adopting an ink-jet recording system for performing recording by forming flying ink droplets utilizing heat energy, among ink-jet recording systems, has been exemplified. As the representative arrangement and principle of the ink-jet recording system, one practiced by use of the basic principle disclosed in, for example, U.S. Pat. Nos. 4,723,129 and 4,740,796 is preferred. The above system is applicable to either one of a so-called on-demand type and a so-called continuous type. Particularly, in the case of the on-demand type, the system is effective because, by applying at least one driving signal, which corresponds to recording information and gives a rapid temperature rise exceeding nucleate boiling, to each of electro-thermal energy conversion elements arranged in correspondence with a sheet or liquid channels holding liquid (ink), heat energy is generated by the electro-thermal conversion element to effect film boiling on the heat acting surface of the recording head, and consequently, a bubble can be formed in the liquid (ink) in one-to-one correspondence with the driving signal. By ejecting the liquid (ink) through an ejection orifice by growth and shrinkage of the bubble, at least one droplet is formed. If the driving signal is applied as a pulse signal, the growth and shrinkage of the bubble can be attained instantly and adequately to achieve ejection of the liquid (ink) with the particularly high response characteristics.

As the pulse driving signal, signals disclosed in U.S. Pat. Nos. 4,463,359 and 4,345,262 are suitable. Note that further excellent recording can be performed by using the conditions described in U.S. Pat. No. 4,313,124 of the invention which relates to the temperature rise rate of the heat acting surface.

As an arrangement of the recording head, in addition to the arrangement as a combination of ejection orifices, liquid channels, and electro-thermal energy conversion elements (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention.

In addition, the present invention can be effectively applied to an arrangement based on Japanese Laid-Open Pat. Application No. 59-123670 which discloses an arrangement using a common slit as an ejection portion of electro-thermal energy conversion elements, or Japanese Laid-Open Patent Application No. 59-138461 which discloses an arrangement having an opening for absorbing a pressure wave of heat energy in correspondence with an ejection portion.

Furthermore, as a full line type recording head having a length corresponding to the width of a maximum recording medium which can be recorded by the recording apparatus, either an arrangement which satisfies the full-line length by combining a plurality of recording heads as disclosed in the above specification or an arrangement as a single recording head obtained by forming recording heads integrally can be used.

In addition, the present invention is effective for a case using an exchangeable chip type recording head which can be electrically connected to the apparatus main body or can receive an ink from the apparatus main body upon being mounted on the apparatus main body, or a cartridge type recording head in which an ink tank is integrally arranged on the recording head itself.

It is preferable to add recovery means for the recording head, preliminary auxiliary means, and the like since the effect of the present invention can be further stabilized. Examples of such means include, for the recording head, capping means, cleaning means, pressurization or suction means, and preliminary heating means using electro-thermal energy conversion elements, another heating element, or a combination thereof. It is also effective for stable recording to execute a preliminary ejection mode which performs ejection independently of recording.

In the embodiments of the present invention, an ink is described as a liquid. Alternatively, the present invention may employ an ink which is solidified at room temperature or less, and is softened or liquefied at room temperature, or an ink, which is liquefied upon application of a use recording signal since it is a general practice to perform temperature control of the ink itself within a range between 30° C. and 70° C. in an ink-jet system so that the ink viscosity can fall within a stable ejection range.

In addition, a temperature rise caused by heat energy may be prevented by positively utilizing the temperature rise as energy for a change in state from a solid state to a liquid state of the ink, or an ink which is solidified in a non-use state may be used for the purpose of preventing evaporation of the ink. In any case, the present invention can be applied to a case wherein an ink, which can be liquefied by heat energy such as an ink which is liquefied upon application of heat energy according to a recording signal, and is ejected in a liquid state, an ink which begins to solidify when it reaches a recording medium, or the like may be used. In this case, an ink may be held in a liquid or solid state in recess portions or through holes of a porous sheet, as described in Japanese Laid-Open Patent Application No. 54-56847 or 60-71260, and the porous sheet may be arranged to oppose electro-thermal converting elements. In the present invention, the above-mentioned film boiling system is most effective for the above-mentioned inks.

Also, the present invention is not limited to an ink-jet system which utilizes heat energy but may be applied to an ink-jet system which utilizes piezoelectric elements and the like.

As described above, since the first initialization process is executed upon power-ON of the apparatus to set the recorder in a standby state, and the second initialization process is executed upon generation of an initialization factor to allow operation of the recorder, the initialization time can be shortened as compared to a case wherein the same initialization process as in that upon power-ON is performed each time the recorder is to be initialized, and the performance of the apparatus can be improved. In addition, an operation error caused by remaining data or the like can be prevented.

Since the initialization process is executed upon power-ON of the apparatus to set the recorder in the standby state, and power consumption of members except for recording control means in the recorder is limited in the standby state, unnecessary power consumption can be prevented.

The first initialization process is executed upon power-ON of the apparatus to set the recorder in a standby state, and the second initialization process is executed in response to a recording start request or a recording mode setting request. In addition, when the operation of the recorder is terminated with an error, the recorder stands by in a state equivalent to that after the end of the first initialization process. For these reasons, an error canceling operation can be facilitated.

Since a power-ON process of the recorder is executed in response to a recording start request or a recording mode setting request, and a power-OFF process of the recorder is executed in response to an end of recording or a setting operation of the recording mode, unnecessary power consumption can be prevented.

Furthermore, in the power-OFF process, since capping of the recording head is performed, the ejection surface of the recording head can be subjected to a preservation process immediately after the end of recording, and clogging of the recording head can be prevented.

(Fourth Embodiment)

The fourth embodiment of the present invention will be described below. In this embodiment, in a FAX apparatus which can selectively use a recorder in a FAX mode for recording a FAX image or in a printer mode in which the recorder is utilized as a versatile printer upon operation of a select key, a print operation after the print operation in the printer mode is interrupted can be efficiently performed without arranging any reset key.

More specifically, a function of executing an operation for erasing print data stored in a memory in the apparatus upon operation of the select key is provided. Also, a function of initializing the recorder upon operation of a key for switching a data input select switch of the recorder is provided.

This embodiment will be described in detail below.

Figure 46:
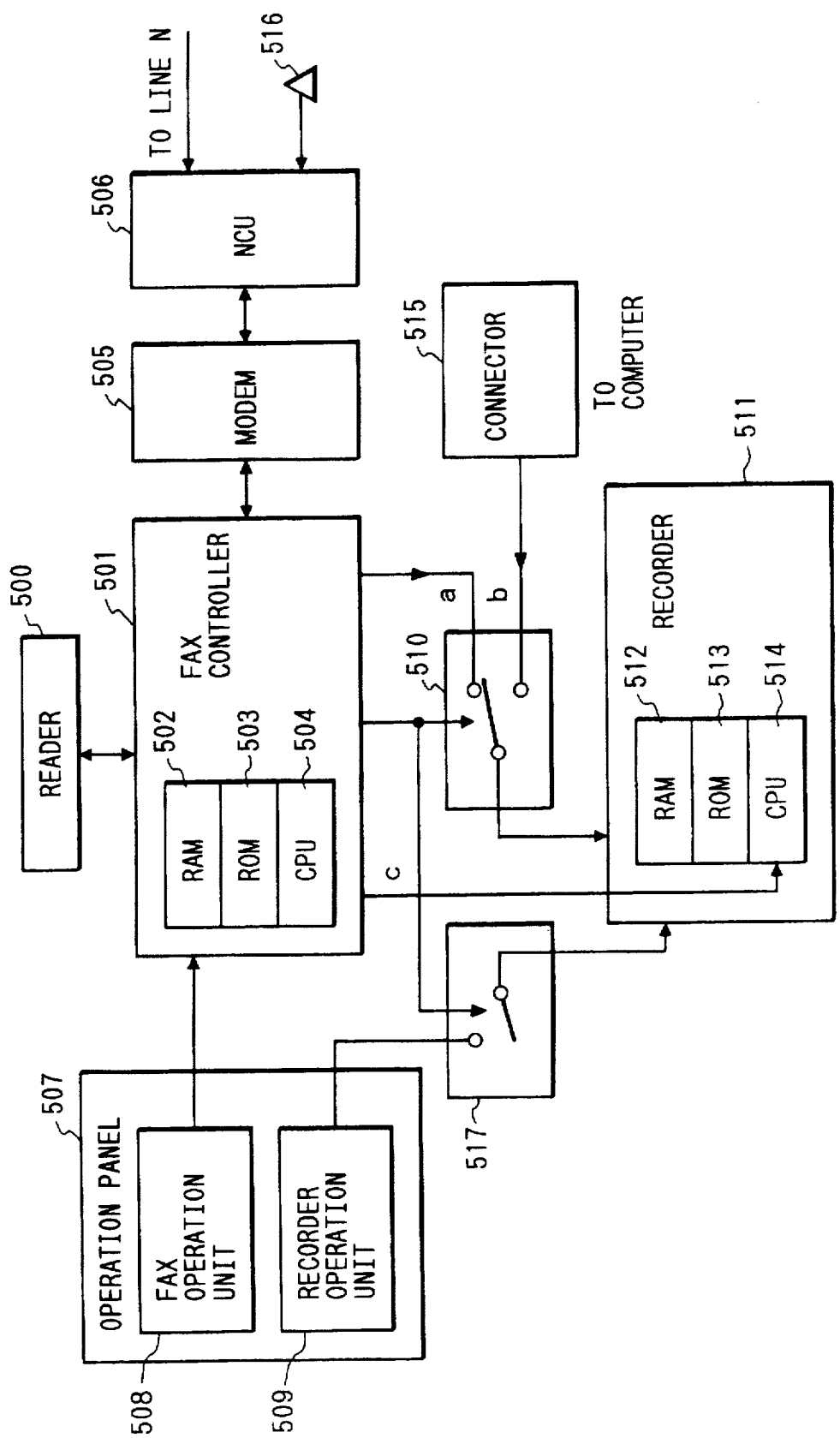
FIG. 46 is a block diagram showing the third embodiment of the present invention.

FIG. 46 is a block diagram showing the arrangement of a FAX apparatus according to the fourth embodiment of the present invention. Note that the mechanical arrangement of the FAX apparatus of this embodiment is the same as that in the first embodiment, and a detailed description thereof will be omitted.

A FAX controller 501 comprises, e.g., a microprocessor, and the like, and includes a CPU 504, a ROM 503, a RAM 502, and the like. The FAX controller 501 controls image input/output and communication processes in the apparatus of this embodiment. The ROM 503 stores control programs (to be described later). The RAM 502 is used as a work area of the CPU 504, and is also used as a buffer for image data, and the like.

The image input/output process is executed by a reader 500 and a recorder 511. More specifically, original image data is read by the reader 500, which comprises a CCD (charge-coupled device) sensor, an original feed system, and the like. Received image data or image data read by the reader 500 in a copy mode is printed on a paper sheet by the recorder 511 which comprises an ink-jet printer.

Connection and data input/output processes with a communication line N such as a telephone line are attained by a modem 505 and an NCU (network control unit) 506. The NCU 506 is connected to a telephone set 516 which is used in a speech communication and manual control.

The recorder 511 comprises an ink-jet head, a recording paper feed means, and a control means. The control means includes a CPU 514, a ROM 513 for storing control programs for the CPU 514 and a character generator, and a RAM 512 which is used as a work area of the CPU 514 and a buffer for print data.

A switch 510 is switched under the control of the FAX controller 501. When the switch 510 is switched to side a, FAX received data is supplied to the recorder 511 and is printed (a FAX mode). When the switch 510 is switched to side b, the recorder 511 operates as an independent printer (a printer mode). More specifically, print data supplied from a computer connected to a connector 515 is supplied to the recorder 511 and is printed.

The CPU 514 buffers print data input via the switch 510 in a FIFO buffer on the RAM 512.

At the same time, the CPU 514 analyzes input data, generates image data to be printed using the character generator stored in the ROM 513, and executes a print operation.

Note that buffering and analysis are simultaneously executed as multi tasks. More specifically, in general, a combination of analysis and printing is performed at low speed since it requires a mechanical operation, while fetching of data (buffering) is performed at high speed since only electrical signals are exchanged.

Therefore, some print data are normally buffered on the buffer.

A signal c is a reset signal of the recorder 511. The controller 501 can initialize the recorder 511 by outputting the reset signal c.

Figure 49:
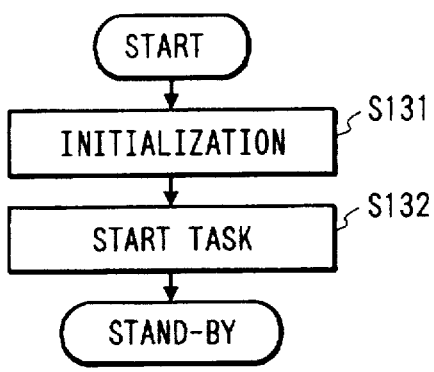
FIG. 49 is a flow chart showing the start operation of a recording unit in the third embodiment.

The operation of this embodiment will be described below with reference to FIG. 49. FIG. 49 is a flow chart showing the operation immediately after the power supply of the recorder 511 is turned on and immediately after the recorder 511 is reset.

In step S131, an initialization operation is executed. This initialization operation includes an erase operation of print data in the buffer memory, initialization of hardware components, and a self-check operation.

In step S132, various tasks are started, and the recorder is set in a standby state. Various tasks include a task for fetching print data and storing the fetched data in the buffer memory, a task for analyzing the stored print data and converting the print data into print image data, and the like.

More specifically, when the reset signal c is input to the reset terminal of the CPU 514, the data stored in the FIFO buffer on the RAM 512 are erased.

On an operational panel 507, a FAX operational unit 508 and a recorder operational unit 509 are arranged.

The FAX operational unit 508 includes a ten-key pad used for inputting a telephone number, various function keys, a select key for switching the operation mode between the FAX mode and the printer mode, a display used for displaying a telephone number, time, and the like, and the like.

The recorder operational unit 509 includes a key used by a user to designate a print mode of the recorder 511, a display for displaying the current display mode, an on-line key, and a display for indicating an on-line state.

A switch 517 is switched under the control of the FAX controller 501 as in the above-mentioned switch 510. When the switch 510 is at the side a, the switch 517 is disconnected. More specifically, in the FAX mode, the recorder 511 is disconnected from the recorder operational unit 509, so that no information is displayed on the displays of the recorder operational unit 509, and no key operations are accepted. Therefore, a user feels as if the power supply of the recorder 511 was disconnected.

In the printer mode, the switch 517 is connected to side b, and the displays of the recorder operational unit 509 display various kinds of information in the printer mode. In addition, key operations are transmitted to the recorder controller.

The operation of the FAX controller 501 will be described below with reference to the flow charts in FIGS. 47 and 48.

Figure 47:
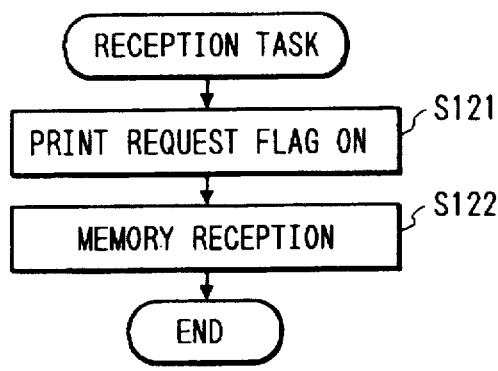
FIG. 47 is a flow chart showing the FAX reception task operation in the third embodiment.
Figure 48:
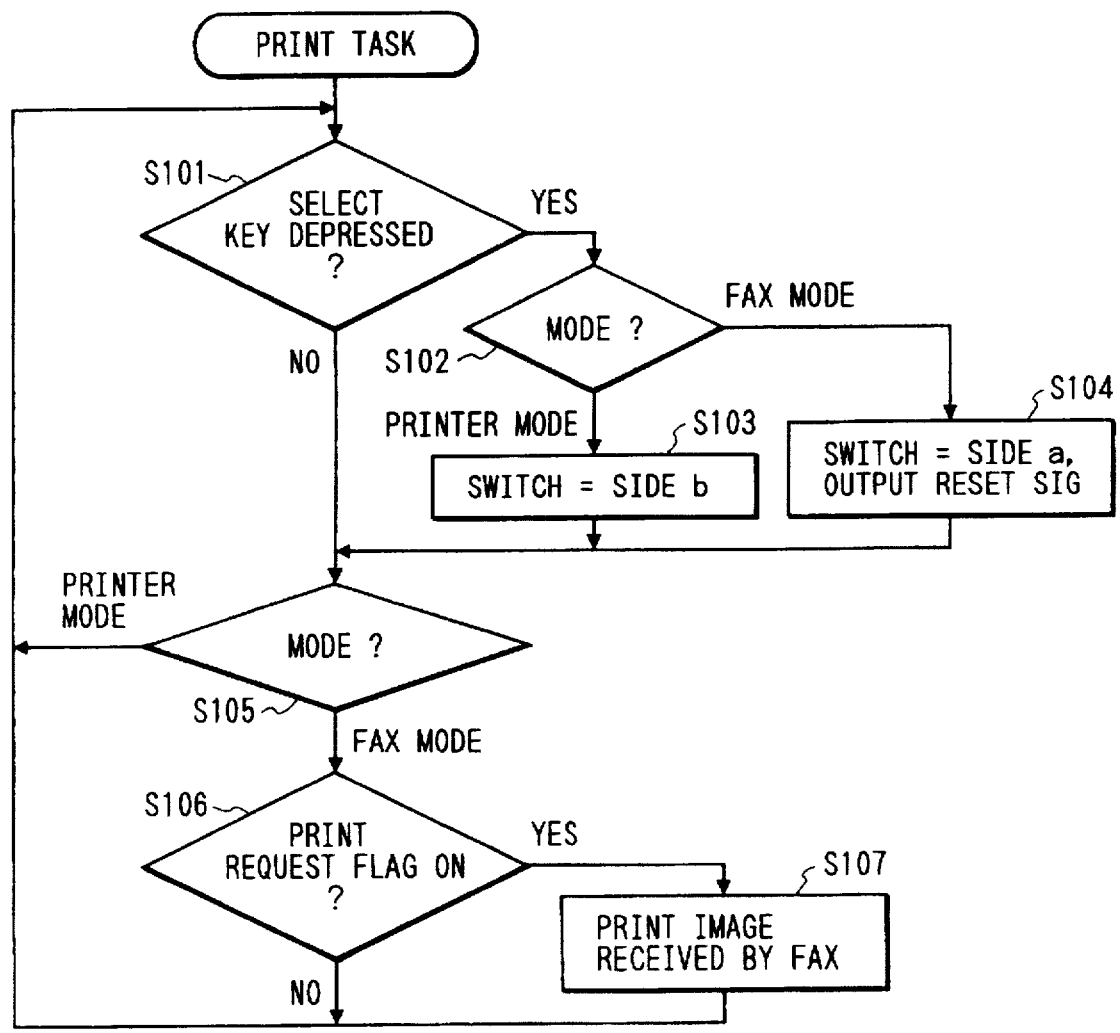
FIG. 48 is a flow chart showing the print task operation in the third embodiment.
Figure 50:
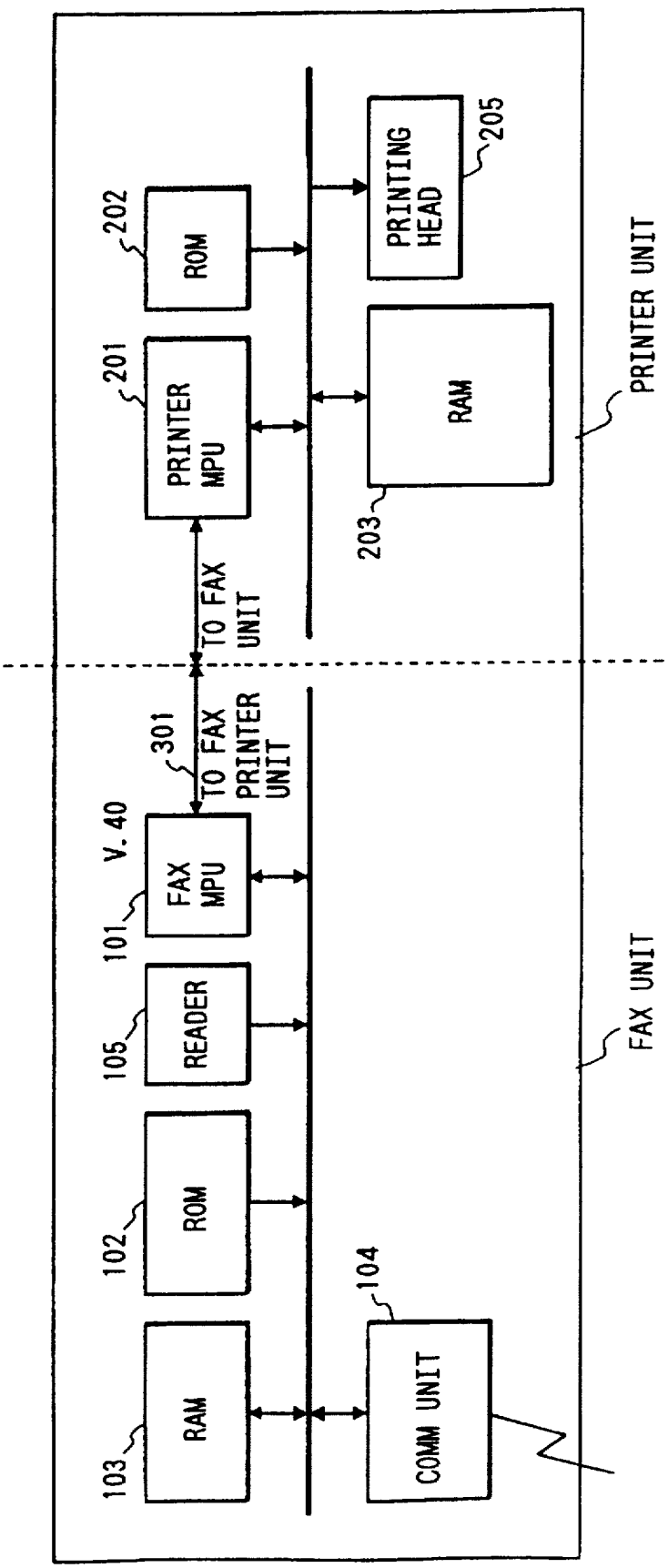
FIG. 50 is a block diagram showing the arrangement of a conventional facsimile apparatus.

The FAX controller 501 performs multi-task operations, and time-divisionally executes a reception task shown in FIG. 47 and a print task shown in FIG. 48.

The operation of the reception task shown in FIG. 47 will be described below. When a calling signal from the line N is detected by a detection circuit in the NCU 506 or a when a user performs an operation for instructing a reception operation from the FAX operational unit 508, the reception task is started, and the flow advances to step S121.

In step S121, a "print request flag" on the RAM 502 is set to be "ON" to indicate that received data is present in the memory, and in step S122, received image data is stored in the RAM 502.

The operation of the print task shown in FIG. 48 will be described below. This print task is always active to monitor the state of the select key, and at the same time, starts the print operation when the "print request flag" is set to be "ON".

More specifically, it is checked in step S101 if the printer key is depressed. If the printer key is depressed, the flow advances to step S102 to switch the operation mode (FAX mode/printer mode) of the recorder 511. In step S102, the current operation mode is checked. If the current operation mode is the printer mode, the flow advances to step S104.

In step S104, the switch 510 is switched to the side a to supply print data from the FAX controller 501 to the recorder 511. At the same time, the switch 517 is disconnected to turn off the displays of the recorder operational unit 509. In addition, the reset signal c is output to initialize the recorder 511.

With this operation, data in the print data buffer on the RAM 512 is erased, and the displays of the recorder operational unit 509 are turned off. Thus, the user feels as if the power supply of the recorder 511 were turned off, thus allowing easy apprehension of the fact that the contents of the print buffer are erased.

Thereafter, the recorder 511 operates as the recorder of the FAX system.

On the other hand, if it is determined in step S102 that the current operation mode is the FAX mode, the flow advances to step S103 to switch the switch 510 to the side b. At the same time, the switch 517 is switched to the side b to activate the recorder operational unit 509. Thus, the user can recognize that the recorder can be used as a printer. Thereafter, print data supplied from a computer connected to the connector 515 is supplied to the recorder 511, and the recorder 511 operates as a printer for recording data from the computer.

The current operation mode is checked in step S105. If the current operation mode is the FAX mode, the "print request flag" in the RAM 502 is checked in step S106. If no print request is detected (flag=OFF), the flow returns to step S101. If the print request is detected, the flow advances to step S107, and received image data in the RAM 502 is supplied to the recorder 511, thereby printing a received image. Thereafter, the flow returns to step S101.

On the other hand, if it is determined in step S105 that the operation mode is the printer mode, the flow returns to step S101 to repeat the above-mentioned operation.

As described above, in this embodiment, since the process for changing the mode upon depression of the select key and the print process of a FAX received image are serially processed in a single task, the operation mode is not switched during the print operation of a FAX received image, and the received image can be prevented from being divided or omitted.

In the above embodiment, the reset signal is connected to the reset terminal of the CPU 514 of the recorder 511. However, the present invention is not limited to this method. For example, the reset signal may be connected to an input port of the recorder 511, and the CPU 514 monitors the port. Upon detection of the reset signal input to the port, the CPU 514 may erase the contents of the print buffer.

The CPU of the recorder 511 may be omitted, and the process of this CPU may be executed as one of tasks of the CPU 504 of the FAX controller 501. In this case, the reset signal can be realized as exchange of information among tasks using, e.g., a flag.

As described above, according to this embodiment, when a user restarts a print operation in the print mode, the contents of the buffer memory can be erased by depressing the select key to set the FAX mode and depressing the select key again to resume the printer mode. At this time, since the displays on the recorder operational unit are turned off, a user feels as if the power supply of the recorder were turned off, thus allowing easy apprehension of the fact that the contents of the print buffer are erased.

Therefore, a FAX apparatus which can erase the contents of the buffer memory by a natural operation without adding any key can be realized.

What is claimed is:

1. An image recording apparatus having
 a data process unit having communication means for receiving transmitted image data, process means for processing image data received by said communication means, and communication control means for controlling said communication means and said process means, and
 a recorder having recording means for recording an image on a recording medium in accordance with image data supplied from said data process unit, and record control means for controlling an operation of said recording means, said apparatus comprising:
 first initialization means for executing a first initialization process of said recorder upon power-ON of said apparatus, and thereafter, setting said recorder in a standby state;
 detection means for detecting an initialization factor of said recorder in the standby state; and
 second initialization means for executing a second initialization process of said recorder in accordance with a detection result of said detection means,
 wherein an operation of said recorder is enabled by executing the first and second initialization processes.

2. An apparatus according to claim 1, wherein the initialization factor is a data reception start instruction.

3. An apparatus according to claim 1, wherein said data process unit comprises reading means for reading an original image, and the initialization factor is a start instruction of recording of image data read by said reading means.

4. An apparatus according to claim 1, wherein said data process unit comprises input means for inputting data supplied from an external host device, and the initialization factor is a start instruction of recording of image data input from said input means.

5. An apparatus according to claim 1, wherein the second initialization process initializes members utilized after the first initialization process.

6. An apparatus according to claim 1, further comprising display means for performing a display corresponding to an operation of said second initialization means.

7. An apparatus according to any one of claims 1 to 6, wherein said recording means comprises a recording head for recording an image on a recording medium by ejecting an ink droplet from an ejection orifice.

8. An apparatus according to claim 7, wherein said recording head ejects an ink droplet from the ejection orifice by causing a change in state in ink using heat energy.

9. An image recording apparatus having
a data process unit having communication means for receiving transmitted image data, process means for processing image data received by said communication means, and communication control means for controlling said communication means and said process means, and
a recorder having recording means for recording an image on a recording medium in accordance with image data supplied from at least said data process unit, and record control means for controlling an operation of said recording means, said apparatus comprising:
initialization means for executing an initialization process of said recorder upon power-ON of said apparatus, and thereafter, setting said recorder in a standby state;
display means for performing a display associated with an operation state of said recorder; and
stop means for stopping the power supply to said display means in the standby state.

10. An apparatus according to claim 9, wherein upon generation of a recording start instruction in the standby state, said stop means cancels stopping of the power supply to said display means.

11. An apparatus according to claim 9 or 10, wherein said recording means comprises a recording head for recording an image on a recording medium by ejecting an ink droplet from an ejection orifice.

12. An apparatus according to claim 11, wherein said recording head ejects an ink droplet from the ejection orifice by causing a change in state in ink using heat energy.

13. An image recording apparatus having
a data process unit having communication means for receiving transmitted image data, process means for processing image data received by said communication means, and communication control means for controlling said communication means and said process means, and
a recorder having recording means for recording an image on a recording medium in accordance with image data supplied from said data process unit, and record control means for controlling an operation of said recording means, said apparatus comprising:
first initialization means for executing a first initialization process of said recorder upon power-ON of said apparatus, and thereafter, setting said recorder in a standby state;
second initialization means for executing a second initialization process of said recorder upon generation of a recording start request or a recording mode setting request in the standby state; and
error canceling means for, when said recorder causes an error and an operation of said recorder is terminated, causing said recorder to stand by in a state after the end of the first initialization process.

14. An apparatus according to claim 13, wherein said communication control means comprises said error canceling means.

15. An apparatus according to claim 13, further comprising display means for performing a display corresponding to an operation of said second initialization means.

16. An apparatus according to any one of claims 13 to 15, wherein said recording means comprises a recording head for recording an image on a recording medium by ejecting an ink droplet from an ejection orifice.

17. An apparatus according to claim 16, wherein said recording head ejects an ink droplet from the ejection orifice by causing a change in state in ink using heat energy.

18. An image recording apparatus having
a data process unit having communication means for receiving transmitted image data, process means for processing image data received by said communication means, and communication control means for controlling said communication means and said process means, and
a recorder having recording means which has a recording head for ejecting an ink droplet and records an image on a recording medium by driving said recording head in accordance with image data supplied from said data process unit, and record control means for controlling an operation of said recording means, wherein said recorder is capable of performing a recording operation in a plurality of recording modes and said record control means sets a recording mode of said recorder to a requested mode of the plurality of recording modes, in response to a recording mode setting request supplied from said data process unit, and said record control means causes said recording means to execute a recording operation in response to a record start request supplied from said data process unit, said apparatus comprising:
power supply control means for executing a power-ON process of said recorder in response to the recording mode setting request, and executing a power-OFF process of said recorder in response to an end of setting of the recording mode, wherein said power supply control means further executes the power-ON process of said recorder in reply to the record start request, and executes the power-OFF process of said recorder in accordance with the end of the recording operation.

19. An apparatus according to claim 18, wherein said power supply control means executes the power-OFF process when an error has occurred in said recorder.

20. An apparatus according to claim 18 or 19, wherein said recording means comprises recovery means for recovering an ink ejection condition of said recording head, and the power-ON process includes a process for recovering the ink ejection condition of said recording head using said recovery means.

21. An apparatus according to claim 18 or 19, wherein said recording head ejects an ink droplet from the ejection orifice by causing a change in state in ink using heat energy.

22. An apparatus according to claim 18 or 19, wherein said recording means comprises a cap member for preserving an ink ejection surface of said recording head, and the power-OFF process includes a preservation process for capping the ink ejection surface of said recording head by said cap member.

23. An apparatus according to claim 20, wherein said recording means comprises a cap member for preserving an ink ejection surface of said recording head, and the power-OFF process includes a preservation process for capping the ink ejection surface of said recording head by said cap member.

24. An apparatus according to claim 20, wherein said recording head ejects an ink droplet from the ejection orifice by causing a change in state in ink using heat energy.

25. An apparatus according to claim 22, wherein said recording head ejects an ink droplet from the ejection orifice by causing a change in state in ink using heat energy.

* * * * *